US012734812B2

(12) United States Patent
Nakata et al.

(10) Patent No.: US 12,734,812 B2
(45) Date of Patent: Sep. 15, 2026

(54) PRINTING APPARATUS

(71) Applicant: SEIKO EPSON CORPORATION, Tokyo (JP)

(72) Inventors: Satoshi Nakata, Matsumoto (JP); Kanji Momose, Matsumoto (JP); Katsumi Maruyama, Azumino (JP); Masanari Tanaka, Shiojiri (JP); Katsumi Yamada, Matsumoto (JP); Hirokazu Anada, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 216 days.

(21) Appl. No.: 18/604,084

(22) Filed: Mar. 13, 2024

(65) Prior Publication Data

US 2024/0308227 A1 Sep. 19, 2024

(30) Foreign Application Priority Data

Mar. 15, 2023 (JP) ................................ 2023-040378

(51) Int. Cl.
*B41J 2/17* (2006.01)
*B41J 2/175* (2006.01)

(52) U.S. Cl.
CPC ............ *B41J 2/1721* (2013.01); *B41J 2/175* (2013.01); *B41J 2/1742* (2024.05)

(58) Field of Classification Search
CPC ........ B41J 2/1721; B41J 2/175; B41J 2/1742; B41J 2/1728; B41J 29/13
USPC ........................................................... 347/84
See application file for complete search history.

(56) References Cited

U.S. PATENT DOCUMENTS

2007/0268331 A1* 11/2007 Sakurai .................. B41J 2/1721 347/36
2009/0218270 A1* 9/2009 Harada .................... B41J 2/175 210/236
2014/0098166 A1* 4/2014 Suzuki ..................... B41J 2/175 347/85
2020/0290381 A1 9/2020 Yoda

FOREIGN PATENT DOCUMENTS

CN 111688354 9/2020
JP 2018-187888 A 11/2018

* cited by examiner

*Primary Examiner* — Jason S Uhlenhake
*Assistant Examiner* — Alexander D Shenderov
(74) *Attorney, Agent, or Firm* — WORKMAN NYDEGGER

(57) ABSTRACT

A holding portion holding a waste liquid container is disposed at a position at which a waste liquid container region overlapping the waste liquid container in a region inside a printing apparatus and a movement path of a carriage overlap when viewed from a transport direction, above a transport path and downstream of the movement path of the carriage in the transport direction, a liquid supply tube overlaps the waste liquid container region when viewed from the transport direction, and a contact reducing member reducing contact between the waste liquid container and the liquid supply tube is disposed between the liquid supply tube and the waste liquid container region.

26 Claims, 29 Drawing Sheets

PRINTING APPARATUS

The present application is based on, and claims priority from JP Application Serial Number 2023-040378, filed Mar. 15, 2023, the disclosure of which is hereby incorporated by reference herein in its entirety.

BACKGROUND

1. Technical Field

The present disclosure relates to a printing apparatus.

2. Related Art

Study and development have been made as to a printing apparatus that prints an image on a printing medium.

In this regard, a printing apparatus including a transport unit that transports a printing medium in a transport direction, a printing head that prints an image on the printing medium that is transported in the transport direction, a carriage that moves the printing head back and forth in a scanning direction intersecting the transport direction above a transport path of the printing medium, a liquid container coupling portion to which a liquid container containing a liquid to be supplied to the printing head is coupled, a liquid supply tube coupled to the liquid container coupling portion and supplying a liquid from the liquid container to the printing head via the liquid container coupling portion, a holding portion that holds a waste liquid container configured to contain a waste liquid discharged from the printing head, and a discharge port including a nozzle in which a discharge port for discharging the waste liquid is formed, in which the holding portion is disposed at a position at which the waste liquid container region overlapping the waste liquid container held by the holding portion and a part of a movement path overlap when viewed from the transport direction in a region inside the printing apparatus above the transport path and downstream of the movement path of the carriage in the transport direction, and a portion of the liquid supply tube is located between the movement path and the waste liquid container region when viewed from a gravity direction, and overlaps the waste liquid container region when viewed from the transport direction is known (see Japanese Patent Application Laid-Open No. 2018-187888).

Here, in the printing apparatus described in Japanese Patent Application Laid-Open No. 2018-187888, when a waste liquid container is attached to or detached from the printing apparatus, contact between the waste liquid container and the liquid supply tube may occur. This may cause a problem in the liquid supply tube, which is undesirable.

SUMMARY

In order to solve the problem, an aspect of the present disclosure is a printing apparatus including: a transport unit configured to transport a printing medium in a transport direction, a printing head configured to print an image on the printing medium, a carriage configured to move the printing head back and forth above a transport path of the printing medium in a scanning direction intersecting the transport direction, a liquid container coupling portion to which a liquid container containing a liquid to be supplied to the printing head is coupled, a liquid supply tube coupled to the liquid container coupling portion to supply the liquid from the liquid container to the printing head via the liquid container coupling portion, a holding portion configured to hold a waste liquid container configured to contain a waste liquid discharged from the printing head, a discharge portion including a nozzle in which a discharge port for discharging the waste liquid is formed, and a contact reducing member configured to reduce contact between the waste liquid container held by the holding portion and the liquid supply tube, wherein the holding portion is disposed at a position at which a waste liquid container region overlapping the waste liquid container held by the holding portion in a region inside the printing apparatus and a part of the movement path overlap when viewed from the transport direction, above the transport path and downstream of the movement path of the carriage in the transport direction, a portion of the liquid supply tube is located between the movement path and the waste liquid container region when viewed from a gravity direction and overlaps the waste liquid container region when viewed from the transport direction, and the contact reducing member is located between the liquid supply tube and the waste liquid container region.

Further, an aspect of the present disclosure is a printing apparatus including: a transport unit configured to transport a printing medium in a transport direction, a printing head configured to print an image on the printing medium, a carriage configured to move the printing head back and forth above a transport path of the printing medium in a scanning direction intersecting the transport direction, a liquid container coupling portion to which a liquid container containing a liquid to be supplied to the printing head is coupled, a liquid supply tube coupled to the liquid container coupling portion to supply the liquid from the liquid container to the printing head via the liquid container coupling portion, a holding portion configured to hold a waste liquid container configured to contain a waste liquid discharged from the printing head, and a discharge portion including a nozzle in which a discharge port for discharging the waste liquid is formed, wherein the holding portion is disposed at a position at which a waste liquid container region overlapping the waste liquid container held by the holding portion in a region inside the printing apparatus and a part of the movement path overlap when viewed from the transport direction, above the transport path and downstream of the movement path of the carriage in the transport direction, a portion of the liquid supply tube is located between the movement path and the waste liquid container region when viewed from a gravity direction and overlaps the waste liquid container region when viewed from the transport direction, the waste liquid container is configured to be coupled to the nozzle, the nozzle extends in a discharge port protrusion direction indicated by a composite vector of a vector indicating the direction opposite to the transport direction and a vector indicating the direction opposite to the gravity direction, and the discharge port is formed at a tip of the nozzle in the discharge port protrusion direction.

DESCRIPTION OF EMBODIMENTS

Embodiments

Figure 1:
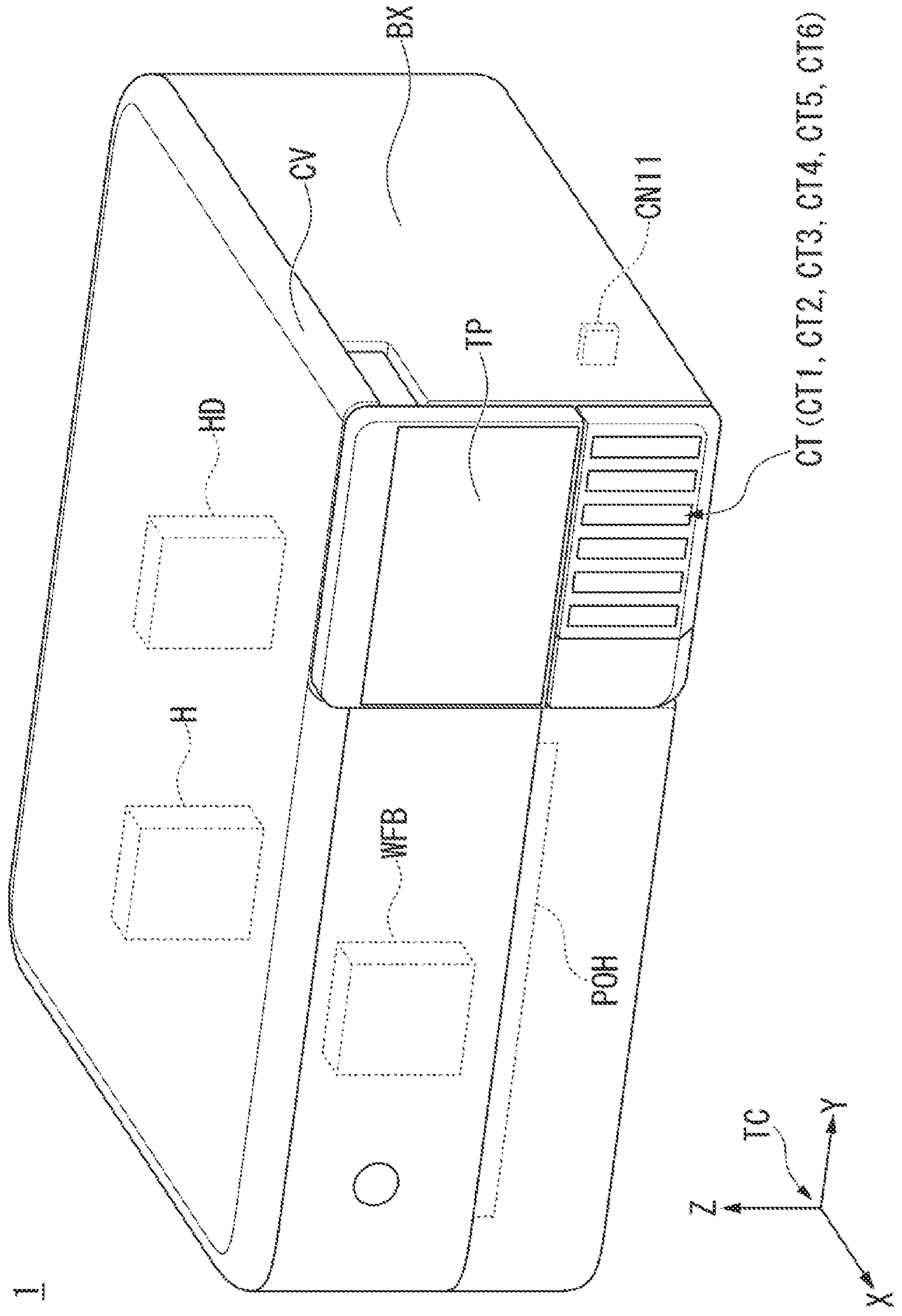
FIG. 1 is a perspective view illustrating an example of an appearance of a printing apparatus 1 according to an embodiment.

Hereinafter, embodiments of the present disclosure will be described with reference to the drawings.

Overview of Printing Apparatus According to Embodiment

First, an overview of a printing apparatus according to an embodiment will be described.

The printing apparatus according to an embodiment includes a transport unit, a printing head, a carriage, a liquid container coupling portion, a liquid supply tube, a holding portion, and a discharge portion. The transport unit transports a printing medium in the transport direction. The printing head prints an image on the printing medium. The carriage moves the printing head back and forth in a scanning direction intersecting the transport direction above a transport path of the printing medium. The liquid container that contains a liquid to be supplied to the printing head is coupled to the liquid container coupling portion. The liquid supply tube is coupled to the liquid container coupling portion and supplies liquid from the liquid container to the printing head via the liquid container coupling portion. The holding portion holds a waste liquid container configured to contain a waste liquid discharged from the printing head. The discharge portion includes a nozzle in which a discharge port for discharging the waste liquid is formed. Further, the holding portion is disposed at a position at which the waste liquid container region overlapping the waste liquid container held by the holding portion and a part of the movement path overlap when viewed from the transport direction in a region inside the printing apparatus above the transport path and downstream of the movement path of the carriage in the transport direction. Further, a portion of the liquid supply tube is located between the movement path and the waste liquid container region when viewed from a gravity direction, and overlaps the waste liquid container region when viewed from the transport direction. At least a part of the discharge portion overlaps the waste liquid container region when viewed from the transport direction, and is located downstream of the waste liquid container region in the transport direction when viewed from the scanning direction. Further, the waste liquid container region is spaced apart from the liquid supply tube. Further, the nozzle extends in the gravity direction. The discharge port is formed at a tip of the nozzle in the gravity direction. Accordingly, in the printing apparatus, it is possible to increase a distance between the liquid supply tube and the waste liquid container, as compared to a case in which the nozzle extends parallel to the transport direction. As a result, in the printing apparatus, it is possible to reduce the occurrence of a problem in the liquid supply tube due to contact between the waste liquid container and the liquid supply tube.

Hereinafter, a configuration of the printing apparatus according to the embodiment will be described in detail.

Configuration of Printing Apparatus According to Embodiment

Hereinafter, a configuration of the printing apparatus according to the embodiment will be described with a printing apparatus 1 as an example. Hereinafter, a user of the printing apparatus 1 will be simply referred to as a user, for convenience of description.

FIG. 1 is a perspective view illustrating an example of an appearance of the printing apparatus 1 according to the embodiment.

Here, a three-dimensional coordinate system TC is a three-dimensional Cartesian coordinate system indicating directions in drawings in which the three-dimensional coordinate system TC is drawn. Hereinafter, an X-axis in the three-dimensional coordinate system TC is simply referred as an X-axis, for convenience of description. Further, hereinafter, a Y-axis in the three-dimensional coordinate system TC is simply referred as a Y-axis, for convenience of description. Further, hereinafter, a Z-axis in the three-dimensional coordinate system TC is simply referred as a Z-axis, for convenience of description. Further, hereinafter, a case in which a negative direction of the Z-axis matches the gravity direction will be described as one example. Thus, hereinafter, a positive direction of the Z-axis is referred to as an upward direction or simply as upward, and the negative direction of the Z-axis is referred to as a downward direction or simply as downward, for convenience of description.

Further, hereinafter, a surface at a positive direction side of the X-axis among surfaces of the printing apparatus 1 is referred to as a front surface of the printing apparatus 1, and a surface on a negative direction side of the X-axis among the surfaces of the printing apparatus 1 is referred to as a rear surface of the printing apparatus 1, for convenience of description. Further, hereinafter, a surface at a positive direction side of the Y-axis among the surfaces of the printing apparatus 1 is referred to as a right surface of the printing apparatus 1, and a surface on a negative direction side of the Y-axis among the surfaces of the printing apparatus 1 is referred to as a left surface of the printing apparatus 1, for convenience of description. Further, hereinafter, a surface on a positive direction side of the Z-axis among surfaces of the printing apparatus 1 is referred to as an upper surface of the printing apparatus 1, and a surface on a negative direction side of the Z-axis among the surfaces of the printing apparatus 1 is referred to as a lower surface of the printing apparatus 1, for convenience of description. Further, hereinafter, a case in which the transport direction in which the printing apparatus 1 transports the printing medium matches a positive direction of the −X axis will be described as one example. Further, hereinafter, a case in which the printing apparatus 1 is viewed toward a certain direction is referred to as a case in which the printing apparatus 1 is viewed from the direction.

The printing apparatus 1 prints an image on the printing medium. The printing medium may be any medium as long as the printing medium is, for example, a sheet-shaped medium such as printing paper, or sticker mount.

An outer form of the printing apparatus 1 includes a housing BX, a cover CV, and an input reception unit TP. That is, the printing apparatus 1 includes the housing BX, the cover CV, and the input reception unit TP. The printing apparatus 1 may include other members as members constituting the outer form of the printing apparatus 1, in addition to the housing BX, the cover CV, and the input reception unit TP.

The housing BX is a housing of the printing apparatus 1. The housing BX has a substantially rectangular parallelepiped shape as a whole. The housing BX opens upward. The housing BX contains members other than members constituting the outer form among members included in the printing apparatus 1.

Further, a printing medium discharge port POH is formed in the housing BX. The printing medium discharge port POH is an opening through which the printing medium on which an image has been printed is discharged, among openings formed in the housing BX. In the example illustrated in FIG. 1, the housing BX includes a cover that covers the printing medium discharge port POH to be openable and closable from the front. In FIG. 1, the printing medium discharge port POH is closed by the cover. Therefore, in FIG. 1, the printing medium discharge port POH is hidden behind the cover.

The cover CV is a member that covers the opening of the housing BX to be openable and closable from the upper side. Therefore, the cover CV is a member constituting an upper surface of the printing apparatus 1 among outer front surfaces of the printing apparatus 1.

The input reception unit TP is an input device through which the printing apparatus 1 receives various operations. The input reception unit TP is, for example, a touch panel in which a touch pad and a display are integrated. The input reception unit 13 may include a hardware key that receives the various operations instead of or in addition to the touch panel. The hardware key is, for example, a button, a lever, or the like, but is not limited to these.

In the example illustrated in FIG. 1, the input reception unit TP is provided in the cover CV. To this end, the input reception unit TP moves together with the cover CV relative to the housing BX according to the opening and closing of the cover CV. In the example illustrated in FIG. 1, when the cover CV is closed with respect to the housing BX, the input reception unit TP constitutes an upper right surface of a front surface of the printing apparatus 1.

Further, the printing apparatus 1 is, for example, an ink jet-type printer. Therefore, one or more liquid containers and the waste liquid container WFB are attached to the printing apparatus 1. The printing apparatus 1 may be configured not to include some or all of the one or more liquid containers or may include some or all of the one or more liquid containers. Further, the printing apparatus 1 may not include the waste liquid container WFB or may include the waste liquid container WFB.

The one or more liquid containers are members that contain a liquid that the printing apparatus 1 ejects to print an image on the printing medium. The liquid is, for example, ink. Hereinafter, the liquid is referred to as ink for convenience of description. When the liquid is the ink, each of the one or more liquid containers is, for example, an ink cartridge, but may be another member capable of containing the ink. The liquid may be another liquid that the printing apparatus 1 can use to print the image on the printing medium, instead of the ink.

Here, when the printing apparatus 1 is a monochrome printing machine, one or more liquid containers that contain black ink are attached to the printing apparatus 1. When the printing apparatus 1 is a color printing machine, for example, one or more liquid containers that contain cyan ink, one or more liquid containers that contain magenta ink, and one or more liquid containers that contain yellow ink, in addition to the one or more liquid containers that contain the black ink, are attached to the printing apparatus 1. Hereinafter, a case in which the printing apparatus 1 is a color printing machine will be described as an example. In the example illustrated in FIG. 1, six liquid containers are attached to the printing apparatus 1. Hereinafter, these six liquid containers will be referred to as a liquid container CT1, a liquid container CT2, a liquid container CT3, a liquid container CT4, a liquid container CT5, and a liquid container CT6, respectively, for convenience of description. Further, hereinafter, a case in which each of the liquid containers CT1 to CT3 is an ink cartridge that contains black ink will be described as an example. Further, hereinafter, a case in which the liquid container CT4 is an ink cartridge containing cyan ink will be described as an example. Further, hereinafter, a case in which the liquid container CT5 is an ink cartridge that contains magenta ink will be described as an example. Further, hereinafter, a case in which the liquid container CT4 is an ink cartridge containing yellow ink will be described as an example. Further, hereinafter, the six liquid containers will be collectively referred to as a liquid container CT unless it is necessary to distinguish the liquid containers, for convenience of description.

The waste liquid container WFB is a member that contains waste liquid. Examples of the waste liquid include ink attached to the inside of the printing apparatus 1 instead of being attached to the printing medium in printing by the printing apparatus 1, and ink discharged by maintenance of a printing head included in the printing apparatus 1, but the present disclosure are not limited thereto. The adhesion of ink to the inside of the printing apparatus 1 is caused by, for example, borderless printing. Further, the ink discharged by the maintenance is ink used for flushing of the printing head included in the printing apparatus 1, ink suctioned from the printing head, or the like, but the present disclosure is not limited thereto. In FIG. 1, the waste liquid container WFB is illustrated as an object having a rectangular parallelepiped shape in order to prevent FIG. 1 from becoming complicated.

Figure 2:
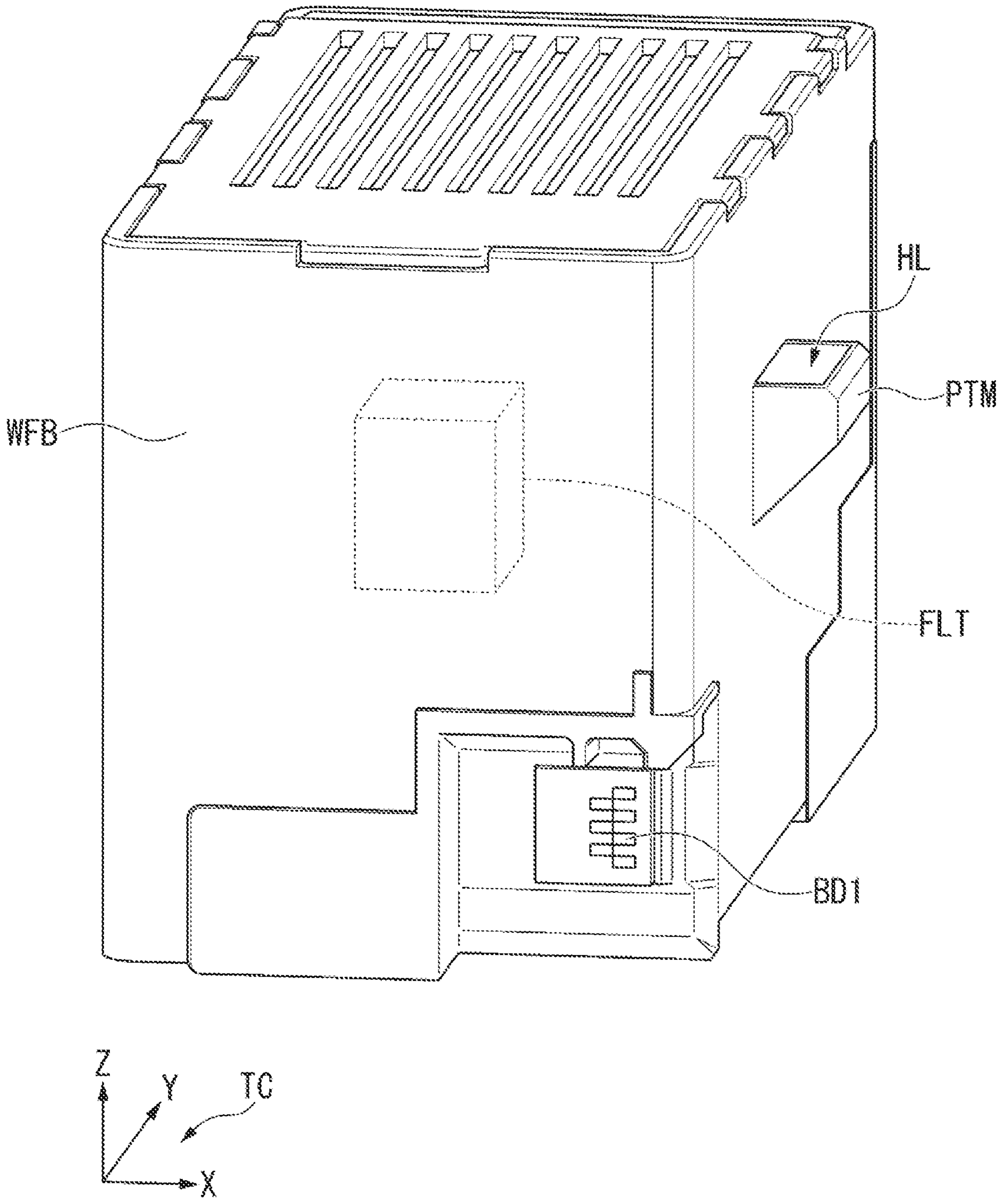
FIG. 2 is a perspective view illustrating an example of an appearance of a waste liquid container WFB attached to the printing apparatus 1.

FIG. 2 is a perspective view illustrating an example of an appearance of the waste liquid container WFB attached to the printing apparatus 1. However, in FIG. 2, the printing apparatus 1 is omitted in order to clearly show the appearance of the waste liquid container WFB. As illustrated in FIG. 2, the waste liquid container WFB is a member having a rectangular parallelepiped shape as a whole. An absorption member FLT that absorbs the waste liquid of the printing apparatus 1 is contained inside the waste liquid container WFB. The absorption member FLT is, for example, a fiber such as felt, but may be another member capable of absorbing the waste liquid of the printing apparatus 1. In FIG. 2, the absorption member FLT contained inside the waste liquid container WFB is shown as an object having a rectangular parallelepiped shape in order to prevent FIG. 2 from becoming complicated.

One or more holes that couple the outside of the waste liquid container WFB to the inside of the waste liquid container WFB are formed in the waste liquid container WFB. Hereinafter, a case in which the one or more holes formed in the waste liquid container WFB are the holes HL illustrated in FIG. 2 will be described as an example. The hole HL is a hole through which the waste liquid of the printing apparatus 1 passes from the outside of the waste liquid container WFB to the inside of the waste liquid container WFB. That is, the waste liquid of the printing apparatus 1 is absorbed by the absorption member FLT contained inside the waste liquid container WFB through the hole HL.

Here, in the printing apparatus 1, the waste liquid is discharged from the upper side to the lower side as will be described below. To this end, in the example illustrated in FIG. 2, a protrusion portion PTM that protrudes in the transport direction is provided on a surface in the transport direction of the waste liquid container WFB in a state in which the waste liquid container WFB is attached to the printing apparatus 1. In this example, the hole HL opens upward on an upper surface of the protrusion portion PTM. In this case, the hole HL is formed at a position at which the hole HL does not overlap the absorption member FLT contained inside the waste liquid container WFB when viewed from the gravity direction. Therefore, the hole HL penetrates through the inside of the protrusion portion PTM to reach the inside of the waste liquid container WFB to guide the waste liquid flowing in from the hole HL toward the inside of the waste liquid container WFB. This makes it possible for the waste liquid container WFB to cause the absorption member FLT to efficiently absorb the waste liquid even when the waste liquid is discharged from the upper side to the lower side as in this example. Further, since the waste liquid container WFB is provided with the protrusion portion PTM, it is not necessary to increase a volume of the waste liquid container WFB in order to receive the waste liquid discharged from the upper side in the printing apparatus 1. This is useful because of leading to reducing of an increase in a size of the printing apparatus 1. The waste liquid container WFB may have a shape in which the absorption member FLT is located below the protrusion portion PTM. In this case, the hole HL is formed at a position at which the hole HL overlaps the absorption member FLT when viewed from the gravity direction.

Further, the waste liquid container WFB is provided with a circuit board BD1, as illustrated in FIG. 2. In the example illustrated in FIG. 2, the circuit board BD1 is provided on a surface in the direction opposite to the scanning direction among surfaces of the waste liquid container WFB in a state in which the waste liquid container WFB is attached to the printing apparatus 1. In the example illustrated in FIG. 2, the circuit board BD1 is coupled to the printing apparatus 1 in the transport direction. The circuit board BD1 may be provided on the surface other than the surface in the direction opposite to the scanning direction among the surfaces of the waste liquid container WFB.

The circuit board BD1 is a board that outputs information indicating that the waste liquid container WFB is attached to the printing apparatus 1, according to power supplied from the printing apparatus 1 when the waste liquid container WFB is attached to the printing apparatus 1. The circuit board BD1 may be a board that performs another process instead of or in addition to the process of outputting the information.

Further, the printing apparatus 1 includes, for example, a transport unit H, a printing head HD, a carriage CG, a liquid container coupling portion CN11, a liquid supply tube TB, a discharge portion OM, a holding portion HLD, and a suction mechanism VC. In the printing apparatus 1, each of the transport unit H, the printing head HD, the carriage CG, the liquid supply tube TB, the discharge portion OM, and the holding portion HLD is contained in the housing BX. Further, in the printing apparatus 1, the liquid container coupling portion CN11 is provided in a concave portion formed at an outer front surface of the housing BX. The printing apparatus 1 may include other members, in addition to the transport unit H, the printing head HD, the carriage CG, the liquid container coupling portion CN11, the liquid supply tube TB, the discharge portion OM, and the holding portion HLD.

Figure 3:
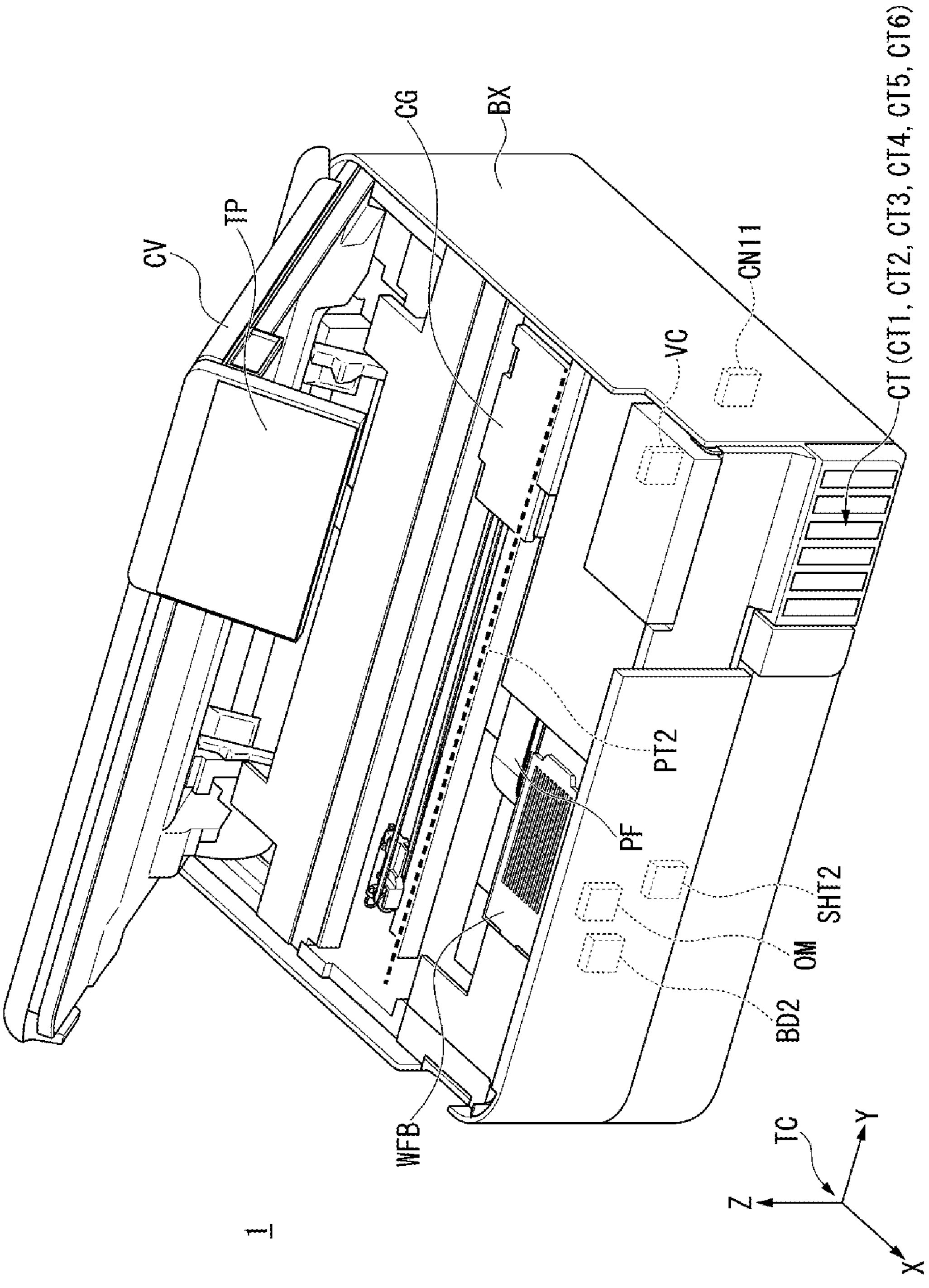
FIG. 3 is a perspective view illustrating an example of a state in which the cover CV of the printing apparatus 1 illustrated in FIG. 1 is open with respect to a housing BX.
Figure 4:
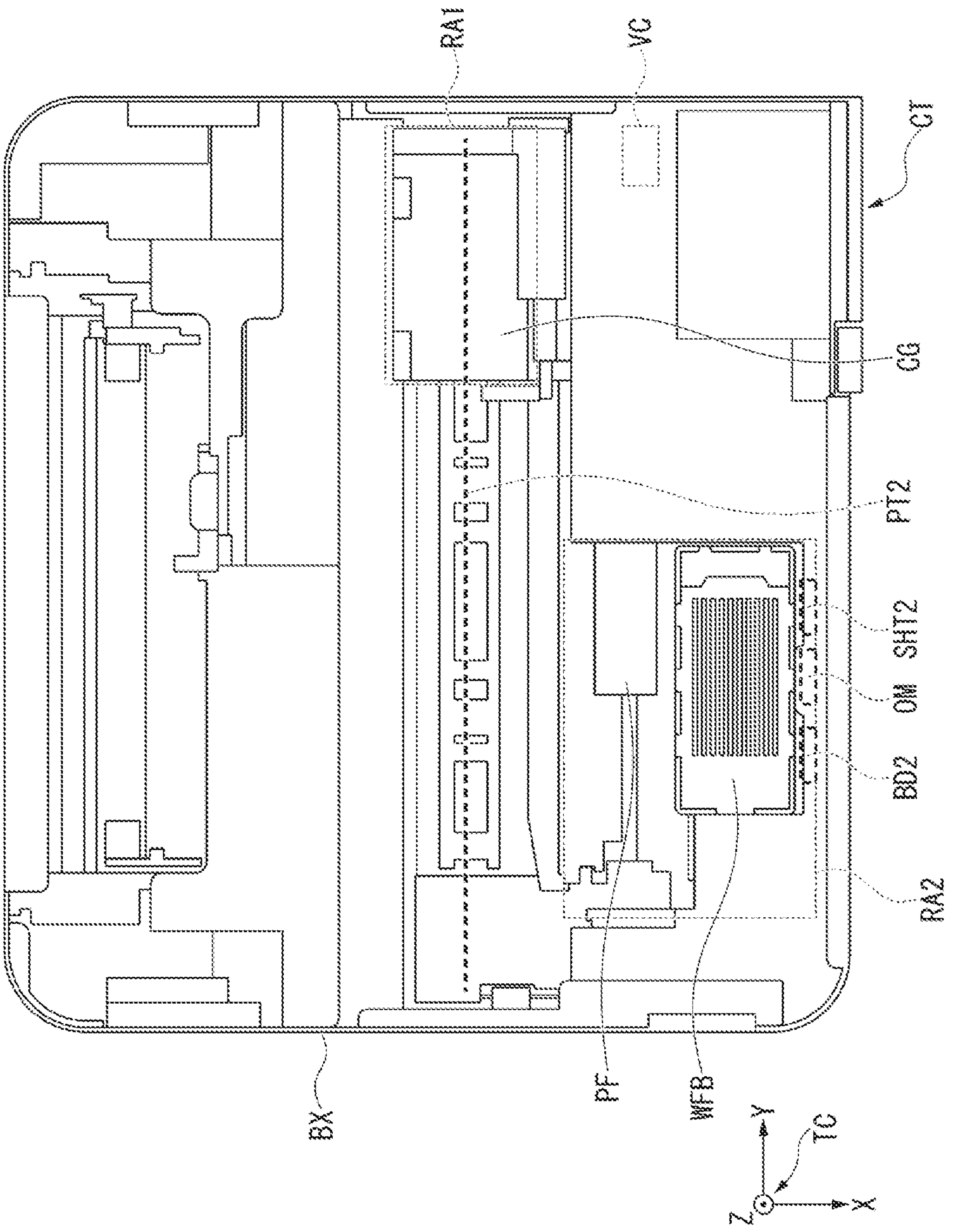
FIG. 4 is a top view illustrating a configuration inside the housing BX of the printing apparatus 1 illustrated in FIG. 1.
Figure 5:
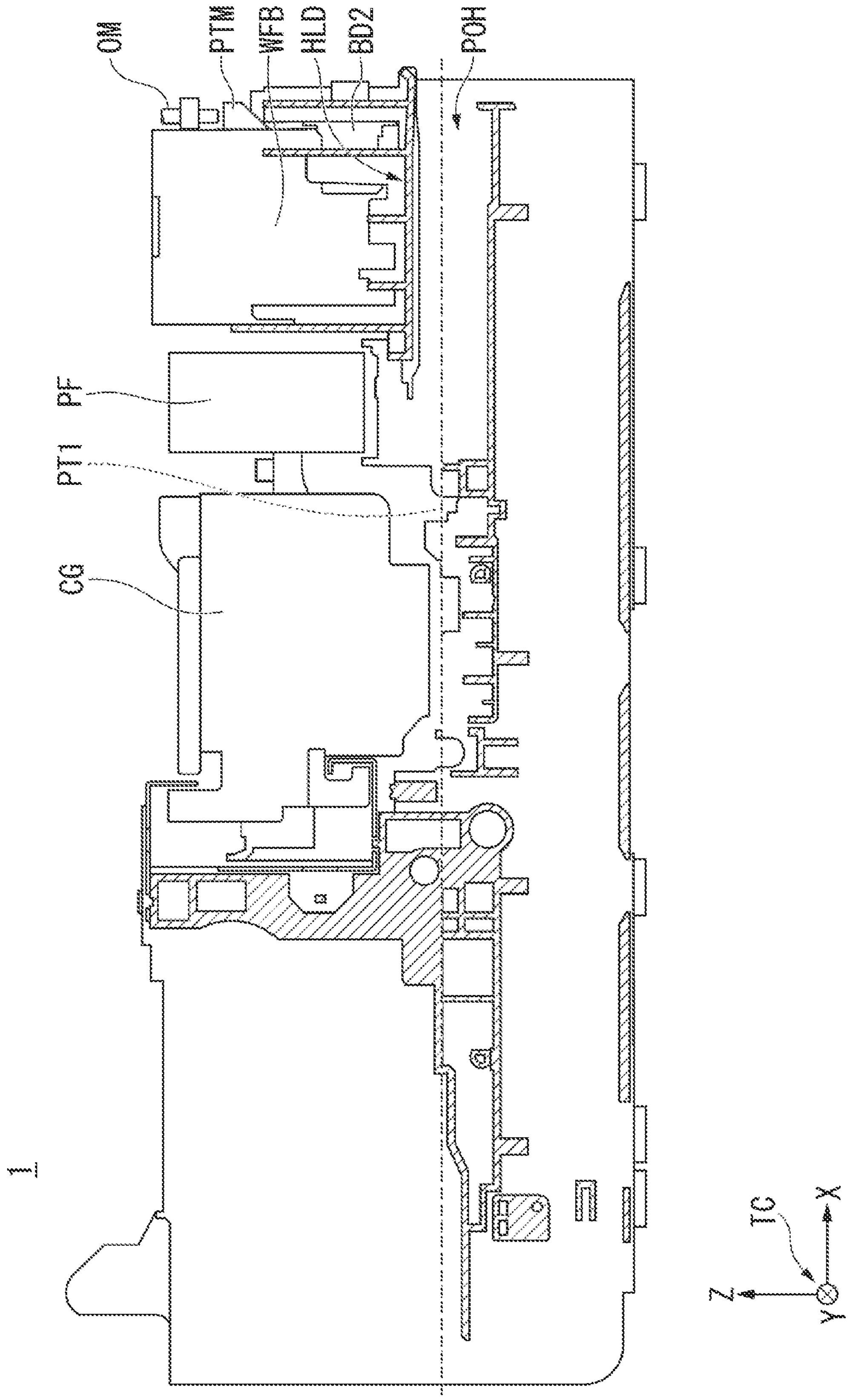
FIG. 5 is a cross-sectional view illustrating a configuration of the inside of the printing apparatus 1 illustrated in FIG. 1.
Figure 6:
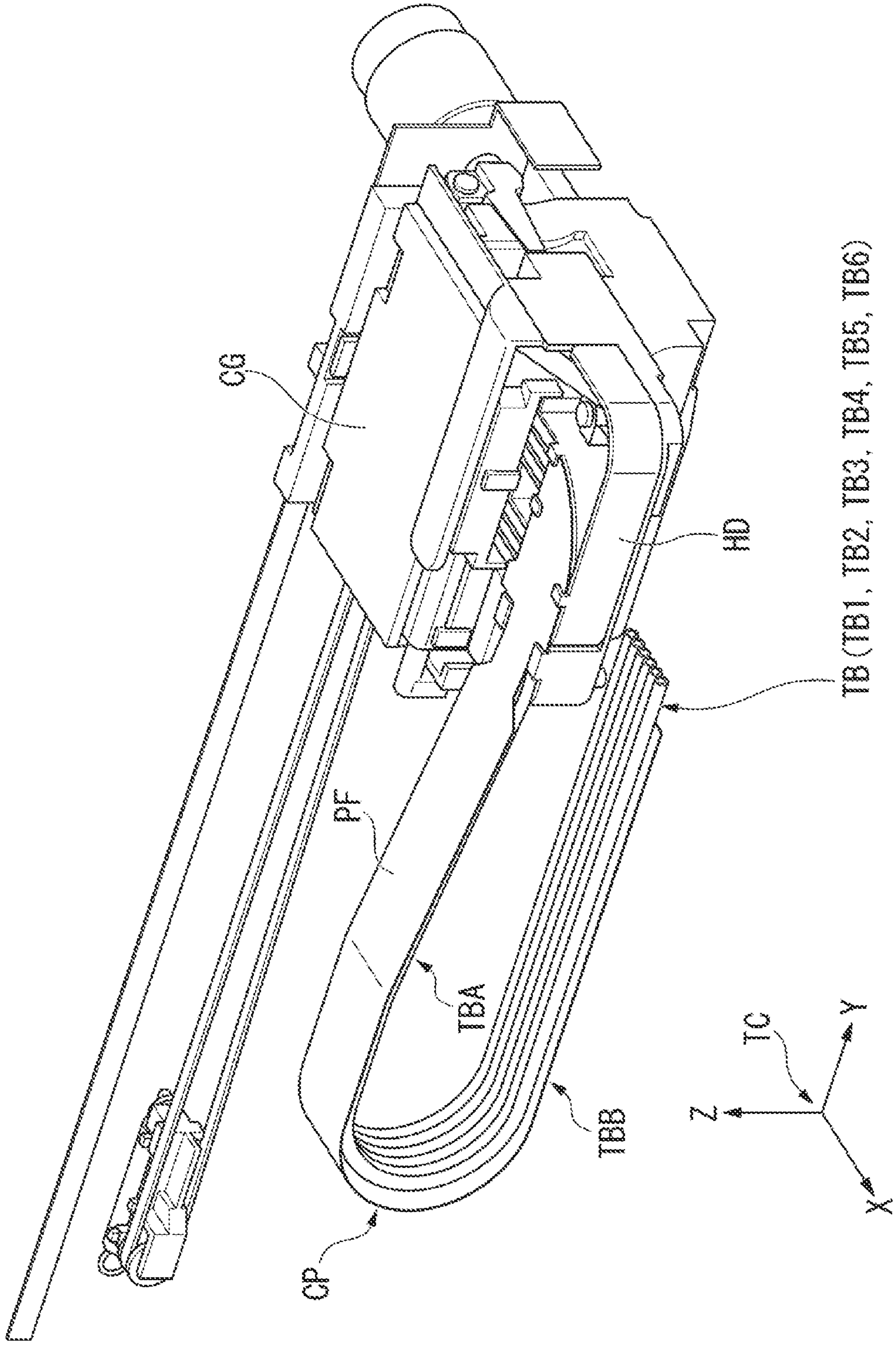
FIG. 6 is a perspective view illustrating an example of a surrounding configuration of the printing head HD included in the printing apparatus 1 illustrated in FIG. 1.

Here, FIG. 3 is a perspective view illustrating an example of a state in which the cover CV of the printing apparatus 1 illustrated in FIG. 1 is opened with respect to the housing BX. Further, FIG. 4 is a top view illustrating a configuration inside the housing BX of the printing apparatus 1 illustrated in FIG. 1. However, in FIG. 4, the cover CV is omitted in order to clearly show the configuration. FIG. 5 is a cross-sectional view illustrating a configuration of the inside of the printing apparatus 1 illustrated in FIG. 1. However, the cross-sectional view illustrated in FIG. 5 is a cross-sectional view when the printing apparatus 1 is cut on a virtual surface orthogonal to the Y-axis so that a surface in a negative direction of the Y-axis among surfaces of the carriage CG and a surface in the negative direction of the Y-axis among surfaces of the waste liquid container WFB attached to the printing apparatus 1 can be seen. FIG. 6 is a perspective view illustrating an example of a surrounding configuration of the printing head HD included in the printing apparatus 1 illustrated in FIG. 1.

The transport unit H includes a paper feed motor, a plurality of paper feed rollers driven by the paper feed motor, and the like, and transports the printing medium in the transport direction. In FIG. 1, the transport unit H is drawn as an object having a rectangular parallelepiped shape in order to prevent FIG. 1 from becoming complicated. Further, in FIGS. 3 to 5, the transport unit H is omitted in order to prevent FIGS. 3 to 5 from becoming complicated.

The printing head HD is an example of the printing head of the printing apparatus 1 described above. The printing head HD is an ink jet printing head. That is, the printing head HD prints an image on the printing medium by ejecting the supplied ink onto the printing medium. In FIG. 1, the printing head HD is drawn as an object having a rectangular parallelepiped shape in order to prevent FIG. 1 from becoming complicated. In FIGS. 3 to 5, the printing head HD is hidden behind other members and is not visible.

The carriage CG moves the printing head HD back and forth in the scanning direction intersecting the transport direction. Hereinafter, a case in which the scanning direction matches the positive direction of the Y-axis as shown in FIG. 5 will be described as an example. In this case, the scanning direction is orthogonal to each of the transport direction and the gravity direction. Further, the carriage CG moves the printing head HD above the transport path PT1 of the printing medium, as illustrated in FIG. 5. Here, in FIG. 5, the transport path PT1 is indicated by a dotted line. Although the transport path PT1 illustrated in FIG. 5 is a linear path, the transport path PT1 may be a path including a curved path at least partially.

The liquid container coupling portion CN11 is a connector to which the liquid container CT is coupled. The liquid container coupling portion CN11 is provided in a concave portion in which the liquid container CT is contained, which is a concave portion formed at the outer front surface of the housing BX. In the example illustrated in FIGS. 3 and 4, the concave portion is formed at the lower right side of a front surface of the housing BX. Therefore, when the cover CV is closed with respect to the housing BX, the concave portion is located below the input reception unit TP. In FIGS. 1 and 3, the liquid container coupling portion CN11 is shown as an object having a rectangular parallelepiped shape in order to prevent FIGS. 1 and 3 from becoming complicated. Further, in FIGS. 4 and 5, the liquid container coupling portion CN11 is omitted in order to prevent FIGS. 4 and 5 from becoming complicated.

The liquid supply tube TB is a tube that is coupled to the liquid container coupling portion CN11 and supplies ink from the liquid container CT to the printing head HD via the liquid container coupling portion CN11. That is, the liquid supply tube TB is coupled between the liquid container coupling portion CN11 and the printing head HD. In FIGS. 3 to 5, the liquid supply tube TB is hidden behind other members and is not visible.

The liquid supply tube TB includes one or more liquid supply tubes, as illustrated in FIG. 6. In this example, six liquid containers are coupled to the liquid container coupling portion CN11 as liquid containers CT. In this case, the liquid supply tube TB includes six liquid supply tubes. Hereinafter, these six liquid supply tubes will be referred to as a liquid supply tube TB1, a liquid supply tube TB2, a liquid supply tube TB3, a liquid supply tube TB4, a liquid supply tube TB5, and a liquid supply tube TB6, respectively, for convenience of description. Here, the liquid supply tube TB1 is a tube that supplies ink from the liquid container CT1 to the printing head HD. The liquid supply tube TB2 is a tube that supplies ink from the liquid container CT2 to the printing head HD. The liquid supply tube TB3 is a tube that supplies ink from the liquid container CT3 to the printing head HD. The liquid supply tube TB4 is a tube that supplies ink from the liquid container CT4 to the printing head HD. The liquid supply tube TB5 is a tube that supplies ink from the liquid container CT5 to the printing head HD. The liquid supply tube TB6 is a tube that supplies ink from the liquid container CT6 to the printing head HD.

The six liquid supply tubes included in the liquid supply tube TB are arranged to be aligned in the transport direction. To this end, when viewed from the transport direction, the six liquid supply tubes overlap except for, for example, a shift according to the movement of the printing head HD by the carriage CG.

Further, as illustrated in FIG. 6, the liquid supply tube TB is bent between the liquid container coupling portion CN11 and the printing head HD. A first portion TBA from a position where the liquid supply tube is most bent CP to the liquid container coupling portion CN11 and a second portion TBB from the position CP to the printing head HD among portions of the liquid supply tube TB do not overlap in the transport direction. In the example illustrated in FIG. 6, the first portion TBA and the second portion TBB overlap when viewed from the gravity direction. The first portion TBA and the second portion TBB may not partially or entirely overlap with each other when viewed from the gravity direction. A portion from the position where the liquid supply tube is most bent to the liquid container coupling portion CN11 among portions of the liquid supply tube TB1, a portion from the position where the liquid supply tube is most bent to the liquid container coupling portion CN11 among portions of the liquid supply tube TB2, a portion from the position where the liquid supply tube is most bent to the liquid container coupling portion CN11 among portions of the liquid supply tube TB3, a portion from the position where the liquid supply tube is most bent to the liquid container coupling portion CN11 among portions of the liquid supply tube TB4, a portion from the position where the liquid supply tube is most bent to the liquid container coupling portion CN11 among portions of the liquid supply tube TB5, and a portion from the position where the liquid supply tube is most bent to the liquid container coupling portion CN11 among portions of the liquid supply tube TB6 are included in the first portion TBA. Further, a portion from the position where the liquid supply tube is most bent to the printing head HD among the portions of the liquid supply tube TB1, a portion from the position where the liquid supply tube is most bent to the printing head HD among the portions of the liquid supply tube TB2, a portion from the position where the liquid supply tube is most bent to the printing head HD among the portions of the liquid supply tube TB3, a portion from the position where the liquid supply tube is most bent to the printing head HD among the portions of the liquid supply tube TB4, a portion from the position where the liquid supply tube is most bent to the printing head HD among the portions of the liquid supply tube TB5, and a portion from the position where the liquid supply tube is most bent to the printing head HD among the portions of the liquid supply tube TB6 are included in the second portion TBB.

Further, at least the portion of the liquid supply tube TB is provided with a protection member PF. The protection member PF is made of a predetermined type of plastic, such as a polyethylene terephthalate (PET) film. The protection member PF protects the liquid supply tube TB. That is, the protection member PF is provided in each of at least a portion of the liquid supply tube TB1, at least a portion of the liquid supply tube TB2, at least a portion of the liquid supply tube TB3, at least a portion of the liquid supply tube TB4, at least a portion of the liquid supply tube TB5, and at least a portion of the liquid supply tube TB6, and protects the six liquid supply tubes.

In the example illustrated in FIGS. 3 to 6, the protection member PF is provided to cover substantially an entire outer circumferential surface of the bent liquid supply tube TB. The outer circumferential surface of the liquid supply tube TB is a surface constituted by a surface opposite to a surface facing the second portion TBB among surfaces of the first portion TBA described above and a surface opposite to the surface facing the first portion TBA among surfaces of the second portion TBB. To this end, in FIGS. 3 to 5, the liquid supply tube TB is covered by the protection member PF, and is hidden behind the protection member PF and cannot be seen. The protection member PF is fixed to the liquid supply tube TB to such an extent that the protection member PF can be shifted back and forth with respect to the liquid supply tube TB in the transport direction. Therefore, for example, when the protection member PF is pressed in the direction opposite to the transport direction, the protection member PF may be shifted in the direction with respect to the liquid supply tube TB. Further, in this example, the protection member PF does not overlap the liquid supply tube TB when viewed from the transport direction.

The discharge portion OM includes a nozzle in which a discharge port for discharging the waste liquid described above is formed. At least a part of the discharge portion OM overlaps the waste liquid container region when viewed from the transport direction and is located downstream of the waste liquid container region in the transport direction when viewed from the scanning direction. In the example illustrated in FIGS. 3 to 5, the entire discharge portion OM overlaps the waste liquid container region when viewed from the transport direction, and is located downstream of the waste liquid container region in the transport direction when viewed from the scanning direction. Therefore, in this example, the discharge portion OM overlaps the waste liquid container WFB held by the holding portion HLD and is located downstream of the waste liquid container WFB in the transport direction in the scanning direction, when viewed from the transport direction. Therefore, the discharge portion OM is provided at a position closer to a second end portion of a movement path PT2 in the direction opposite to the scanning direction than a center of the movement path PT2 in the scanning direction. A detailed configuration of the discharge portion OM will be described later.

The holding portion HLD is a member that holds the waste liquid container WFB. In other words, the holding portion HLD detachably holds the waste liquid container WFB. The holding portion HLD includes, for example, a plate-like member on which the waste liquid container WFB can be placed. The plate-like member may have a flat plate shape, may have a shape including a surface having unevenness, may have a shape in which an opening is formed like a mesh shape, or may have another shape on which the waste liquid container WFB can be placed. The holding portion HLD is disposed between the movement path PT2 of the carriage CG and the input reception unit TP in the transport direction. In FIGS. 3 and 4, the movement path PT2 is indicated by a dotted line. When the cover CV opens the opening of the housing BX, the holding portion HLD is exposed through the opening of the housing BX.

Further, the holding portion HLD holds the waste liquid container WFB so that the waste liquid container WFB is movable between a first position determined in advance as a position at which the waste liquid container WFB receives the waste liquid discharged from the discharge port of the discharge portion OM and a second position determined in advance as a position at which the waste liquid container WFB does not receive the waste liquid discharged from the discharge port. That is, when the waste liquid container WFB is located at the first position, the waste liquid container WFB receives the waste liquid from the discharge portion OM and causes the absorption member FLT to absorb the waste liquid. When the waste liquid container WFB is located at the second position, the waste liquid container WFB does not receive the waste liquid from the discharge portion OM. The second position is a position located upstream of the first position in the transport direction. Hereinafter, a case in which the second position is a position at which the waste liquid container WFB is located when the waste liquid container WFB is inserted onto the holding portion HLD from the upper side to the lower side by the user will be described as an example. In this case, the user inserts the waste liquid container WFB onto the holding portion HLD from the upper side to the lower side and then moves the waste liquid container WFB from the second position to the first position on the holding portion HLD. Accordingly, the waste liquid container WFB is attached to the printing apparatus 1 and can receive the waste liquid discharged from the discharge portion OM. The second position may be a position different from each of the position at which the waste liquid container WFB is located, and the first position when the waste liquid container WFB is inserted onto the holding portion HLD from the upper side to the lower side by the user.

The holding portion HLD is disposed at a position at which the waste liquid container region and a part of the movement path PT2 of the carriage CG overlap when viewed from the transport direction, above the transport path PT1 and downstream of the movement path PT2 of the carriage CG in the transport direction. The waste liquid container region is a region overlapping the waste liquid container WFB held by the holding portion HLD in the region inside the printing apparatus 1. More specifically, the waste liquid container region is a region including both of a first region overlapping the waste liquid container WFB held by the holding portion HLD at the first position described above in the region inside the printing apparatus 1 and a second region overlapping the waste liquid container WFB held by the holding portion HLD at the second position in the region inside the printing apparatus 1. Therefore, when the waste liquid container WFB is held by the holding portion HLD, the waste liquid container WFB overlaps a part of the movement path PT2 in the transport direction. As illustrated in FIG. 5, the holding portion HLD is disposed above the printing medium discharge port POH when viewed in the transport direction.

The holding portion HLD includes a board coupling unit BD2 which can be electrically coupled to the circuit board BD1 of the waste liquid container WFB. When the waste liquid container WFB moves from the second position to the first position, the board coupling unit BD2 is provided at a position at which the board coupling unit BD2 can be coupled to the circuit board BD1 of the waste liquid container WFB. In FIGS. 3 and 4, the board coupling unit BD2 is illustrated as an object having a rectangular parallelepiped shape in order to prevent FIGS. 3 and 4 from becoming complicated. In the example illustrated in FIGS. 3 and 4, the waste liquid container region is located at a position closer to a second end portion of the movement path PT2 in the direction opposite to the scanning direction than to a first end portion of the movement path PT2 of the carriage CG in the scanning direction. To this end, in this example, the board coupling unit BD2 is also provided at a position closer to the second end portion of the movement path PT2 in the direction opposite to the scanning direction than to the first end portion of the movement path PT2 of the carriage CG in the scanning direction. In other words, in this example, the board coupling unit BD2 is provided at a position close to the second end portion opposite to the first end portion in the positive direction of the Y-axis among end portions of the movement path PT2 of the carriage CG.

The suction mechanism VC is disposed at a position closer to the first end portion of the movement path PT2 in the scanning direction than the center of the movement path PT2, and sucks ink from the printing head HD as the waste liquid. The suction mechanism VC supplies the ink sucked as the waste liquid to the discharge portion OM via a supply tube (not illustrated).

Here, in this example, the user places the waste liquid container WFB at the second position by inserting the waste liquid container WFB onto the holding portion HLD from the upper side to the lower side, as described above. This is because, when an attempt is made to place the waste liquid container WFB at the first position by inserting the waste liquid container WFB into the holding portion HLD from the upper side to the lower side, the waste liquid container WFB interferes with the discharge portion OM. Therefore, the user moves the waste liquid container WFB from the second position to the first position by moving the waste liquid container WFB located at the second position in the transport direction on the holding portion HLD. This makes it possible for the user to attach the waste liquid container WFB to the printing apparatus 1 without causing the waste liquid container WFB to interfere with the discharge portion OM. However, when the user places the waste liquid container WFB at the second position, the user may cause the waste liquid container WFB to come into contact with the liquid supply tube TB due to shaking of hands or the like. This can similarly occur even when the user pulls out the waste liquid container WFB from the second position. Further, when the user removes the waste liquid container WFB from the printing apparatus 1, the user moves the waste liquid container WFB from the first position to the second position and then pulls out the waste liquid container WFB upward. Therefore, the user may cause the waste liquid container WFB to come into contact with the liquid supply tube TB through the movement of the waste liquid container WFB from the first position to the second position. Such contact between the waste liquid container WFB and the liquid supply tube TB leads to the occurrence of the problem in the liquid supply tube TB, which is not desirable.

Figure 7:
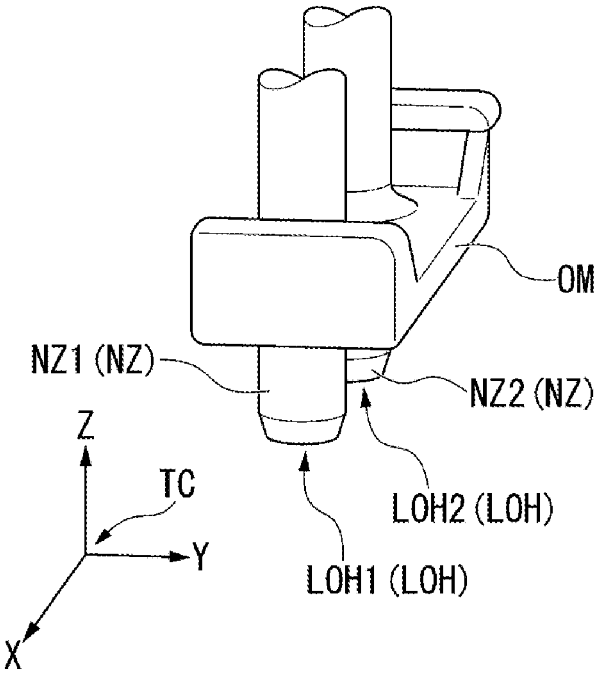
FIG. 7 is a diagram illustrating an example of a configuration of a discharge portion OM according to the embodiment.

It is difficult for such contact between the waste liquid container WFB and the liquid supply tube TB to occur when a clearance distance between the waste liquid container WFB placed at the second position and the protection member PF increases. This is because the clearance distance is a distance larger than the distance between the waste liquid container WFB placed at the second position and the liquid supply tube TB. Therefore, in the printing apparatus 1 according to the first embodiment, it is possible to reduce contact of the waste liquid container WFB with the liquid supply tube TB by configuring the discharge portion OM as illustrated in FIG. 7. FIG. 7 is a diagram illustrating an example of a configuration of a discharge portion OM according to the embodiment.

The discharge portion OM includes, for example, two nozzles including a nozzle NZ1 in which a discharge port LOH1 for discharging the waste liquid is formed and a nozzle NZ2 in which a discharge port LOH2 for discharging the waste liquid is formed. Hereinafter, the nozzle NZ1 and the nozzle NZ2 will be collectively referred to as a nozzle NZ unless it is necessary to distinguish these, for convenience of description. Further, hereinafter, the discharge port LOH1 and the discharge port LOH2 will be collectively referred to as a discharge port LOH unless it is necessary to distinguish these from each other, for convenience of description. The number of nozzles included in the discharge portion OM may be one or may be three or more.

The nozzle NZ extends in the gravity direction. Therefore, the printing apparatus 1 discharges the waste liquid from the upper side to the lower side. Since the nozzle NZ extends in the gravity direction, the discharge port LOH1 is formed at a tip of the nozzle NZ1 in the gravity direction. Further, the discharge port LOH2 is formed at the tip of the nozzle NZ2 in the gravity direction. This makes it possible for the discharge portion OM to discharge the waste liquid in the gravity direction, and to reduce the waste liquid remaining in the nozzle NZ after the discharge of the waste liquid. As a result, in the printing apparatus 1, it is possible to reduce dripping of the waste liquid from the nozzle NZ when the waste liquid container WFB is detached. Further, in the discharge portion OM, since the nozzle NZ extends in the gravity direction, it is possible to reduce a length of the discharge portion OM in the transport direction, as compared to a case in which the nozzle NZ extends in the direction opposite to the transport direction. As a result, in the printing apparatus 1, it is possible to increase the above-described clearance distance as compared to a case in which the nozzles NZ extend in the direction opposite to the transport direction. That is, in the printing apparatus 1, it is possible to reduce contact of the waste liquid container WFB with the liquid supply tube TB, and it is possible to reduce the occurrence of the problem in the liquid supply tube TB due to the contact between the waste liquid container WFB and the liquid supply tube TB.

Movement of Waste Liquid Container when User Attaches Waste Liquid Container to Printing Apparatus Here, the movement of the waste liquid container WFB when the user attaches the waste liquid container WFB to the printing apparatus 1 will be described.

Figure 8:
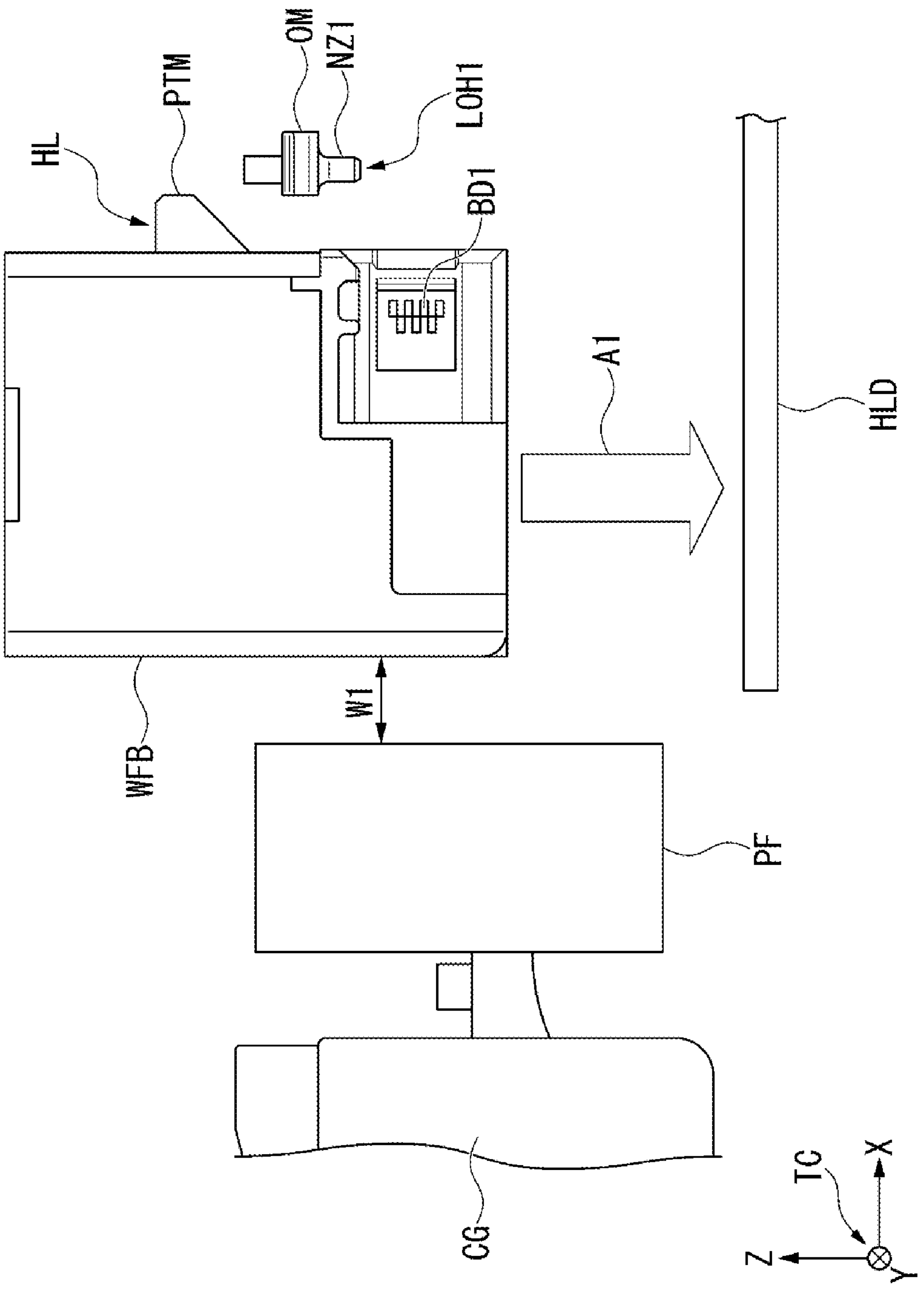
FIG. 8 is a side view illustrating an example of a state of the waste liquid container WFB immediately before the waste liquid container WFB is inserted into a holding portion HLD from the upper side to the lower side.

FIG. 8 is a side view illustrating an example of a state of the waste liquid container WFB immediately before the waste liquid container WFB is inserted into the holding portion HLD from the upper side to the lower side. In FIG. 8, each of the holding portion HLD, the carriage CG, the protection member PF, and the discharge portion OM together with the waste liquid container WFB is illustrated. The waste liquid container WFB illustrated in FIG. 8 is located at the second position by being inserted downward into the holding portion HLD. In FIG. 8, the lower side is indicated by an arrow A1. Further, FIG. 9 is a perspective view of each of the waste liquid container WFB and the discharge portion OM illustrated in FIG. 8.

Figure 9:
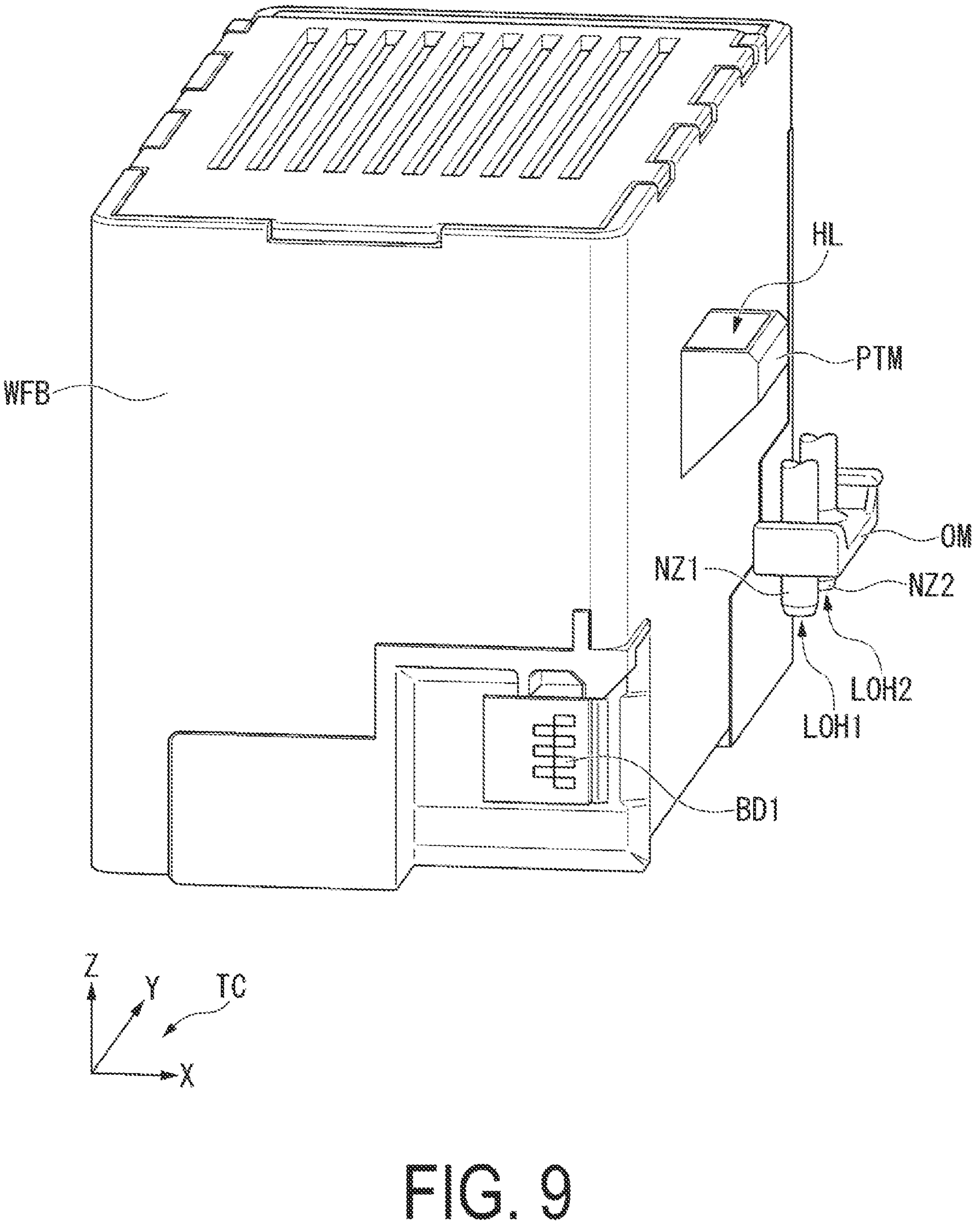
FIG. 9 is a perspective view of each of the waste liquid container WFB and a discharge portion OM illustrated in FIG. 8.

The waste liquid container WFB illustrated in FIGS. 8 and 9 does not overlap the discharge portion OM when viewed from the gravity direction. Therefore, even when the user moves the waste liquid container WFB illustrated in FIGS. 8 and 9 downward, the waste liquid container WFB does not interfere with the discharge portion OM. Accordingly, the user can position the waste liquid container WFB at the second position by inserting the waste liquid container WFB into the holding portion HLD from the upper side to the lower side.

In the example illustrated in FIG. 8, a clearance distance between the waste liquid container WFB and the protection member PF in the transport direction is indicated by a distance W1. As described above, since the nozzle NZ of the discharge portion OM extends in the gravity direction, the distance W1 is larger than that when the nozzle NZ of the discharge portion OM extends in the direction opposite to the transport direction. As a result, in the printing apparatus 1, it is possible to reduce contact of the waste liquid container WFB with the liquid supply tube TB, as described above, and it is possible to reduce the occurrence of the problem in the liquid supply tube TB due to the contact between the waste liquid container WFB and the liquid supply tube TB.

Figure 10:
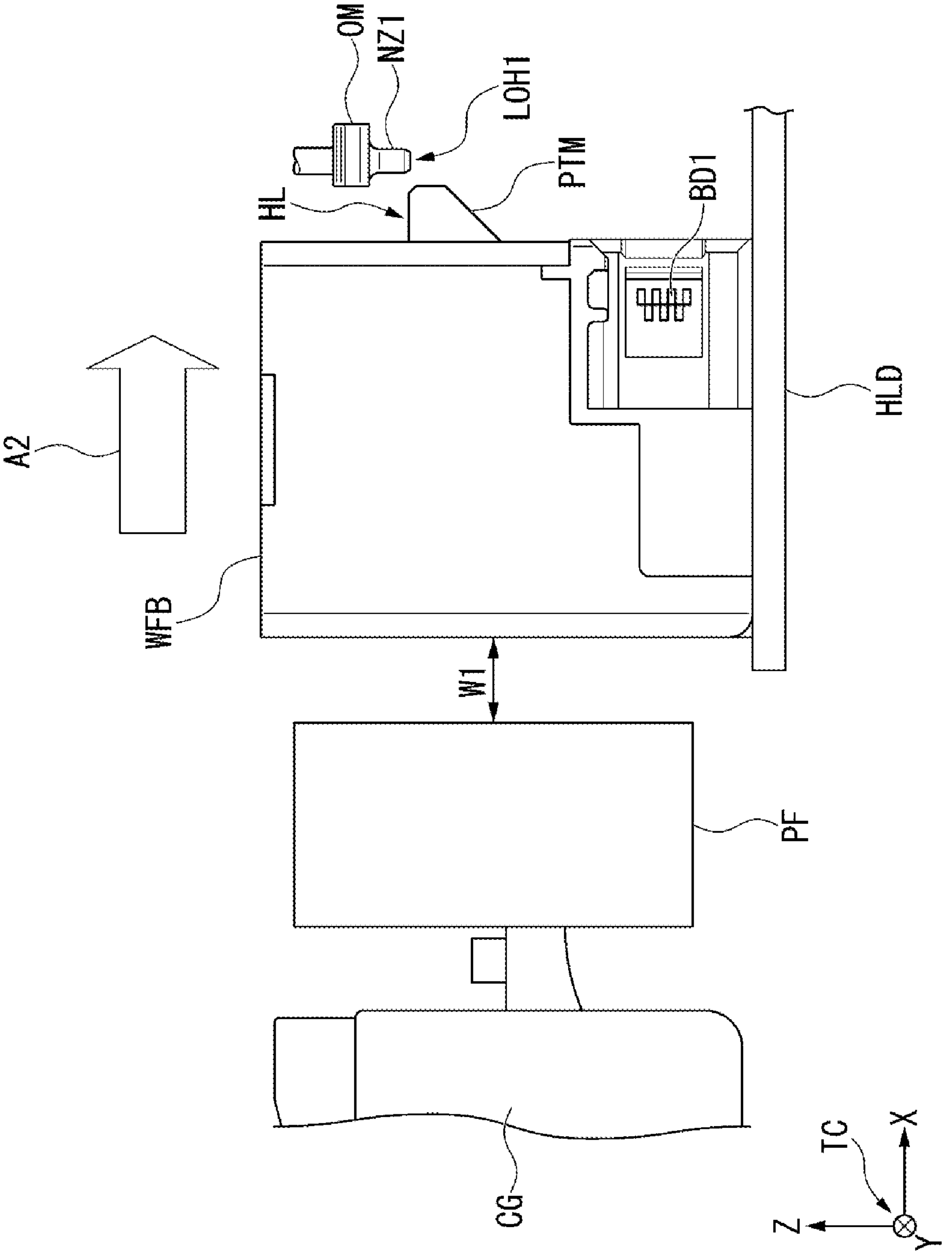
FIG. 10 is a side view illustrating an example of a state in which the waste liquid container WFB is located at a second position.
Figure 11:
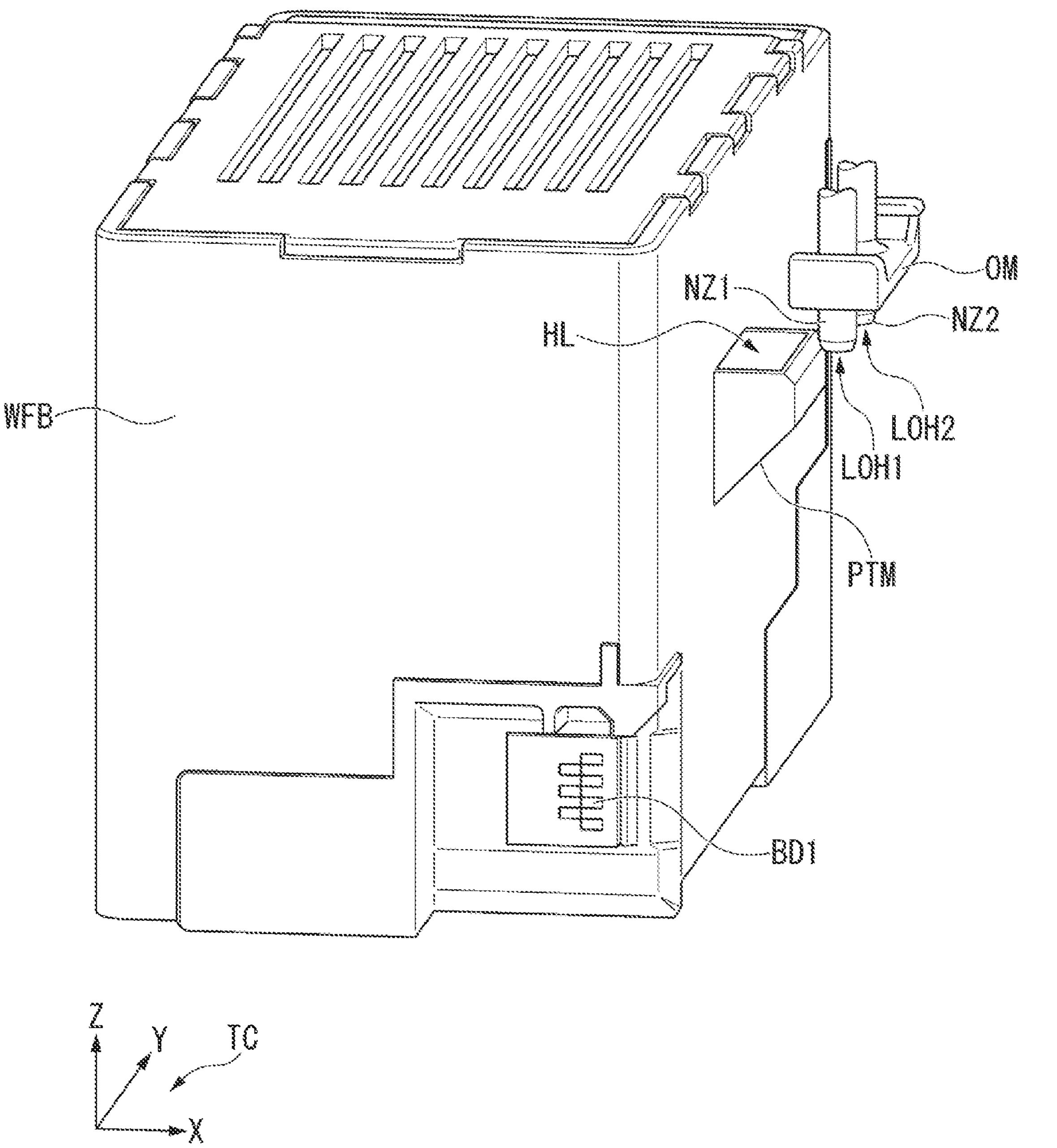
FIG. 11 is a perspective view of each of the waste liquid container WFB and the discharge portion OM illustrated in FIG. 10.

Meanwhile, FIG. 10 is a side view illustrating an example of a state in which the waste liquid container WFB is located at the second position. In FIG. 10, the holding portion HLD, the carriage CG, the protection member PF, and the discharge portion OM are also illustrated together with the waste liquid container WFB. The waste liquid container WFB illustrated in FIG. 10 is located at the first position by being moved on the holding portion HLD in the transport direction. In FIG. 10, the transport direction is indicated by an arrow A2. Further, FIG. 11 is a perspective view of each of the waste liquid container WFB and the discharge portion OM illustrated in FIG. 10.

Figure 12:
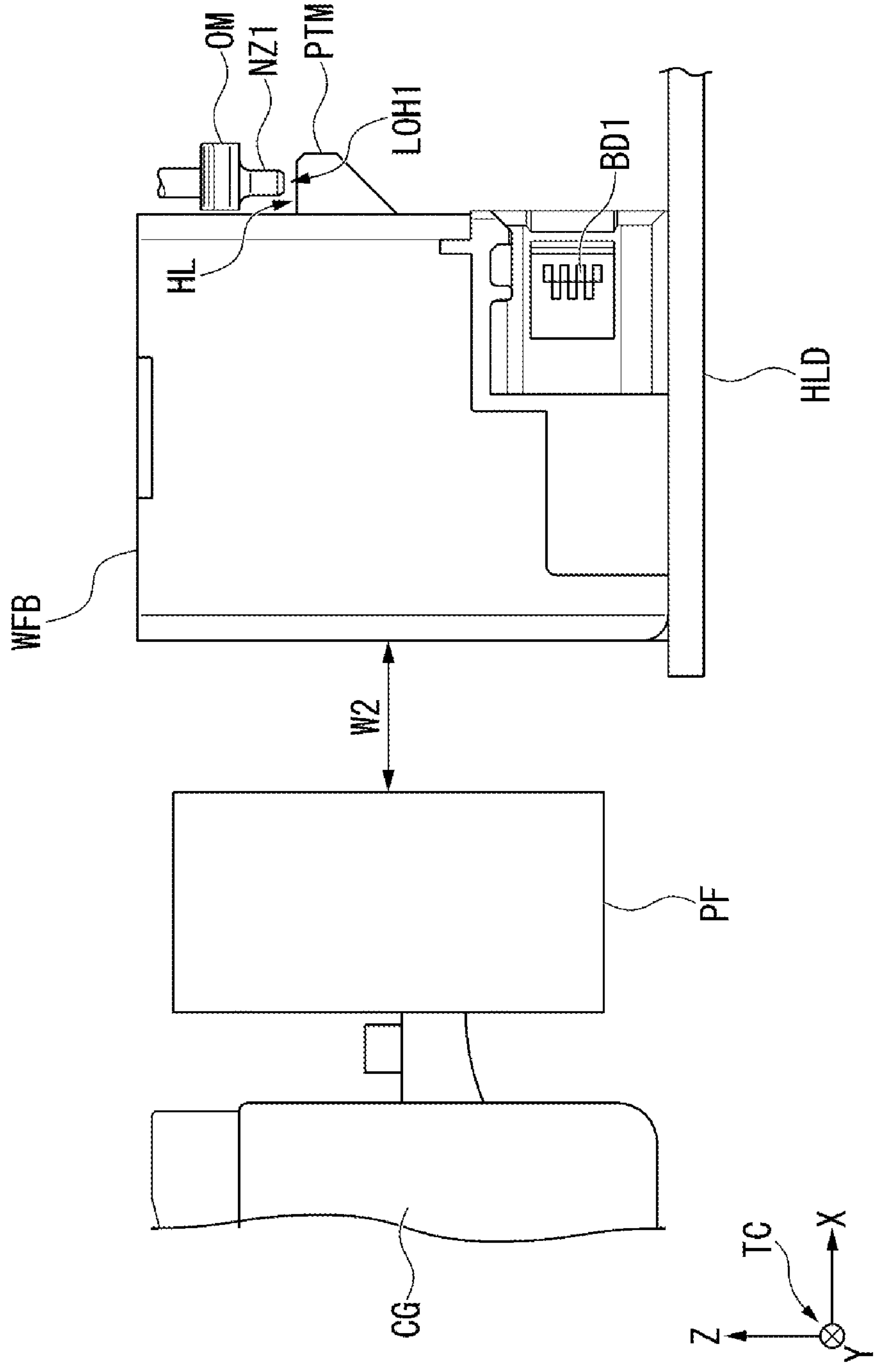
FIG. 12 is a side view illustrating an example of a state in which a waste liquid container WFB is located at a first position.
Figure 13:
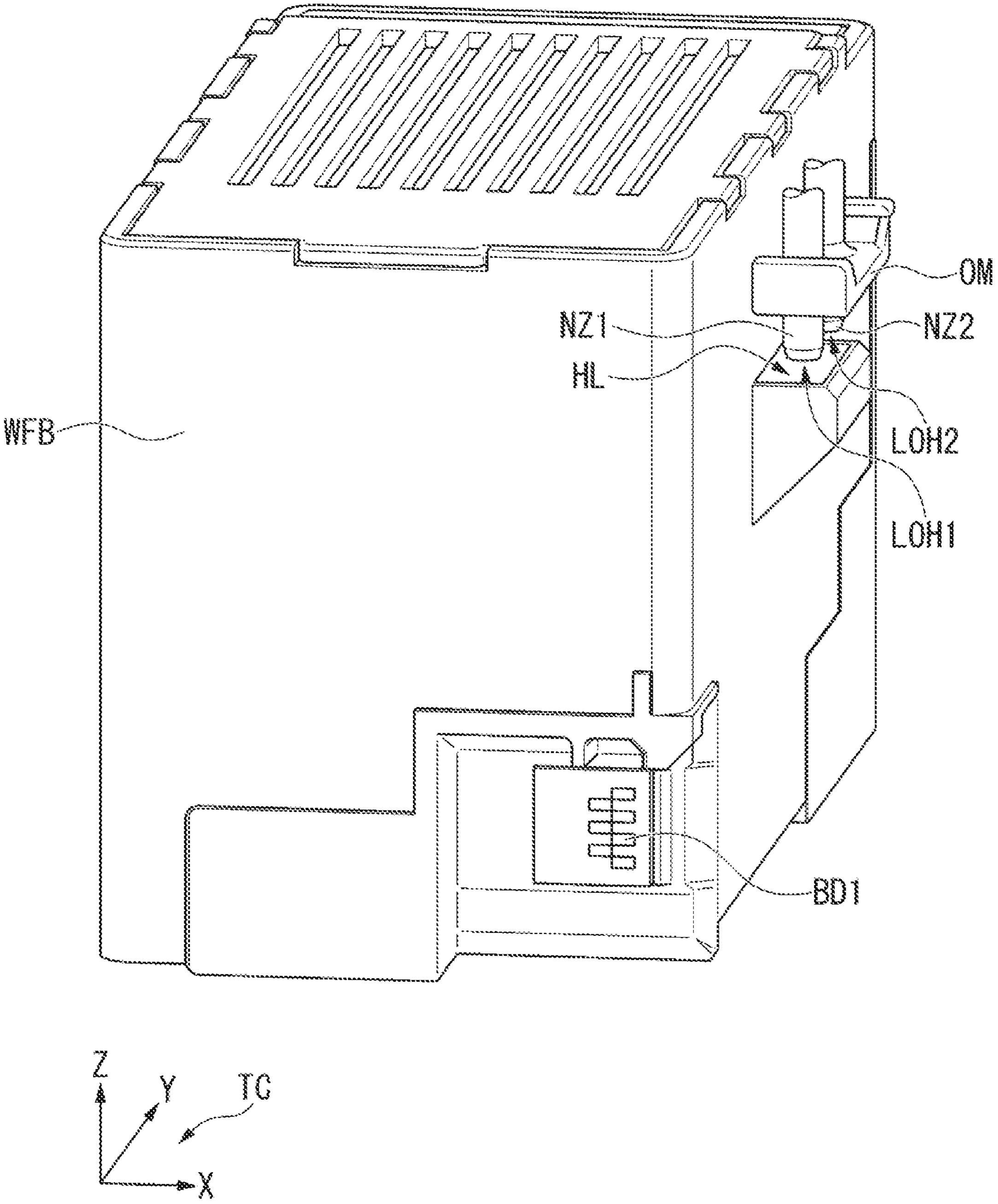
FIG. 13 is a perspective view of each of the waste liquid container WFB and the discharge portion OM illustrated in FIG. 12.

FIG. 12 is a side view illustrating an example of a state in which the waste liquid container WFB is located at the first position. In FIG. 12, the holding portion HLD, the carriage CG, the protection member PF, and the discharge portion OM are illustrated together with the waste liquid container WFB. The waste liquid container WFB illustrated in FIG. 12 is located at the first position. Therefore, the distance between the waste liquid container WFB and the liquid supply tube TB is a distance W2 larger than the distance W1 which is an example of the clearance distance. FIG. 13 is a perspective view of each of the waste liquid container WFB and the discharge portion OM illustrated in FIG. 12.

As illustrated in FIGS. 12 and 13, when the waste liquid container WFB is located at the first position, the discharge port LOH is located above the hole HL formed in the upper surface of the protrusion portion PTM of the waste liquid container WFB. Therefore, in this case, the waste liquid discharged from the discharge portion OM is absorbed by the absorption member FLT contained inside the waste liquid container WFB through the hole HL. In this case, the nozzle NZ is not coupled to the hole HL. When the nozzle NZ is not coupled to the hole HL, the printing apparatus 1 does not need a member required for coupling between the nozzle NZ and the hole HL, and as a result, it is possible to realize simplification of a manufacturing process, reduction in manufacturing cost, and the like.

As described above, the printing apparatus 1 is the printing apparatus including the transport unit H that transports the printing medium in the transport direction, the printing head HD that prints an image on the printing medium, the carriage CG that moves the printing head HD back and forth above the transport path PT1 of the printing medium in the scanning direction intersecting the transport direction, the liquid container coupling portion CN11 to which the liquid container CT that contains ink to be supplied to the printing head HD is coupled, the liquid supply tube TB coupled to the liquid container coupling portion CN11 to supply ink from the liquid container CT to the printing head HD via the liquid container coupling portion CN11, the holding portion HLD that holds the waste liquid container WFB capable of containing the waste liquid discharged from the printing head HD, and the discharge portion OM including the nozzle NZ in which the discharge port LOH for discharging the waste liquid is formed, wherein the holding portion HLD is disposed at a position at which the waste liquid container region overlapping the waste liquid container WFB held by the holding portion HLD in the region inside the printing apparatus 1 and a part of the movement path PT2 of the carriage CG overlap when viewed from the transport direction, above the transport path PT1 and downstream of the movement path PT2 of the carriage CG in the transport direction, a portion of the liquid supply tube TB is located between the movement path PT2 and the waste liquid container region when viewed from the gravity direction and overlaps the waste liquid container region when viewed from the transport direction, at least a part of the discharge portion OM overlaps the waste liquid container region when viewed from the transport direction and is located downstream of the waste liquid container region in the transport direction when viewed from the scanning direction, the waste liquid container region is spaced apart from the liquid supply tube TB, the nozzle NZ extends in the gravity direction, and the discharge port LOH is formed at the tip of the nozzle NZ in the gravity direction. Accordingly, in the printing apparatus 1, it is possible to increase the clearance distance between the liquid supply tube TB and the waste liquid container WFB, as compared to a case in which the nozzles NZ extend parallel to the transport direction. As a result, in the printing apparatus 1, it is possible to reduce the occurrence of the problem in the liquid supply tube TB due to the contact between the waste liquid container WFB and the liquid supply tube TB.

Figure 14:
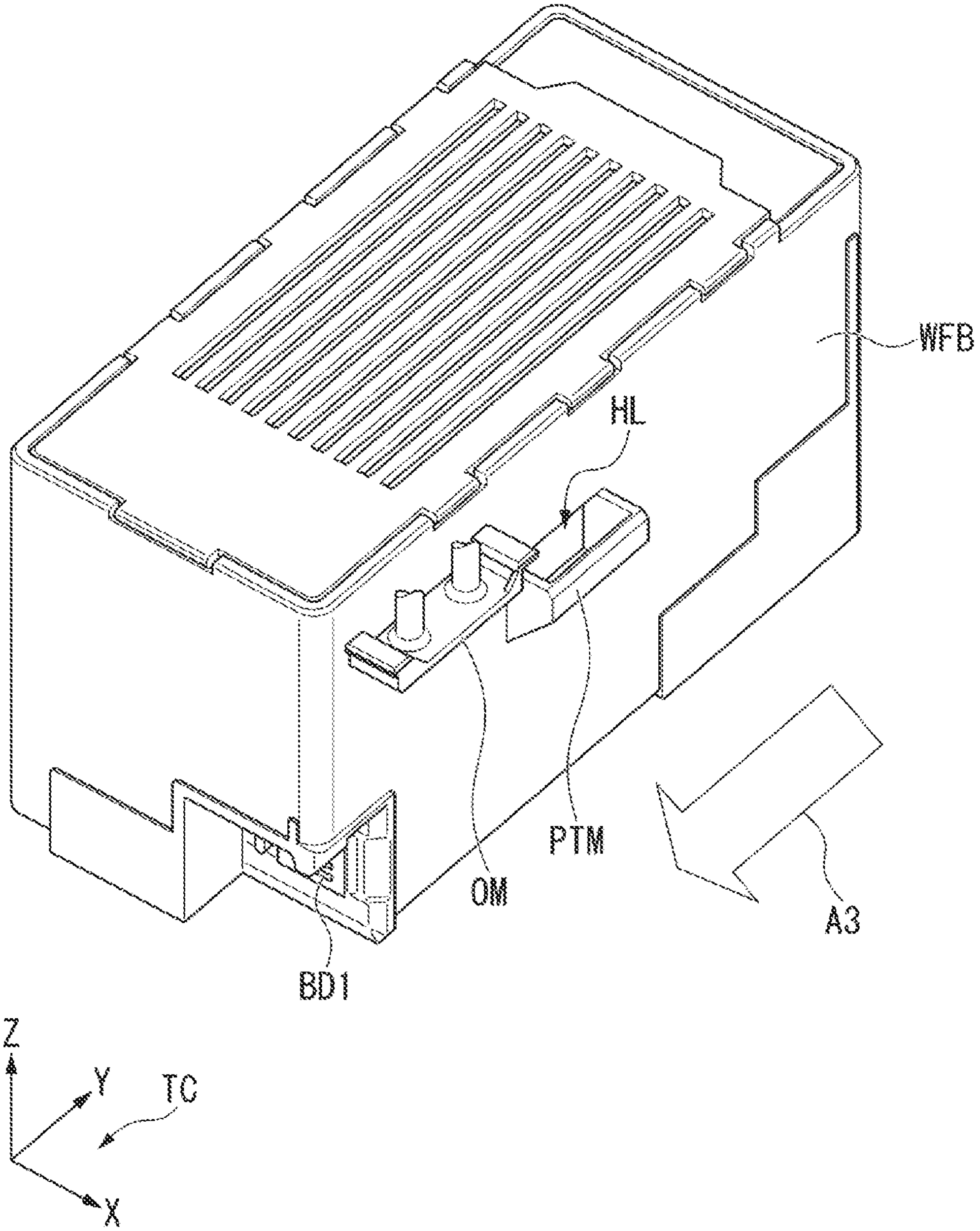
FIG. 14 is a diagram illustrating an example of a state in which a waste liquid container WFB is located at the second position located downstream of the first position in a scanning direction.

Although in the printing apparatus 1 described above, the second position is located upstream of the first position in the transport direction, the second position may be located upstream or downstream of the first position in the scanning direction instead of being located upstream of the first position in the transport direction. FIG. 14 is a diagram illustrating an example of a state in which the waste liquid container WFB is located at a second position located downstream of the first position in the scanning direction. In FIG. 14, the discharge portion OM is illustrated together with the waste liquid container WFB. In this case, in the printing apparatus 1, it is possible to increase the clearance distance by a length of the protrusion portion PTM in the transport direction, as compared to a case in which the second position is located upstream of the first position in the transport direction. This is because the protrusion portion PTM of the waste liquid container WFB at the second position is arranged with the discharge portion OM in the gravity direction when viewed from the scanning direction, as illustrated in FIG. 14. However, in this case, a distance between the waste liquid container WFB located at the first position and the liquid supply tube TB is equal to the distance between the waste liquid container WFB located at the second position and the liquid supply tube TB. Here, when the second position is located downstream of the first position in the scanning direction, the user can move the waste liquid container WFB from the second position to the first position by moving the waste liquid container WFB in the direction opposite to the scanning direction. However, in this case, the circuit board BD1 of the waste liquid container WFB is coupled to the board coupling unit BD2 provided in the holding portion HLD in the direction opposite to the scanning direction. In FIG. 14, the direction opposite to the scanning direction is indicated by an arrow A3. Further, when the second position is located upstream of the first position in the scanning direction, the user can move the waste liquid container WFB from the second position to the first position by moving the waste liquid container WFB in the scanning direction. Further, in this case, the circuit board BD1 of the waste liquid container WFB is coupled to the board coupling unit BD2 provided in the holding portion HLD in the direction opposite to the scanning direction.

Figure 15:
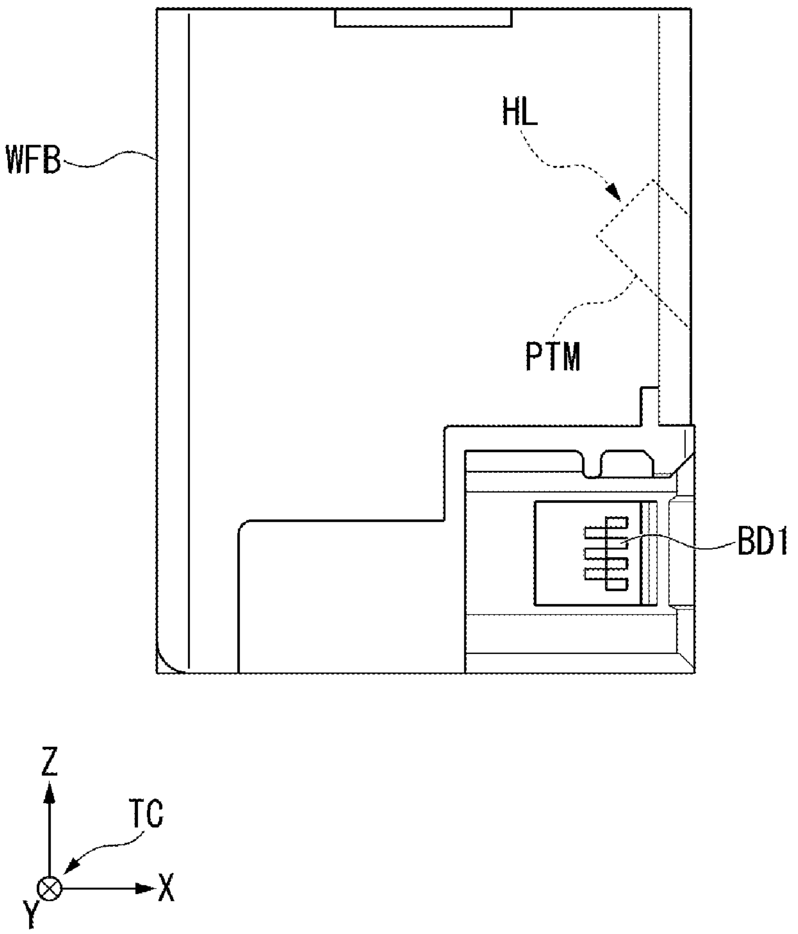
FIG. 15 is a side view illustrating another example of the configuration of the waste liquid container WFB.

In the printing apparatus 1 described above, the protrusion portion PTM may be provided in the waste liquid container WFB to be switchable between a state in which the protrusion portion PTM protrudes from the surface in the transport direction among the surface of the waste liquid container WFB and a state in which the protrusion portion PTM is contained in the waste liquid container WFB. FIG. 15 is a side view illustrating another example of the configuration of the waste liquid container WFB. In the example illustrated in FIG. 15, a state of the protrusion portion PTM of the waste liquid container WFB is a state in which the protrusion portion PTM is contained in the waste liquid container WFB. Therefore, in FIG. 15, an outline of the protrusion portion PTM contained inside the waste liquid container WFB is indicated by a dotted line. In the printing apparatus 1, when the protrusion portion PTM is contained inside the waste liquid container WFB in this way, it is possible to increase the clearance distance by the length of the protrusion portion PTM in the transport direction. This is because, when the protrusion portion PTM is contained inside the waste liquid container WFB, the protrusion portion PTM does not interfere with the discharge portion OM even when the waste liquid container WFB is inserted into the holding portion HLD from the upper side to the lower side, and thus the second position can be made closer to the first position or the second position can be made to match the first position. Here, the hole HL opens upward on the upper surface of the protrusion portion PTM in a state in which the protrusion portion PTM protrudes from the surface in the transport direction among the surfaces of the waste liquid container WFB. For example, when the protrusion portion PTM is contained inside the waste liquid container WFB and when the second position matches the first position, the user positions the waste liquid container WFB at the first position and then switches the state of the protrusion portion PTM to the state in which the protrusion portion PTM protrudes from the surface in the transport direction among the surface of the waste liquid container WFB. This makes it possible for the user to attach the waste liquid container WFB to the printing apparatus 1. The protrusion portion PTM in the state in which the protrusion portion PTM protrudes from the surface in the transport direction among the surface of the waste liquid container WFB is illustrated in, for example, FIG. 10. Further, the waste liquid container WFB may be configured to include a mechanism that switches the state of the protrusion portion PTM from the state in which the protrusion portion PTM is contained in the waste liquid container WFB to the state in which the protrusion portion PTM protrudes from the surface of the waste liquid container WFB in the transport direction in a process of causing the holding portion HLD to hold the waste liquid container WFB. This mechanism may be a known mechanism or may be a mechanism to be developed in the future.

Further, when the waste liquid container WFB is replaced, the carriage CG described above is located at a carriage standby position which is determined in advance as a position at which the carriage CG is located. The carriage standby position is the position closer to the first end portion of the movement path PT2 in the scanning direction than the holding portion HLD when viewed from the transport direction. In other words, the carriage standby position is a position close to an end portion of the printing apparatus 1 in the scanning direction. In this case, the liquid supply tube TB and the holding portion HLD are disposed in a predetermined disposition region in the printing apparatus 1. The disposition region is a region located at a position close to an end portion of the printing apparatus 1 in the direction opposite to the scanning direction when viewed from the transport direction. That is, in the printing apparatus 1, the disposition region and the carriage standby position are arranged in an order of the disposition region and the carriage standby position in the scanning direction when viewed from the transport direction. Here, the carriage standby position is, for example, a position at which the carriage CG in the region RA1 illustrated in FIG. 4 is located. Further, the disposition region is, for example, the region RA2 illustrated in FIG. 4.

Modification Example 1 of Embodiment

Hereinafter, Modification Example 1 of the embodiment is described with reference to the drawings.

Overview of Printing Apparatus According to Modification Example 1 of Embodiment.

First, an overview of a printing apparatus according to Modification Example 1 of the embodiment will be described.

The printing apparatus according to Modification Example 1 of the embodiment includes a transport unit, a printing head, a carriage, a liquid container coupling portion, a liquid supply tube, a holding portion, and a discharge portion. The transport unit transports the printing medium in the transport direction. The printing head prints an image on the printing medium. The carriage moves the printing head back and forth in the scanning direction intersecting the transport direction above the transport path of the printing medium. The liquid container that contains a liquid to be supplied to the printing head is coupled to the liquid container coupling portion. The liquid supply tube is coupled to the liquid container coupling portion and supplies liquid from the liquid container to the printing head via the liquid container coupling portion. The holding portion holds a waste liquid container capable of containing a waste liquid discharged from the printing head. The discharge portion includes a nozzle in which a discharge port for discharging the waste liquid is formed. Further, the holding portion is disposed at a position at which the waste liquid container region overlapping the waste liquid container held by the holding portion and a part of the movement path overlap when viewed from the transport direction in the region inside the printing apparatus above the transport path and downstream of the movement path of the carriage in the transport direction. Further, the portion of the liquid supply tube is located between the movement path and the waste liquid container region when viewed from the gravity direction, and overlaps the waste liquid container region when viewed from the transport direction. Further, the waste liquid container can be coupled to the nozzle. Further, the nozzle extends in a discharge port protrusion direction indicated by a composite vector of a vector indicating the direction opposite to the transport direction and a vector indicating the direction opposite to the gravity direction. The discharge port is formed at a tip of the nozzle in the discharge port protrusion direction. Accordingly, in the printing apparatus, the waste liquid container is coupled to the nozzle toward a direction opposite to the discharge port protrusion direction in which the nozzle extends. Therefore, in the printing apparatus, a distance between the waste liquid container and the liquid supply tube becomes larger as the waste liquid container comes closer to the holding portion and as the waste liquid container comes closer to the nozzle. Therefore, in the printing apparatus, it is possible to reduce contact of the waste liquid container with the liquid supply tube when the waste liquid container is attached and detached, and as a result, it is possible to reduce the occurrence of the problem in the liquid supply tube due to the contact between the waste liquid container and the liquid supply tube.

Hereinafter, a configuration of the printing apparatus according to Modification Example 1 of the embodiment will be described in detail.

Configuration of Printing Apparatus According to Modification Example 1 of Embodiment Hereinafter, Modification Example 1 of the embodiment will be described. In Modification Example 1 of the embodiment, the same constituent portions as in Modification Example 1 of the embodiment are denoted by the same reference numerals, and description thereof will be omitted. Some or all of matters described in Modification Example 1 of the embodiment may be combined in any manner with some or all of matters described in the embodiment.

In Modification Example 1 of the embodiment, the waste liquid container WFB can be coupled to the nozzle NZ of the discharge portion OM. In Modification Example 1 of the embodiment, the nozzle NZ extends in the discharge port protrusion direction indicated by the composite vector of a vector indicating the direction opposite to the transport direction and a vector indicating the direction opposite to the gravity direction. In other words, in Modification Example 1 of the embodiment, the nozzle NZ extends in the discharge port protrusion direction with an obliquely upward direction with respect to the direction opposite to the transport direction as the discharge port protrusion direction. Therefore, in Modification Example 1 of the embodiment, when the user attaches the waste liquid container WFB to the printing apparatus 1, that is, when the user couples the waste liquid container WFB to the nozzle NZ, the user can directly move the waste liquid container WFB to the first position without passing through the second position and can cause the holding portion HLD to hold the waste liquid container WFB, by moving the waste liquid container WFB in the direction opposite to the discharge port protrusion direction. To this end, the holding portion HLD according to Modification Example 1 of the embodiment holds the waste liquid container WFB so that the waste liquid container WFB is unable to move at a position determined in advance as a position at which the waste liquid container WFB is held. In Modification Example 1 of the embodiment, a case in which the position is the first position described in the embodiment will be described as an example. In this case, the user cannot move the waste liquid container WFB located at the first position on the holding portion HLD.

Figure 16:
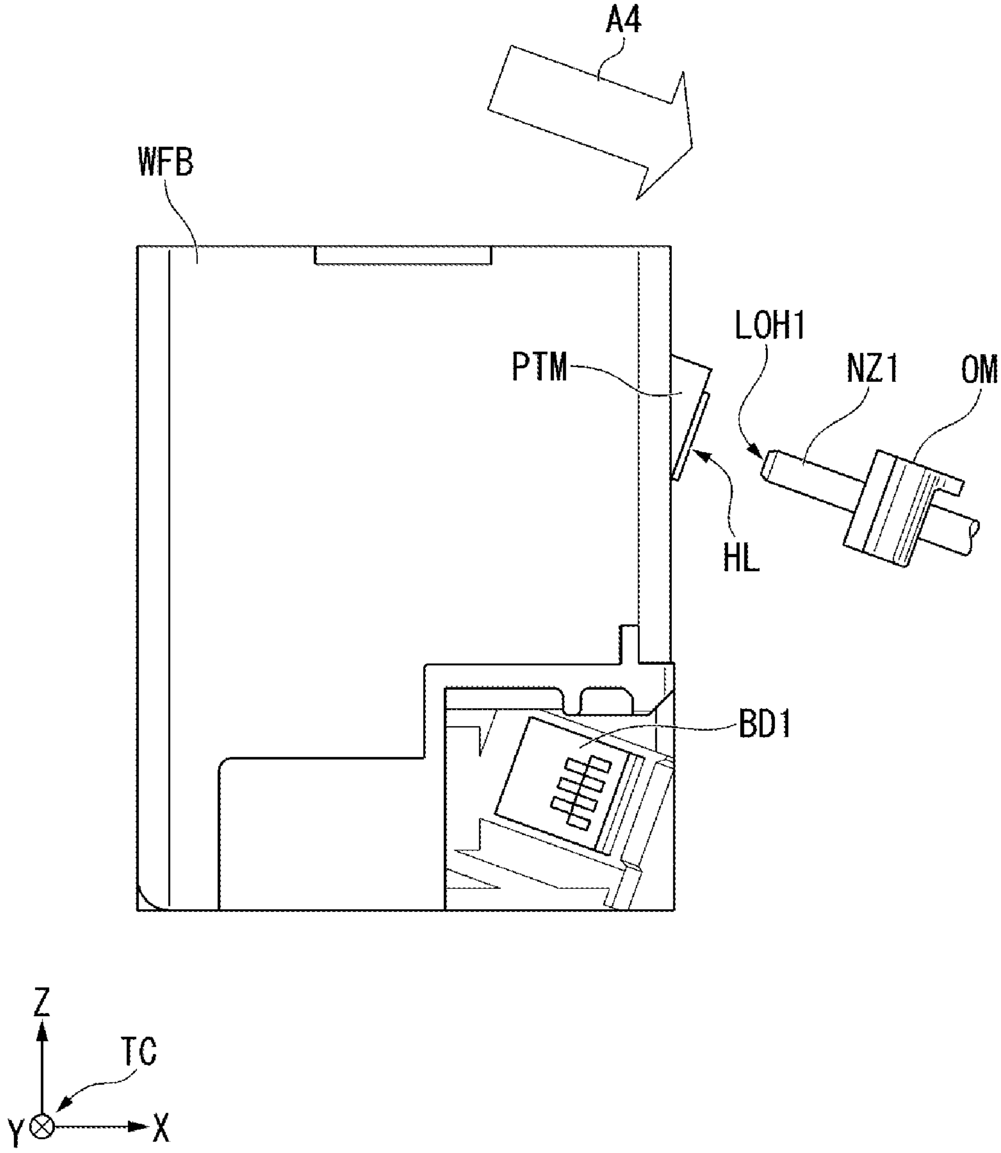
FIG. 16 is a side view illustrating a configuration according to Modification Example 1 of the embodiment.

FIG. 16 is a side view illustrating an example of the discharge portion OM according to Modification Example 1 of the embodiment. In FIG. 16, the waste liquid container WFB is illustrated together with the discharge portion OM. As illustrated in FIG. 16, the discharge portion OM extends in the discharge port protrusion direction indicated by the composite vector of a vector indicating the direction opposite to the transport direction and a vector indicating the direction opposite to the gravity direction. In the example illustrated in FIG. 16, the discharge port protrusion direction is a direction opposite to a direction indicated by an arrow A4. Therefore, in this example, the user can couple the waste liquid container WFB to the nozzle NZ by moving the waste liquid container WFB in the direction indicated by the arrow A4.

Here, in Modification Example 1 of the embodiment, the discharge port LOH of the protrusion portion PTM does not open upward in a state in which the waste liquid container WFB is held on the holding portion HLD, but opens in the direction opposite to the discharge port protrusion direction in this state as illustrated in FIG. 16. Therefore, the user can couple the waste liquid container WFB to the nozzle NZ without passing through the second position, by moving the waste liquid container WFB in the direction indicated by the arrow A4, as described above.

Figure 17:
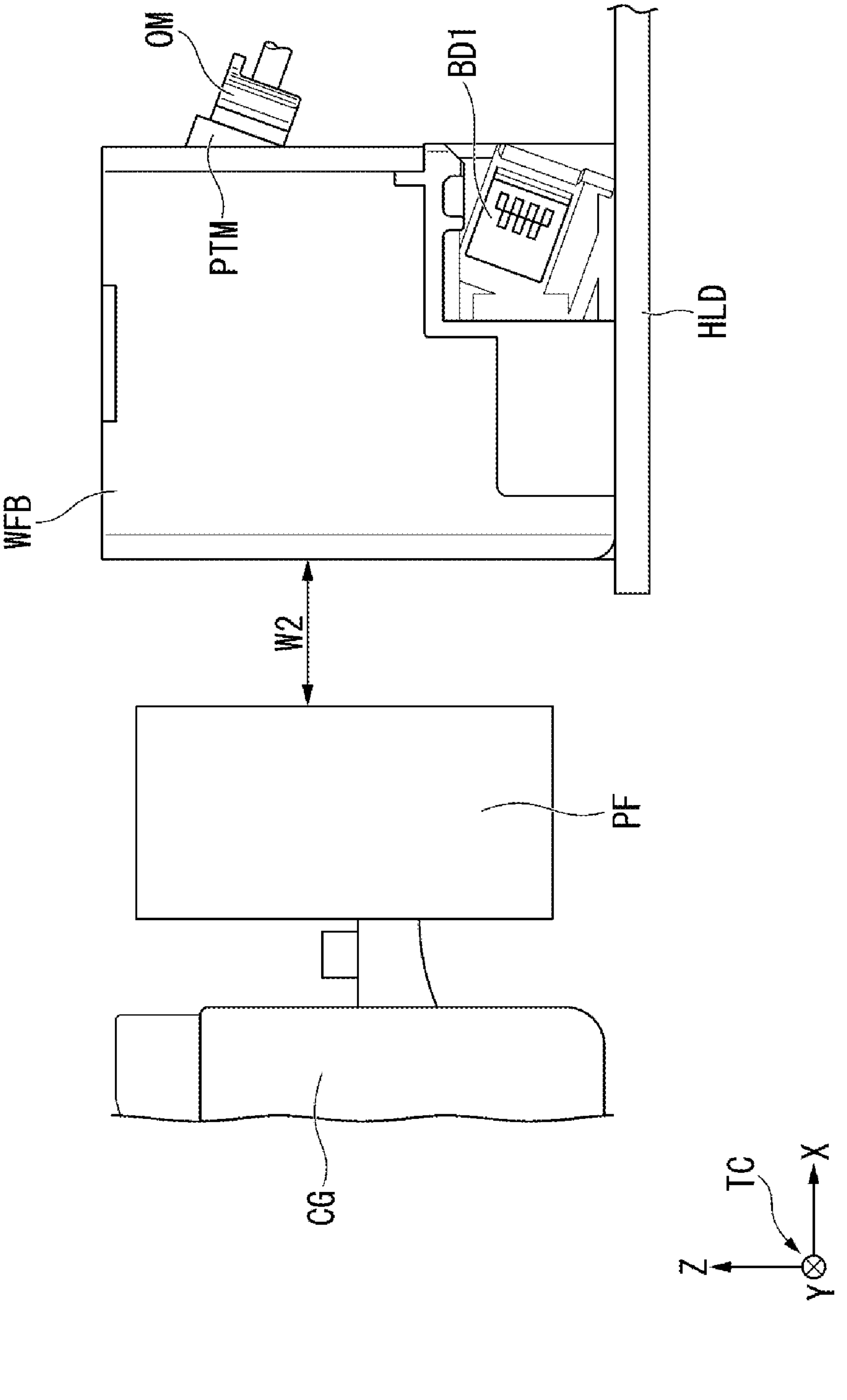
FIG. 17 is a side view illustrating an example of a state in which the waste liquid container WFB and the nozzle NZ illustrated in FIG. 16 are coupled to each other.

FIG. 17 is a side view illustrating an example of a state in which the waste liquid container WFB and the nozzle NZ illustrated in FIG. 16 are coupled to each other. In FIG. 17, the holding portion HLD, the carriage CG, and the protection member PF are illustrated together with the waste liquid container WFB and the discharge portion OM. As illustrated in FIG. 17, when the waste liquid container WFB is coupled to the nozzle NZ, the waste liquid container WFB is located at the first position on the holding portion HLD, and thus is spaced apart from the protection member PF in the transport direction. In the example illustrated in FIG. 17, the distance between the waste liquid container WFB and the protection member PF in this case is the above-described distance W2.

When the waste liquid container WFB is moved in the direction opposite to the discharge port protrusion direction, the distance between the waste liquid container WFB and the liquid supply tube TB gradually increases toward the distance W2. This is because the direction opposite to the discharge port protrusion direction is the direction indicated by a composite vector of a vector indicating the transport direction and a vector indicating the gravity direction. This means that, when the waste liquid container WFB is attached to the printing apparatus 1, the waste liquid container WFB does not come into contact with the liquid supply tube TB unless the waste liquid container WFB is intentionally brought into contact with the liquid supply tube TB. On the other hand, when the waste liquid container WFB is removed from the printing apparatus 1, there is a likelihood that the waste liquid container WFB comes into contact with the liquid supply tube TB. However, in this case, the user pulls out the waste liquid container WFB in the discharge port protrusion direction. Therefore, in this case, as the waste liquid container WFB approaches the liquid supply tube TB, the waste liquid container WFB moves upward with respect to the liquid supply tube TB. Accordingly, in this case, the likelihood that the waste liquid container WFB comes into contact with the liquid supply tube TB is lower than that when the waste liquid container WFB is moved on the holding portion HLD in the direction opposite to the transport direction. That is, in the printing apparatus 1, since the nozzle NZ extends in the discharge port protrusion direction indicated by the composite vector of a vector indicating the direction opposite to the transport direction and a vector indicating the direction opposite to the gravity direction, it is possible to reduce the contact between the waste liquid container WFB and the liquid supply tube TB.

When the waste liquid container WFB is attached to the printing apparatus 1, the user couples the waste liquid container WFB to the nozzle NZ by moving the waste liquid container WFB in the direction opposite to the discharge port protrusion direction, and thus, the circuit board BD1 of the waste liquid container WFB is coupled to the board coupling unit BD2 of the holding portion HLD in the direction.

Further, in the printing apparatus 1 according to Modification Example 1 of the embodiment, the waste liquid container WFB may not be provided with the protrusion portion PTM. In this case, the discharge port LOH is formed at the surface of the waste liquid container WFB in the transport direction.

As described above, the printing apparatus 1 according to Modification Example 1 of the embodiment is the printing apparatus including the transport unit H that transports the printing medium in the transport direction, the printing head HD that prints the image on the print medium, the carriage CG that moves the printing head HD back and forth above the transport path PT1 of the printing medium in the scanning direction intersecting the transport direction, the liquid container coupling portion CN11 to which the liquid container CT that contains ink to be supplied to the printing head HD is coupled, the liquid supply tube TB coupled to the liquid container coupling portion CN11 to supply ink from the liquid container CT to the printing head HD via the liquid container coupling portion CN11, the holding portion HLD that holds the waste liquid container WFB capable of containing the waste liquid discharged from the printing head HD, and the discharge portion OM including the nozzle NZ that discharges in which a discharge port for discharging the waste liquid is formed, wherein the holding portion HLD is disposed at a position at which the waste liquid container region overlapping the waste liquid container WFB held by the holding portion HLD in the region inside the printing apparatus 1 and a part of the movement path PT2 overlap when viewed from the transport direction, above the transport path PT1 and downstream of the movement path PT2 of the carriage CG in the transport direction, a portion of the liquid supply tube TB is located between the movement path PT2 and the waste liquid container region when viewed from the gravity direction and overlaps the waste liquid container region when viewed from the transport direction, the waste liquid container WFB can be coupled to the nozzle NZ, the nozzle NZ extends in the discharge port protrusion direction indicated by the composite vector of a vector indicating the direction opposite to the transport direction and a vector indicating the direction opposite to the gravity direction, and the discharge port is formed at the tip of the nozzle NZ in the discharge port protrusion direction. Accordingly, in the printing apparatus 1, the waste liquid container WFB is coupled to the nozzle NZ in the direction opposite to the discharge port protrusion direction in which the nozzle NZ extends. Therefore, in the printing apparatus 1, the distance between the waste liquid container WFB and the liquid supply tube TB becomes larger as the waste liquid container WFB approaches the holding portion HLD and as the waste liquid container WFB approaches the nozzle NZ. Therefore, in the printing apparatus 1, it is possible to reduce contact of the waste liquid container WFB with the liquid supply tube TB in attachment and detachment of the waste liquid container WFB, and as a result, it is possible to reduce the occurrence of the problem in the liquid supply tube TB due to the contact between the waste liquid container WFB and the liquid supply tube TB.

Modification Example 2 of Embodiment

Hereinafter, Modification Example 2 of the embodiment of the present disclosure will be described with reference to the drawings.

Overview of Printing Apparatus According to Modification Example 2 of Embodiment.

First, an overview of a printing apparatus according to Modification Example 2 of the embodiment will be described.

The printing apparatus according to Modification Example 2 of the embodiment includes a transport unit, a printing head, a carriage, a liquid container coupling portion, a liquid supply tube, a holding portion, and a discharge portion. The transport unit transports the printing medium in the transport direction. The printing head prints an image on the printing medium. The carriage moves the printing head back and forth in the scanning direction intersecting the transport direction above the transport path of the printing medium. The liquid container that contains a liquid to be supplied to the printing head is coupled to the liquid container coupling portion. The liquid supply tube is coupled to the liquid container coupling portion and supplies liquid from the liquid container to the printing head via the liquid container coupling portion. The holding portion holds a waste liquid container capable of containing a waste liquid discharged from the printing head. The discharge portion includes a nozzle in which a discharge port for discharging the waste liquid is formed. Further, the holding portion is disposed at a position at which the waste liquid container region overlapping the waste liquid container held by the holding portion and a part of the movement path overlap when viewed from the transport direction in the region inside the printing apparatus above the transport path and downstream of the movement path of the carriage in the transport direction. Further, the portion of the liquid supply tube is located between the movement path and the waste liquid container region when viewed from the gravity direction, and overlaps the waste liquid container region when viewed from the transport direction. Further, the waste liquid container region is spaced apart from the liquid supply tube. The discharge portion is provided in the holding portion and is movable between a third position determined in advance as a position at which the discharge portion discharges the waste liquid to the waste liquid container and a fourth position determined in advance as a position at which the discharge portion does not discharge the waste liquid to the waste liquid container. Accordingly, in the printing apparatus, it is not necessary to move the waste liquid container in parallel with the transport direction on the holding portion when the waste liquid container is attached and detached. That is, in the printing apparatus, it is possible to reduce a chance of the contact between the waste liquid container and the liquid supply tube in attachment and detachment of the waste liquid container. As a result, in the printing apparatus, it is possible to reduce contact of the waste liquid container with the liquid supply tube when the waste liquid container is attached and detached, and it is possible to reduce the occurrence of the problem in the liquid supply tube due to the contact between the waste liquid container and the liquid supply tube.

Hereinafter, a configuration of the printing apparatus according to Modification Example 2 of the embodiment will be described in detail.

Configuration of Printing Apparatus According to Modification Example 2 of Embodiment Hereinafter, Modification Example 2 of the embodiment will be described. In Modification Example 2 of the embodiment, the same constituent portions as in the embodiment are denoted by the same reference numerals, and description thereof will be omitted. Some or all of matters described in Modification Example 2 of the embodiment may be combined in any manner with some or all of the matters described in each of the embodiment and Modification Example 1 of the embodiment.

In the embodiment, when the user attaches the waste liquid container WFB to the printing apparatus 1, the user places the waste liquid container WFB at the first position via the second position. Further, in the embodiment, when the user removes the waste liquid container WFB from the printing apparatus 1, the user pulls out the waste liquid container WFB upward via the second position. That is, in the embodiment, the user needs to move the waste liquid container WFB on the holding portion HLD in parallel with the transport direction. Therefore, in the printing apparatus 1 of the embodiment, it is possible to reduce the contact between the waste liquid container WFB and the liquid supply tube TB by increasing the clearance distance. On the other hand, in Modification Example 2 of the embodiment, the holding portion HLD holds the waste liquid container WFB so that the waste liquid container WFB is unable to move at a position determined in advance as a position at which the waste liquid container WFB is held. In Modification Example 2 of the embodiment, a case in which the position is the first position described in the embodiment will be described as an example. In this case, the user cannot move the waste liquid container WFB located at the first position on the holding portion HLD. In Modification Example 2 of the embodiment, the printing apparatus 1 is configured such that the discharge portion OM moves relative to the waste liquid container WFB held at the first position by the holding portion HLD. Therefore, in Modification Example 2 of the embodiment, the user can position the waste liquid container WFB at the first position, that is, can attach the waste liquid container WFB to the printing apparatus 1, by simply placing the waste liquid container WFB on the holding portion HLD from the upper side to the lower side. Accordingly, in the printing apparatus 1, the contact between the waste liquid container WFB and the liquid supply tube TB due to movement of the waste liquid container WFB between the second position and the first position does not occur. Therefore, in the printing apparatus 1, it is possible to reduce the contact between the waste liquid container WFB and the liquid supply tube TB, and it is possible to reduce the occurrence of the problem in the liquid supply tube TB due to the contact between the waste liquid container WFB and the liquid supply tube TB.

Figure 18:
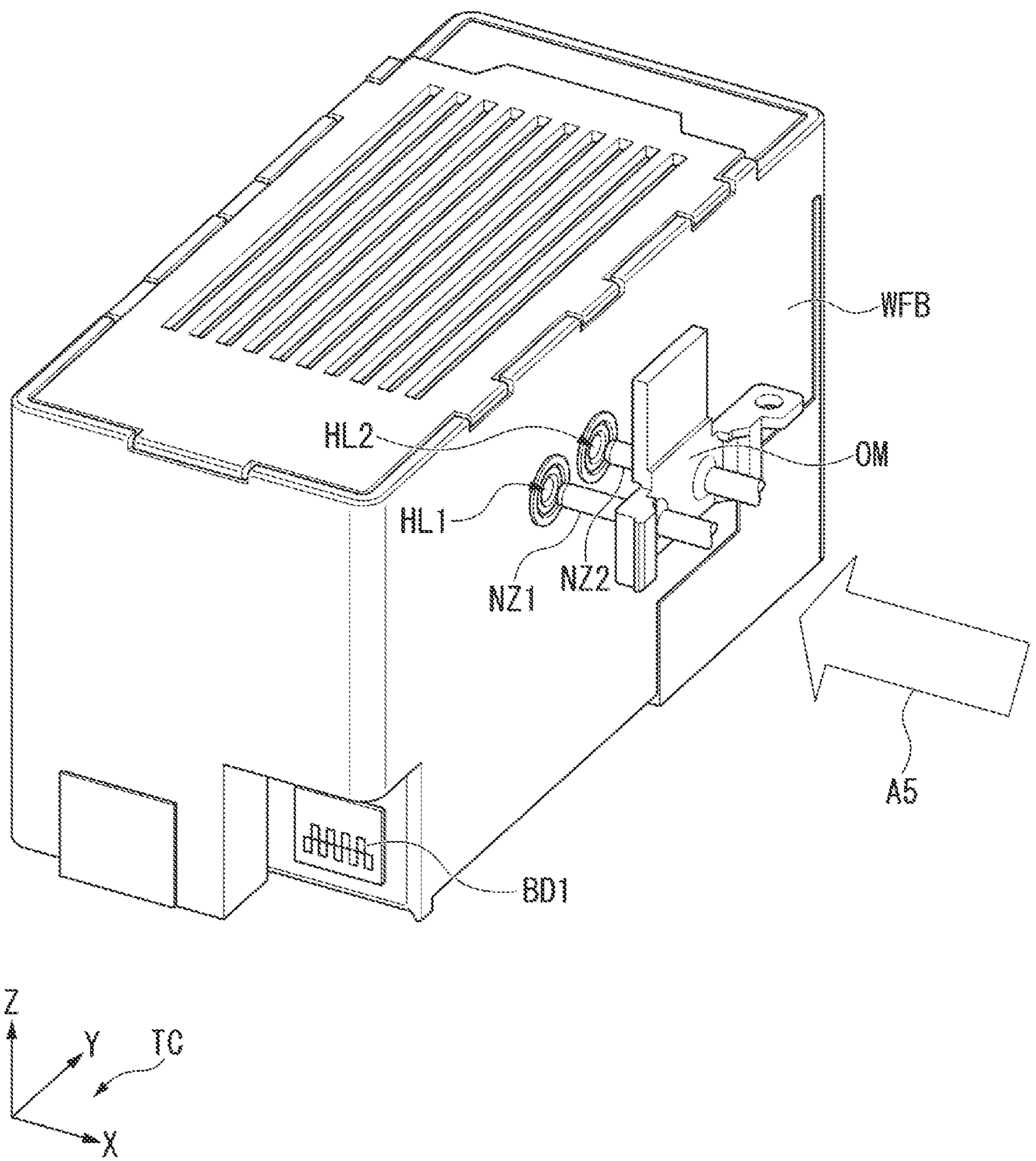
FIG. 18 is a side view illustrating an example of the discharge portion OM according to Modification Example 2 of the embodiment.

FIG. 18 is a side view illustrating an example of the discharge portion OM according to Modification Example 2 of the embodiment. In FIG. 18, the waste liquid container WFB located at the first position on the holding portion HLD together with the discharge portion OM is illustrated. In FIG. 18, the holding portion HLD is omitted in order to prevent FIG. 18 from becoming complicated.

In Modification Example 2 of the embodiment, the waste liquid container WFB can be coupled to the nozzle NZ of the discharge portion OM. Hereinafter, a case in which the waste liquid container WFB is not provided with the protrusion portion PTM as illustrated in FIG. 18 will be described as an example. Further, hereinafter, a case in which a hole HL1 coupled to the nozzle NZ1 and a hole HL2 coupled to the nozzle NZ2 are formed at the surface of the waste liquid container WFB in the transport direction will be described as an example. The hole HL1 is a hole through which the waste liquid from the nozzle NZ1 passes from the outside of the waste liquid container WFB to the inside of the waste liquid container WFB. The hole HL2 is a hole through which the waste liquid from the nozzle NZ2 passes from the outside of the waste liquid container WFB to the inside of the waste liquid container WFB. The waste liquid container WFB may be provided with a protrusion portion PTM. Further, the hole HL1 and the hole HL2 may be formed as one hole HL on the surface of the waste liquid container WFB in the transport direction.

In Modification Example 2 of the embodiment, the printing apparatus 1 includes the discharge portion OM which is movable relative to the waste liquid container WFB located at the first position on the holding portion HLD. Specifically, the discharge portion OM is movable between the third position determined in advance as a position at which the discharge portion OM discharges the waste liquid to the waste liquid container WFB and the fourth position determined in advance as a position at which the discharge portion OM does not discharge the waste liquid to the waste liquid container WFB. In other words, the third position is a position at which the nozzle NZ1 is coupled to the hole HL1 and the nozzle NZ2 is coupled to the hole HL2 among positions at which the discharge portion OM can be located. In other words, the fourth position may be any position as long as the entire discharge portion OM does not overlap the waste liquid container region among the positions in which the discharge portion OM can be located.

Figure 19:
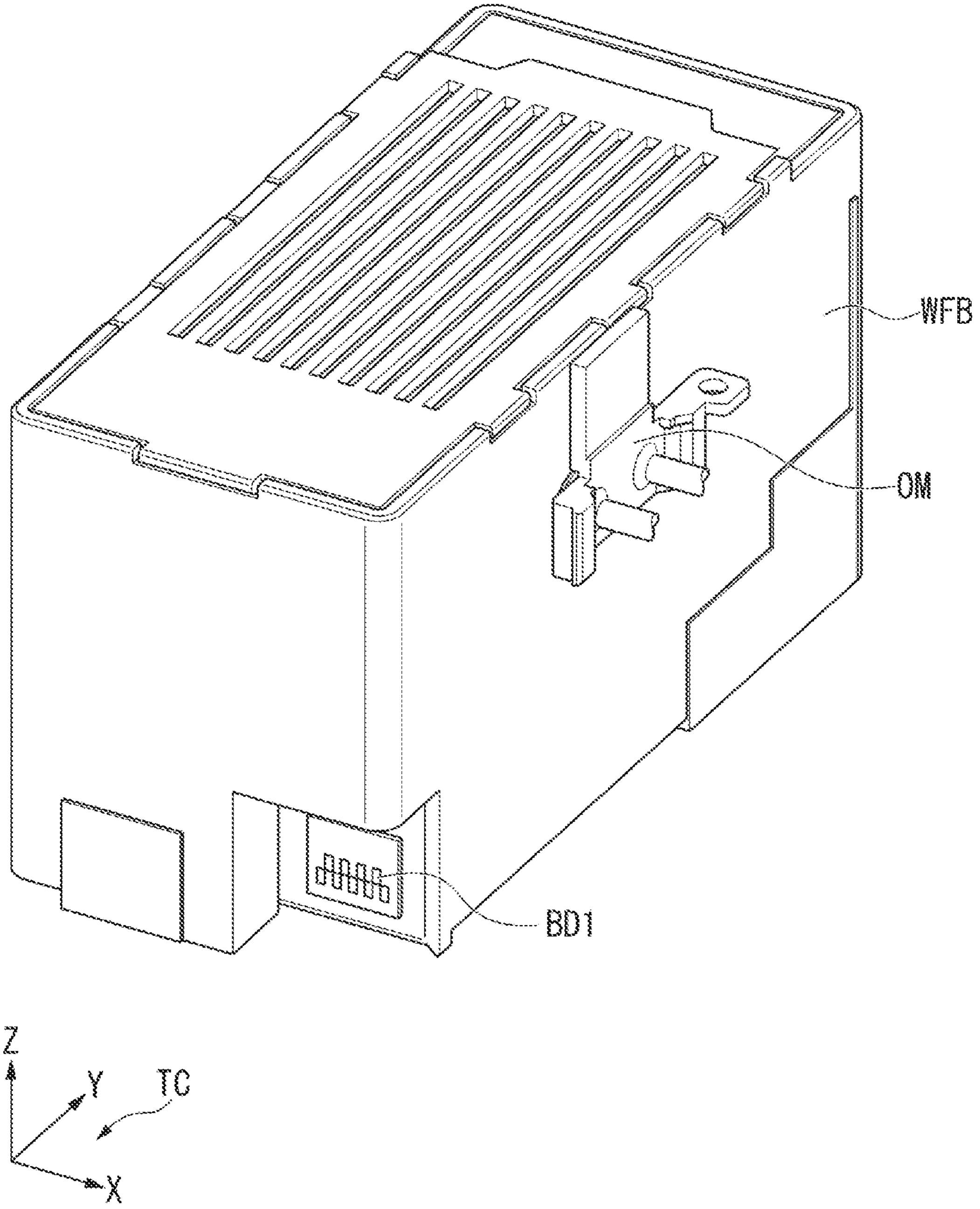
FIG. 19 is a perspective view illustrating an example of a state in which a nozzle NZ1 of the discharge portion OM illustrated in FIG. 18 is coupled to a hole HL1 and a nozzle NZ2 is coupled to a hole HL2.

In the example illustrated in FIG. 18, the discharge portion OM is provided in the holding portion HLD to be movable back and forth between the third position and the fourth position in the transport direction. Therefore, in this example, the discharge portion OM can couple the nozzle NZ1 to the hole HL1 and couple the nozzle NZ2 to the hole HL2 by moving in a direction indicated by an arrow A5, that is, a direction opposite to the transport direction. In this case, the third position is located upstream of the fourth position in the transport direction. A mechanism for realizing such movement of the discharge portion OM may be a known mechanism or may be a mechanism to be developed in the future. In FIG. 18, a mechanism for realizing such a movement of the discharge portion OM is omitted in order to prevent FIG. 18 from becoming complicated. Further, FIG. 19 is a perspective view illustrating an example of a state in which the nozzle NZ1 of the discharge portion OM illustrated in FIG. 18 is coupled to the hole HL1 and the nozzle NZ2 is coupled to the hole HL2.

Such movement of the discharge portion OM with respect to the waste liquid container WFB may be regarded as movement with respect to the holding portion HLD, the waste liquid container region, or the like. Here, the printing apparatus 1 may have a configuration in which the discharge portion OM is manually moved between the third position and the fourth position by the user, or may have a configuration in which the discharge portion OM is automatically moved between the third position and the fourth position by an actuator or the like. The printing apparatus 1 may be configured to move between the third position and the fourth position using another method. For example, the printing apparatus 1 may include an operating portion OPR that moves the discharge portion OM from the fourth position to the third position in response to a received operation. The operating portion OPR may be, for example, a member that receives a manual operation from the user, such as a lever, may be a member that receives an operation from an actuator or the like, or may be any member as long as the member can receive an operation. The operating portion OPR is provided above the discharge portion OM. Accordingly, the printing apparatus 1 allows the user to easily operate the operating portion OPR. The operating portion OPR may be provided at the same height as the operating portion OPR, or may be provided on the lower side relative to the operating portion OPR.

Further, in Modification Example 2 of the embodiment, the printing apparatus 1 may include a movement mechanism MM that moves the discharge portion OM from the fourth position to the third position in response to an operation received by the operating portion OPR together with the operating portion OPR. The movement mechanism MM may be any mechanism as long as the mechanism is a mechanism capable of moving the discharge portion OM from the fourth position to the third position in response to the operation received by the operating portion OPR.

Figure 20:
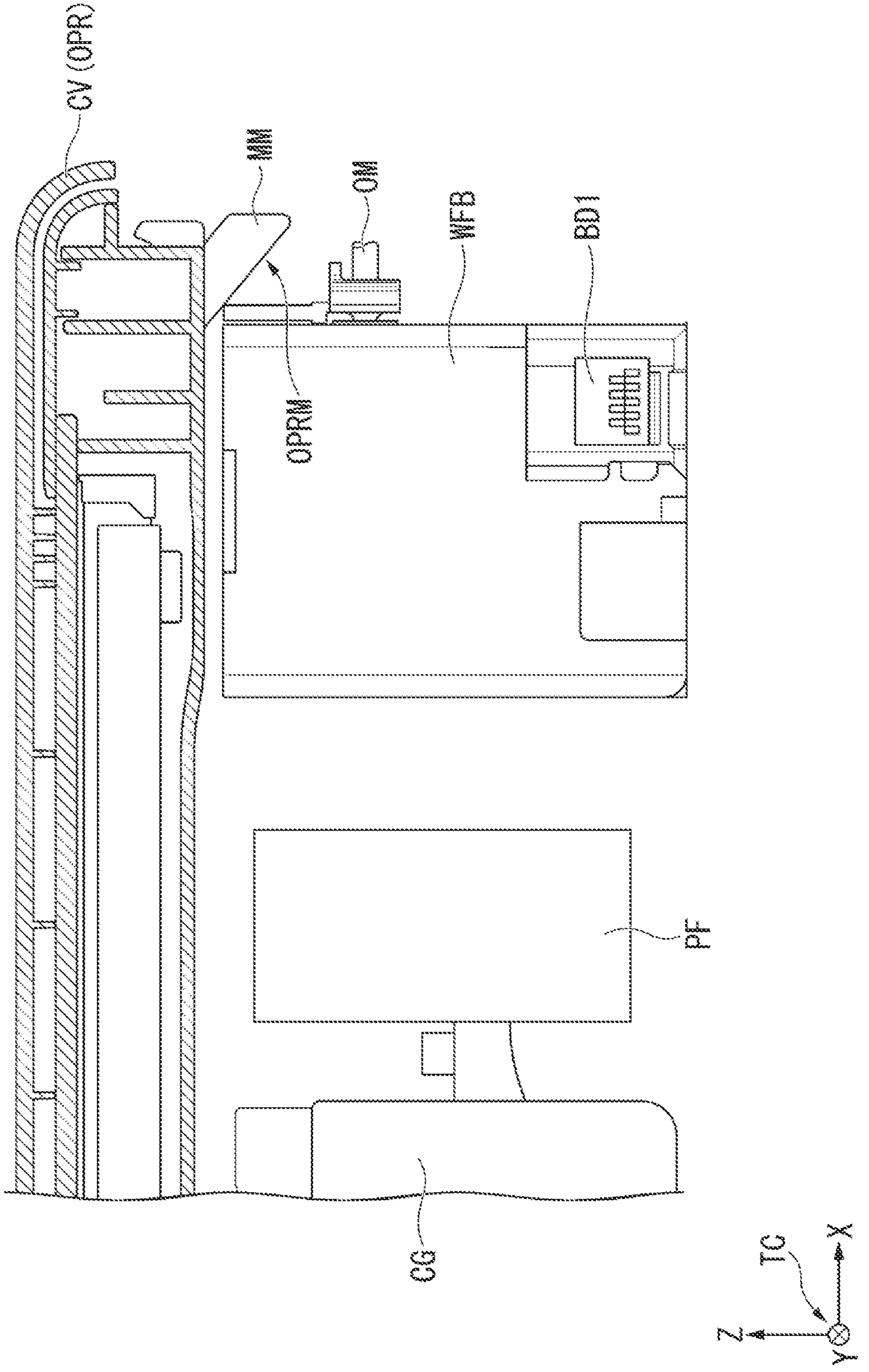
FIG. 20 is a side view illustrating an example of the cover CV functioning as the operating portion OPR together with the discharge portion OM and the waste liquid container WFB.

For example, the operating portion OPR may be formed integrally with the cover CV, as illustrated in FIG. 20. In other words, the operating portion OPR may be the cover CV itself. FIG. 20 is a side view illustrating an example of the cover CV functioning as the operating portion OPR together with the discharge portion OM and the waste liquid container WFB. In FIG. 20, a state in which the opening of the housing BX is closed by the cover CV and the nozzle NZ of the discharge portion OM is coupled to the waste liquid container WFB is illustrated.

The operating portion OPR illustrated in FIG. 20 is the cover CV itself. The operating portion OPR which is the cover CV receives an operation of closing the opening of the housing BX with the cover CV as an operation of moving the discharge portion OM. The movement mechanism MM is provided in the cover CV to come into contact with the discharge portion OM from the upper side in a process of closing the opening of the housing BX with the cover CV. The movement mechanism MM includes a guide surface OPRM that comes into contact with the discharge portion OM from the upper side in the process of closing the opening of the housing BX with the cover CV. The guide surface OPRM guides the discharge portion OM from the fourth position toward the third position according to the downward movement. That is, the movement mechanism MM moves the discharge portion OM from the fourth position to the third position according to the movement of the cover CV. Here, the guide surface OPRM is a surface parallel to the scanning direction. Further, when the opening of the housing BX is closed by the cover CV, the guide surface OPRM is inclined with respect to an XY plane so that a height in the gravity direction increases in the direction opposite to the transport direction. The XY plane is a virtual plane defined by the X-axis and the Y-axis. Therefore, when the opening of the housing BX is closed by the cover CV, the discharge portion OM comes into contact with an end portion closer to the cover CV among end portions of the guide surface OPRM. Thus, since the cover CV serving as the operating portion OPR has the guide surface OPRM toward the waste liquid container WFB from the upper side, the operating portion OPR illustrated in FIG. 20 can receive an operation for closing the opening of the housing BX using the cover CV as an operation for moving the discharge portion OM. Accordingly, in the printing apparatus 1, it is possible to reduce the time and effort of the user required to couple the nozzles NZ to the hole HL. In the example illustrated in FIG. 20, the third position is located upstream of the fourth position in the transport direction.

Figure 21:
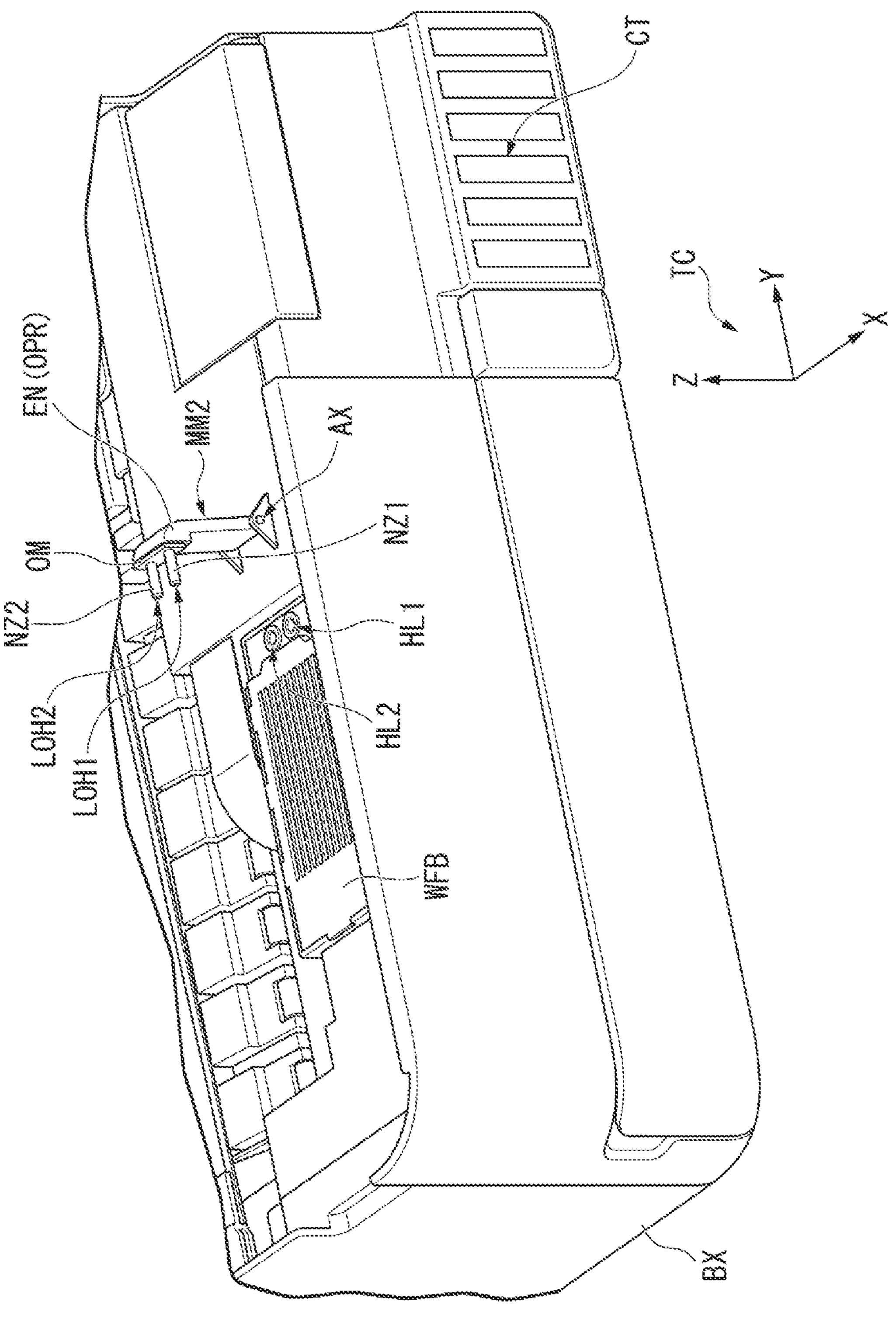
FIG. 21 is a perspective view illustrating an example of the waste liquid container WFB when the hole HL1 and the hole HL2 are formed in the upper surface.

The hole HL1 and the hole HL2 of the waste liquid container WFB may be formed at an upper surface of the waste liquid container WFB as illustrated in FIG. 21 instead of a surface in the transport direction of the waste liquid container WFB. FIG. 21 is a perspective view illustrating an example of the waste liquid container WFB when the hole HL1 and the hole HL2 are formed in the upper surface. In FIG. 21, a state in which the waste liquid container WFB is located at the first position in the holding portion HLD is illustrated. As illustrated in FIG. 21, the hole HL1 and the hole HL2 are formed in the upper surface of the waste liquid container WFB. In the example illustrated in FIG. 21, the hole HL1 and the hole HL2 are arranged in an order of the hole HL2 and the hole HL1 in the transport direction, and are formed at an end portion in the scanning direction of an upper surface of the waste liquid container WFB. When the hole HL1 and the hole HL2 are formed in the upper surface of the waste liquid container WFB as described above, the discharge portion OM is provided in the movement mechanism MM2 illustrated in FIG. 21.

The movement mechanism MM2 includes a first member EN that rotates around a predetermined rotation shaft AX and extends from the rotation shaft AX in a direction orthogonal to the rotation shaft AX. The first member EN is an example of a member that functions as the operating portion OPR in the movement mechanism MM2. That is, the user can couple the nozzle NZ of the discharge portion OM to the hole HL by performing an operation with respect to the first member EN. Here, in the example illustrated in FIG. 21, when the waste liquid container WFB is attached to the printing apparatus 1 and when viewed from the transport direction, the rotation shaft AX is located above the hole HL1 and the hole HL2. In other words, in this example, the rotation shaft AX is located above the waste liquid container region when viewed from the transport direction. Further, in this example, the rotation shaft AX is parallel to the transport direction. The rotation shaft AX is provided at a position at which the nozzle NZ1 can be coupled to the hole HL1 and the nozzle NZ2 can be coupled to the hole HL2 when the first member EN is rotated toward the waste liquid container WFB. The rotation shaft AX may not be parallel to the transport direction. Further, in the example illustrated in FIG. 21, both ends of the movement mechanism MM2 are included on the inner side of both ends of the waste liquid container WFB in the transport direction but, instead, at least one of both ends of the movement mechanism MM2 may deviate from the inner side of both ends of the waste liquid container WFB in the transport direction. Further, the rotation shaft AX may be located at the same height as the hole HL1 and the hole HL2 in the gravity direction when viewed from the transport direction instead of a configuration in which the rotation shaft AX is located above the hole HL1 and the hole HL2 when viewed from the transport direction, or may be located below the hole HL1 and the hole HL2 when viewed from the transport direction.

Figure 22:
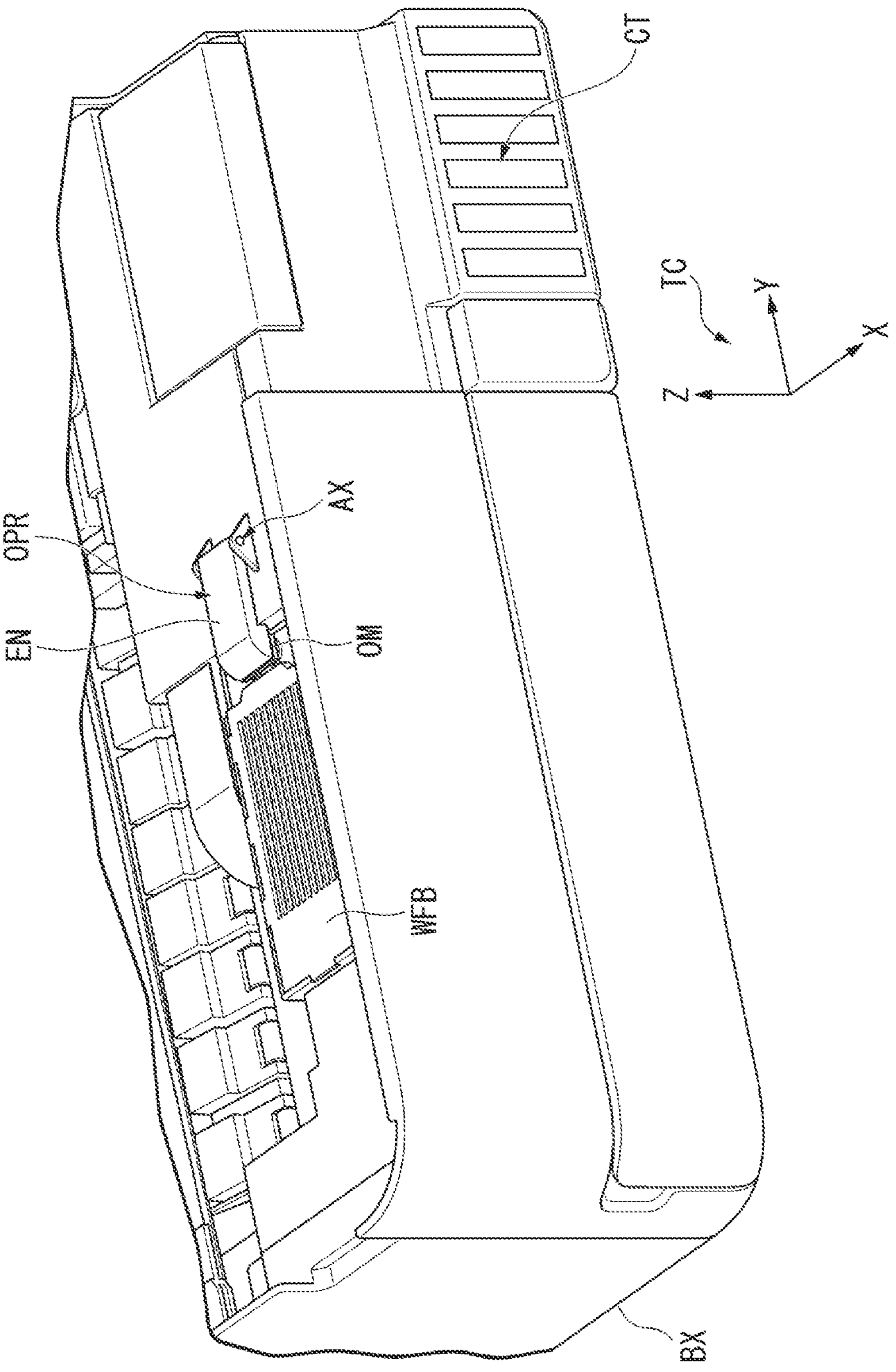
FIG. 22 is a diagram illustrating an example of a state in which the hole HL1 and the nozzle NZ1 are coupled to each other and the hole HL2 and the nozzle NZ2 are coupled to each other due to rotation of the first member EN.

The first member EN illustrated in FIG. 21 can rotate around the rotation shaft AX toward the waste liquid container WFB. Accordingly, the discharge portion OM can couple the nozzle NZ1 to the hole HL1 and couple the nozzle NZ2 to the hole HL2, as illustrated in FIG. 22. FIG. 22 is a diagram illustrating an example of a state in which the hole HL1 and the nozzle NZ1 are coupled to each other and the hole HL2 and the nozzle NZ2 are coupled to each other due to rotation of the first member EN. Here, in FIG. 22, a position at which the discharge portion OM is located when the hole HL1 and the nozzle NZ1 are coupled to each other and the hole HL2 and the nozzle NZ2 are coupled to each other is an example of the third position when the discharge portion OM is provided in the movement mechanism MM2. On the other hand, a position at which the discharge portion OM is located when the hole HL1 and the nozzle NZ1 are not coupled to each other and the hole HL2 and the nozzle NZ2 are not coupled to each other is an example of the fourth position when the discharge portion OM is provided in the movement mechanism MM2. For example, the fourth position when the discharge portion OM is provided in the movement mechanism MM2 is a position at which the discharge portion OM is located when a direction in which the first member EN extends matches the direction opposite to the gravity direction, that is, a position at which the discharge portion OM illustrated in FIG. 21 is located.

Here, in the printing apparatus 1, it is possible to make it easy for the user to operate the first member EN which is an example of the operating portion OPR when the rotation shaft AX is located above the hole HL1 and the hole HL2, as illustrated in FIGS. 21 and 22. This is because, in this case, a member interfering with a hand of the user when the user operates the first member EN is not located around the printing apparatus 1. Further, in this case, in the printing apparatus 1, it is possible to reliably perform each of the coupling between the nozzle NZ1 and the hole HL1 and the coupling between the nozzle NZ2 and the hole HL2.

The movement mechanism MM2 may be applied to the coupling between the waste liquid container WFB and the discharge portion OM when the hole HL1 and the hole HL2 are formed at an upper end of a side surface of the waste liquid container WFB. Further, the movement mechanism MM2 may be applied to the coupling between the waste liquid container WFB and the discharge portion OM when the hole HL1 and the hole HL2 are formed at an upper end of a front surface of the waste liquid container WFB. Further, the movement mechanism MM2 may be applied to the coupling between the waste liquid container WFB and the discharge portion OM when the hole HL1 and the hole HL2 are formed at an upper end of a rear surface of the waste liquid container WFB. In these cases, in the printing apparatus 1, it is possible to make it easy for the user to operate the first member EN which is an example of the operating portion OPR, by having a configuration in which the rotation shaft AX of the movement mechanism MM2 is located above the waste liquid container WFB.

Further, as described above, in the printing apparatus 1, it is possible to reduce an increase in the size of the printing apparatus 1 in the transport direction due to the presence of a member required to attach the movement mechanism MM2 to the printing apparatus 1 when the rotation shaft AX of the movement mechanism MM2 is parallel to the transport direction.

Figure 23:
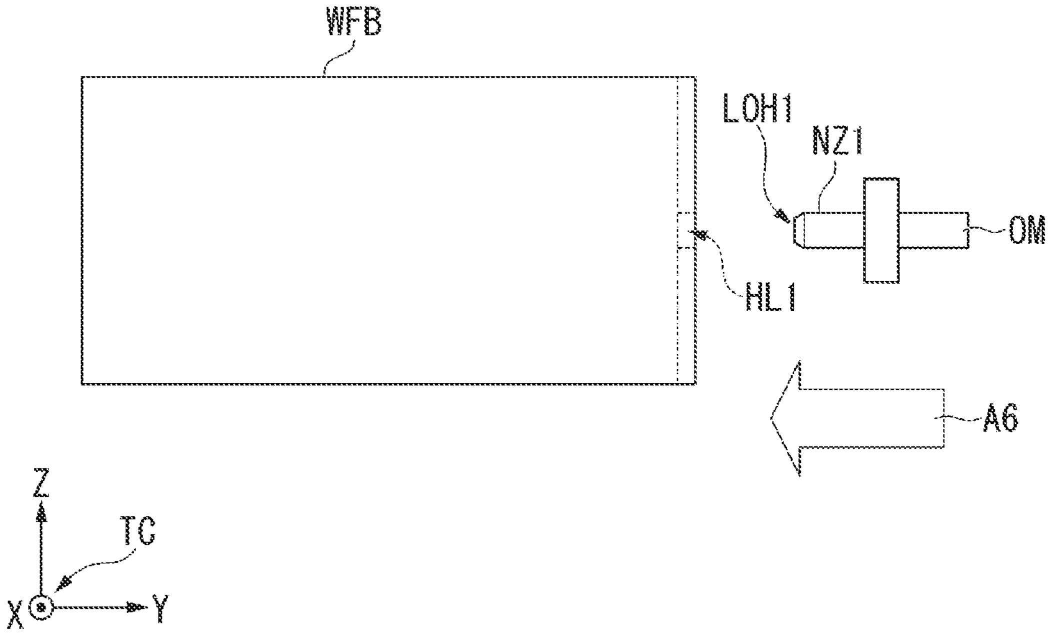
FIG. 23 is a front view illustrating an example of the waste liquid container WFB when the hole HL1 and the hole HL2 are formed in a surface in the scanning direction.

Further, the hole HL1 and the hole HL2 of the waste liquid container WFB may be formed at the surface of the waste liquid container WFB in the scanning direction as illustrated in FIG. 23 instead of the surface of the waste liquid container WFB in the transport direction. FIG. 23 is a front view illustrating an example of the waste liquid container WFB when the hole HL1 and the hole HL2 are formed in a surface in the scanning direction. In FIG. 23, a state in which the waste liquid container WFB is located at the first position in the holding portion HLD is illustrated. However, in FIG. 23, members other than the waste liquid container WFB and the discharge portion OM are omitted in order to prevent FIG. 23 from becoming complicated. As illustrated in FIG. 23, the hole HL1 and the hole HL2 are formed in the surface of the waste liquid container WFB in the scanning direction. Here, in FIG. 23, the hole HL2 is hidden behind the hole HL1 and cannot be seen. In the example illustrated in FIG. 23, the hole HL1 and the hole HL2 are arranged in an order of the hole HL2 and the hole HL1 in the transport direction. When the hole HL1 and the hole HL2 are formed at the surface of the waste liquid container WFB in the scanning direction as described above, the third position is located upstream of the fourth position in the scanning direction. Therefore, in the example illustrated in FIG. 23, the discharge portion OM is provided on the holding portion HLD to be movable back and forth between the third position and the fourth position in the direction opposite to the scanning direction. Therefore, in this example, the discharge portion OM can couple the nozzle NZ1 to the hole HL1 and couple the nozzle NZ2 to the hole HL2 by moving in the direction indicated by the arrow A6, that is, the direction opposite to the scanning direction. In this case, in the printing apparatus 1, it is possible to make it easy to move the waste liquid container WFB held on the holding portion HLD from the upper side. Further, in this case, in the printing apparatus 1, since the hole HL1 and the hole HL2 are opened toward the scanning direction, it is possible to reduce dripping of the waste liquid at the time of replacing the waste liquid container WFB, as compared to a case in which the hole HL1 and the hole HL2 are opened toward the gravity direction. In FIG. 23, a mechanism for realizing such movement of the discharge portion OM is omitted in order to prevent FIG. 23 from being complicated.

The hole HL1 and the hole HL2 of the waste liquid container WFB may be formed at a surface in the direction opposite to the scanning direction of the waste liquid container WFB, as illustrated in FIG. 23, instead of the surface in the transport direction of the waste liquid container WFB. In this case, the discharge portion OM is provided in the holding portion HLD to be movable back and forth between the third position and the fourth position in the scanning direction. Therefore, in this case, the third position is located downstream of the fourth position in the scanning direction.

The holding portion HLD described in Modification Example 2 of the embodiment may be configured to hold a waste liquid container movably between the first position and the second position as in the embodiment. In this case, the waste liquid container WFB may have a configuration in which the protrusion portion PTM in which the hole HL opening upward is formed is provided on the surface of the waste liquid container WFB in the transport direction and the nozzle NZ of the discharge portion OM extends in the gravity direction, as described in FIGS. 8 to 13. In this case, the third position is located upstream of the fourth position in the transport direction. This makes it possible for the user to position the discharge port LOH1 and the discharge port LOH2 above the hole HL by moving the waste liquid container WFB from the second position to the first position and then moving the discharge portion OM from the fourth position to the third position. Therefore, in this case, in the printing apparatus 1, it is possible to reduce the occurrence of the problem in the liquid supply tube TB due to the contact between the waste liquid container WFB and the liquid supply tube TB. In this case, the distance between the waste liquid container WFB located at the first position and the liquid supply tube TB is equal to or larger than the distance between the waste liquid container WFB located at the second position and the liquid supply tube TB.

In Modification Example 2 of the embodiment, the user inserts the waste liquid container WFB into the first position from the upper side to the lower side, as described above. In this case, the circuit board BD1 of the waste liquid container WFB is coupled to the board coupling unit BD2 in the gravity direction.

As described above, the printing apparatus 1 according to Modification Example 2 of the embodiment is the printing apparatus including the transport unit H that transports the printing medium in the transport direction, the printing head HD that prints an image on the printing medium, the carriage CG that moves the printing head HD back and forth above the transport path PT1 of the printing medium in the scanning direction intersecting the transport direction, the liquid container coupling portion CN11 to which the liquid container CT that contains ink to be supplied to the printing head HD is coupled, the liquid supply tube TB coupled to the liquid container coupling portion CN11 to supply ink from the liquid container CT to the printing head HD via the liquid container coupling portion CN11, the holding portion HLD that holds the waste liquid container WFB capable of containing the waste liquid discharged from the printing head HD, and the discharge portion OM including the nozzle NZ in which the discharge port LOH1 and the discharge port LOH2 for discharging the waste liquid are formed, in which the holding portion HLD is disposed at a position at which the waste liquid container region overlapping the waste liquid container WFB held by the holding portion HLD in the region inside the printing apparatus 1 and a part of the movement path PT2 overlap when viewed from the transport direction, above the transport path PT1 and downstream of the movement path PT2 of the carriage CG in the transport direction, a portion of the liquid supply tube TB is located between the movement path PT2 and the waste liquid container region when viewed from the gravity direction and overlaps the waste liquid container region when viewed from the transport direction, the waste liquid container region is spaced apart from the liquid supply tube TB, and the discharge portion OM is provided in the holding portion HLD and is movable between the third position determined in advance as a position at which the discharge portion OM discharges the waste liquid to the waste liquid container WFB and the fourth position determined in advance as a position at which the discharge portion OM does not discharge the waste liquid to the waste liquid container WFB. Accordingly, in the printing apparatus 1, the contact between the waste liquid container WFB and the liquid supply tube TB due to movement of the waste liquid container WFB between the second position and the first position does not occur. Therefore, in the printing apparatus 1, it is possible to reduce the contact between the waste liquid container WFB and the liquid supply tube TB, and it is possible to reduce the occurrence of the problem in the liquid supply tube TB due to the contact between the waste liquid container WFB and the liquid supply tube TB.

In Modification Example 2 of the embodiment, the printing apparatus 1 may have a configuration in which the waste liquid container WFB and at least portion of the liquid supply tube TB overlap when viewed from the scanning direction. In Modification Example 2 of the embodiment, the printing apparatus 1 may have a configuration in which the waste liquid container WFB and at least part of the carriage CG overlap when viewed from the scanning direction. In these cases, it is possible to reduce a size of the printing apparatus 1 in the transport direction of the printing apparatus 1.

Further, the discharge portion OM according to Modification Example 2 of the embodiment may be applied to a printing apparatus other than the printing apparatus 1. In this case, the printing apparatus includes the discharge portion OM that is movable between the third position and the fourth position.

Modification Example 3 of Embodiment

Hereinafter, Modification Example 3 of the embodiment of the present disclosure will be described with reference to the drawings.

Overview of Printing Apparatus According to Modification Example 3 of Embodiment.

First, an overview of a printing apparatus according to Modification Example 3 of the embodiment will be described.

The printing apparatus according to Modification Example 3 of the embodiment includes a transport unit, a printing head, a carriage, a liquid container coupling portion, a liquid supply tube, a holding portion, a discharge portion, and a contact reducing member. The transport unit transports the printing medium in the transport direction. The printing head prints an image on the printing medium. The carriage moves the printing head back and forth in the scanning direction intersecting the transport direction above the transport path of the printing medium. The liquid container that contains a liquid to be supplied to the printing head is coupled to the liquid container coupling portion. The liquid supply tube is coupled to the liquid container coupling portion and supplies liquid from the liquid container to the printing head via the liquid container coupling portion. The holding portion holds a waste liquid container capable of containing a waste liquid discharged from the printing head. The discharge portion includes a nozzle in which a discharge port for discharging the waste liquid is formed. The contact reducing member reduces contact between the waste liquid container held by the holding portion and the liquid supply tube. Further, the holding portion is disposed at a position at which the waste liquid container region overlapping the waste liquid container held by the holding portion and a part of the movement path overlap when viewed from the transport direction in the region inside the printing apparatus above the transport path and downstream of the movement path of the carriage in the transport direction. Further, the portion of the liquid supply tube is located between the movement path and the waste liquid container region when viewed from the gravity direction, and overlaps the waste liquid container region when viewed from the transport direction. The contact reducing member is disposed between the liquid supply tube and the waste liquid container region. Accordingly, in the printing apparatus, it is possible to reduce contact of the waste liquid container with the liquid supply tube when the waste liquid container is attached and detached, and it is possible to reduce the occurrence of the problem in the liquid supply tube due to the contact between the waste liquid container and the liquid supply tube.

Hereinafter, a configuration of the printing apparatus according to Modification Example 3 of the embodiment will be described in detail.

Configuration of Printing Apparatus According to According to Modification Example 3 of Embodiment Hereinafter, Modification Example 3 of the embodiment will be described. In Modification Example 3 of the embodiment, the same constituent portions as in the embodiment are denoted by the same reference numerals, and description thereof will be omitted. Some or all of matters described in Modification Example 3 of the embodiment may be combined in any manner with some or all of the matters described in each of the embodiment, Modification Example 1 of the embodiment, and Modification Example 2 of the embodiment.

In Modification Example 3 of the embodiment, the holding portion HLD holds the waste liquid container WFB so that the waste liquid container WFB is movable between the first position and the second position as in the embodiment. Here, in the embodiment, the printing apparatus 1 does not include a member that separates the waste liquid container region from the liquid supply tube TB. To this end, in the printing apparatus 1 of the embodiment, it is possible to reduce contact between the waste liquid container WFB and the liquid supply tube TB in attachment and detachment to and from the waste liquid container WFB by increasing the clearance distance. On the other hand, in Modification Example 3 of the embodiment, the printing apparatus 1 includes a contact reducing member WL that reduces contact between the waste liquid container WFB held by the holding portion HLD and the liquid supply tube TB. That is, in Modification Example 3 of the embodiment, the printing apparatus 1 includes the contact reducing member WL disposed between the waste liquid container region and the liquid supply tube TB. Accordingly, in the printing apparatus 1 according to Modification Example 3 of the embodiment, it is possible to reduce the contact between the waste liquid container WFB and the liquid supply tube TB while shortening the clearance distance. This is useful because of leading to a reduction in the size of the printing apparatus 1 in the transport direction while reducing the occurrence of the problem in the liquid supply tube TB due to the contact between the waste liquid container WFB and the liquid supply tube TB. The contact reducing member WL may be any member as long as the member is a member capable of reducing the contact between the waste liquid container WFB held by the holding portion HLD and the liquid supply tube TB.

Figure 24:
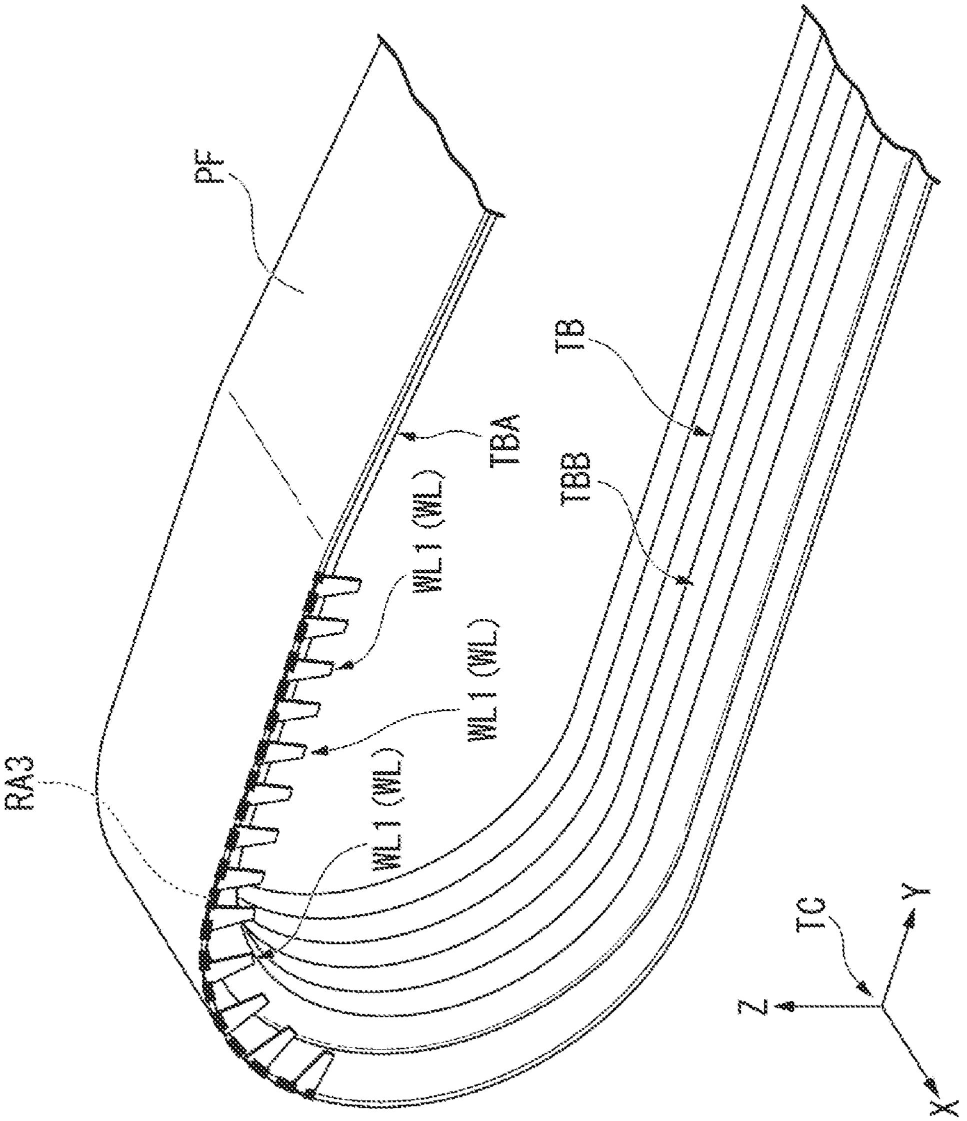
FIG. 24 is a view illustrating an example of a protection member PF having a portion functioning as a contact reducing member WL.

The contact reducing member WL may be, for example, a part of the protection member PF, as illustrated in FIG. 24. In this case, the contact reducing member WL is disposed above the printing medium discharge port POH when viewed from the transport direction. This is because the protection member PF is located above the transport path PT1. FIG. 24 is a diagram illustrating an example of the protection member PF having a portion functioning as the contact reducing member WL. Here, in the embodiment, the protection member PF is provided to cover the outer circumferential surface of the bent liquid supply tube TB. On the other hand, in Modification Example 3 of the embodiment, the protection member PF includes a barrier portion WL1 that separates the waste liquid container region from the portion of the liquid supply tube TB in the transport direction as the contact reducing member WL that reduces the contact between the waste liquid container WFB held by the holding portion HLD and the liquid supply tube TB, as illustrated in FIG. 24. The barrier portion WL1 may be any member as long as the member is provided in the protection member PF and functions as a barrier that separates at least a portion between the waste liquid container region and the liquid supply tube TB. In the example illustrated in FIG. 24, the barrier portion WL1 is provided in a target region RA3 determined in advance as a region in which the barrier portion WL1 is provided, in a region included in an end portion of the protection member PF in the transport direction. Further, in this example, the target region RA3 is a region of an end portion on the transport direction side of a portion provided on an outer circumferential surface of the first portion TBA of the liquid supply tube TB among portions of the protection member PF. In this example, the target region RA3 is at least a part of a region overlapping the waste liquid container region in the region when viewed from the transport direction. In FIG. 24, the target region RA3 is indicated by a thick dotted line. In this example, the barrier portion WL1 is a plate-shaped member that protrudes in a direction from an outer circumferential surface of the protection member PF that is bent together with the liquid supply tube TB toward the liquid supply tube TB among directions orthogonal to the outer circumferential surface at 13 different positions among positions on the target region RA3 in the example. In FIG. 24, three members arbitrarily selected from plate-shaped members protruding from the 13 positions are illustrated as the barrier portions WL1. That is, in the example, the barrier portion WL1 is divided into two or more members spaced apart from each other. Some or all of the barrier portions WL1 protruding from the 13 positions may be coupled. Further, some or all of the barrier portions WL1 protruding from the 13 positions may be formed integrally with the protection member PF or may be configured separately from the protection member PF.

Figure 25:
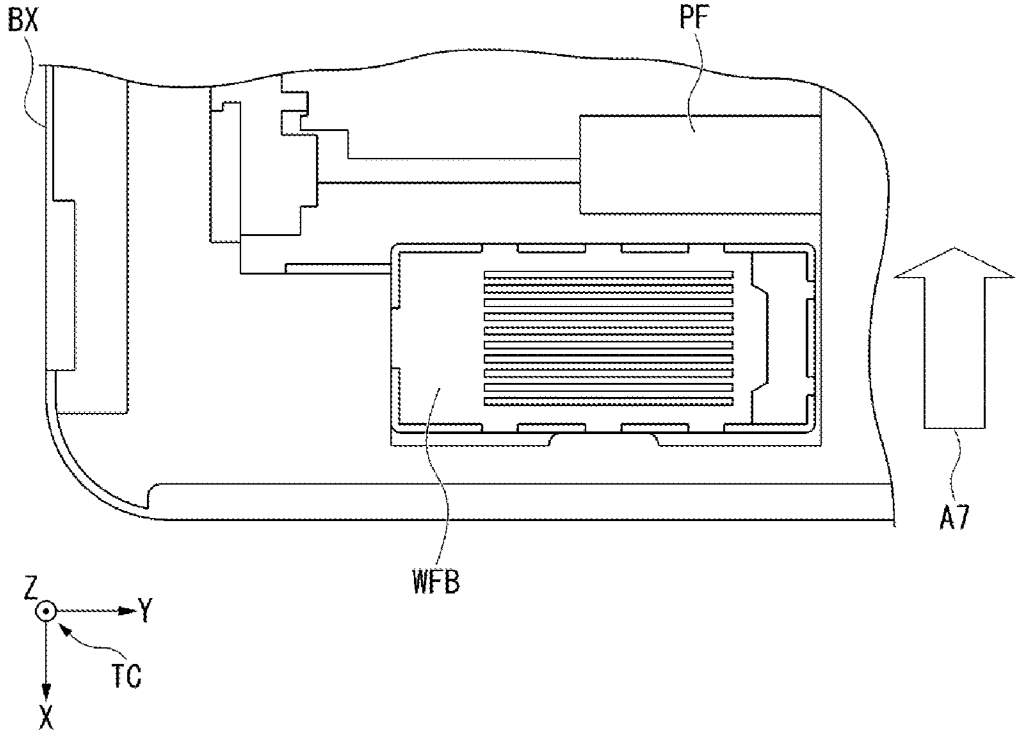
FIG. 25 is a top view illustrating an example of a state of the waste liquid container WFB located at the first position on a holding portion HLD.
Figure 26:
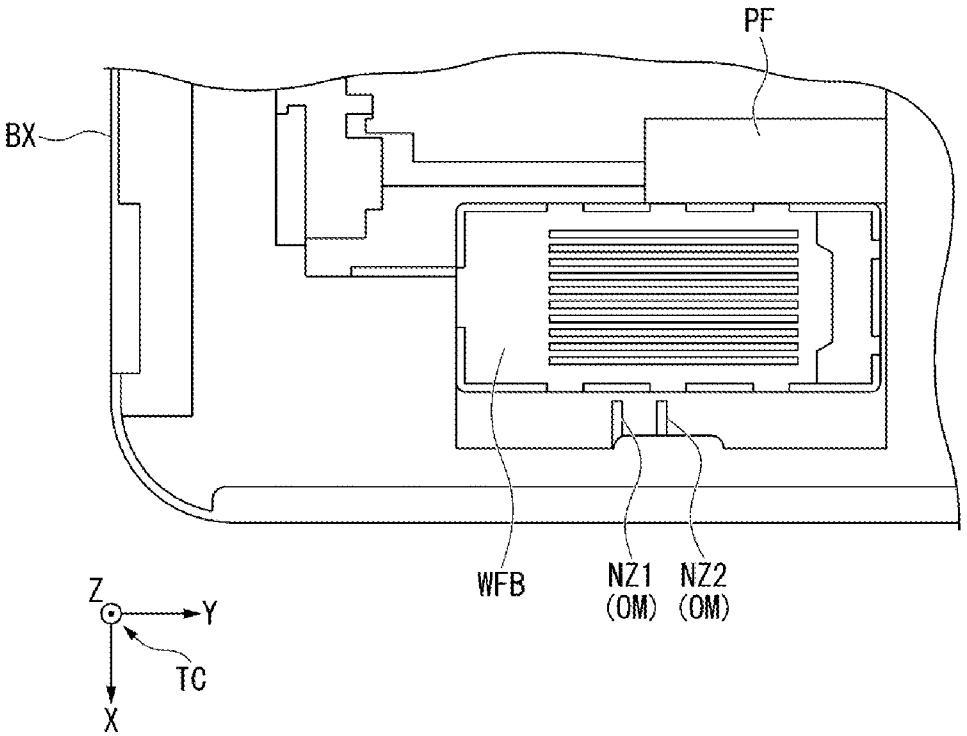
FIG. 26 is a top view illustrating an example of a state in which the waste liquid container WFB is in contact with the protection member PF at a position in a direction opposite to the transport direction with respect to the second position.

As described above, in Modification Example 3 of the embodiment, the protection member PF includes the barrier portion WL1. Accordingly, in the printing apparatus 1, for example, when the waste liquid container WFB is moved from the second position to the first position, it is possible to reduce contact of the waste liquid container WFB with the liquid supply tube TB even when the waste liquid container WFB comes into contact with the protection member PF. Here, FIG. 25 is a top view illustrating an example of a state of the waste liquid container WFB located at the first position on a holding portion HLD. When the waste liquid container WFB illustrated in FIG. 25 is detached from the printing apparatus 1, the user moves the waste liquid container WFB in the direction indicated by the arrow A7, that is, in the direction opposite to the transport direction. Accordingly, the user moves the waste liquid container WFB to the second position. In this case, the user may erroneously move the waste liquid container WFB to a position in the direction opposite to the transport direction with respect to the second position. In this case, the waste liquid container WFB comes into contact with the protection member PF. FIG. 26 is a top view illustrating an example of a state in which the waste liquid container WFB is in contact with the protection member PF at a position in a direction opposite to the transport direction with respect to the second position. In the printing apparatus 1, as illustrated in FIG. 26, when the clearance distance is smaller, the user is highly likely to cause the waste liquid container WFB to come into contact with the protection member PF. However, when the protection member PF includes the barrier portion WL1, it is difficult for the waste liquid container WFB to come into contact with the liquid supply tube TB even when the waste liquid container WFB comes into contact with the protection member PF, in the printing apparatus 1. This is because the barrier portion WL1 is disposed between the waste liquid container region and the liquid supply tube TB. Therefore, in the printing apparatus 1 according to Modification Example 3 of the embodiment, it is possible to reduce the contact between the waste liquid container WFB and the liquid supply tube TB using the protection member PF including the barrier portion WL1, and it is possible to reduce the occurrence of the problem in the liquid supply tube TB due to the contact between the waste liquid container WFB and the liquid supply tube TB. Therefore, in the printing apparatus 1 according to Modification Example 3 of the embodiment, it is possible to shorten the clearance distance, and to reduce a size in the transport direction.

Figure 27:
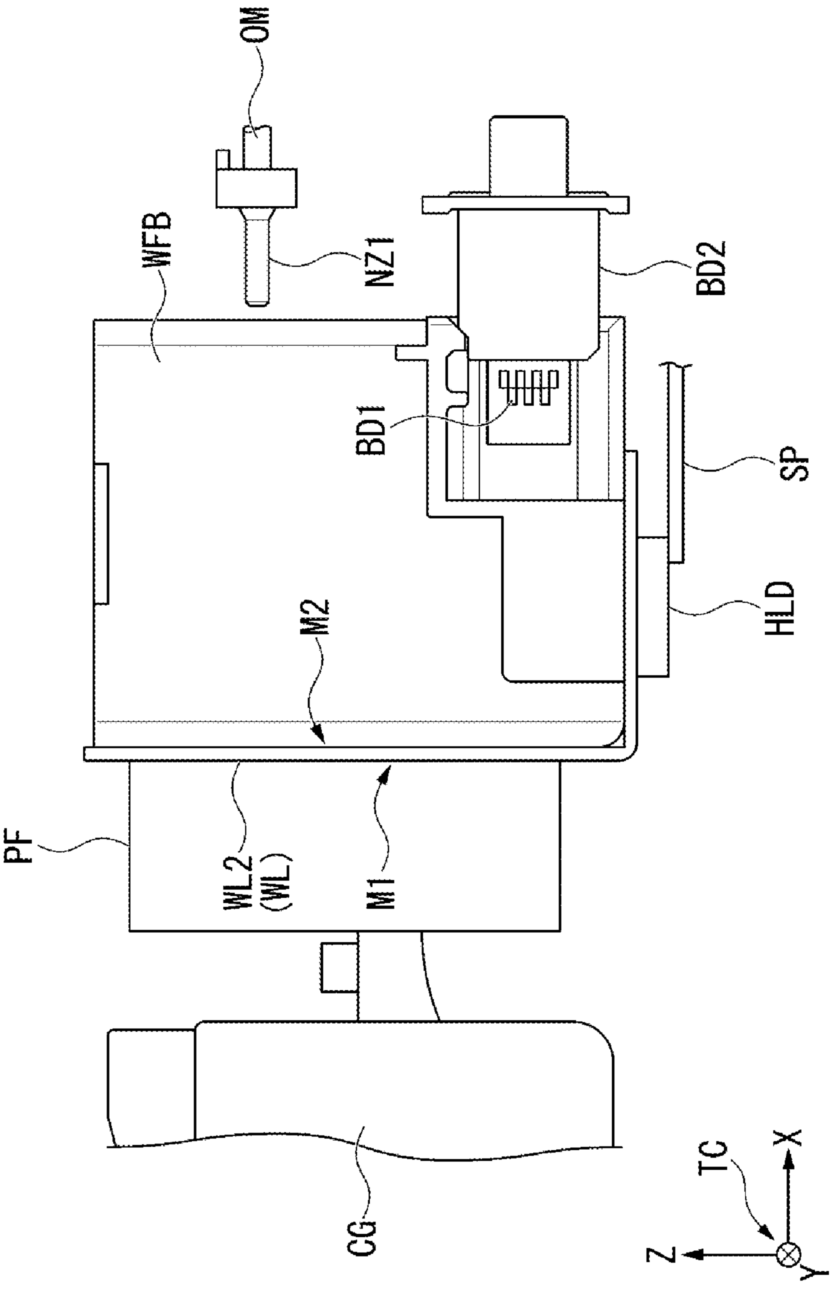
FIG. 27 is a side view illustrating an example of the holding portion HLD when the printing apparatus 1 includes the partition wall WL2 functioning as the contact reducing member WL.

Further, the contact reducing member WL may be, for example, a partition wall WL2 that separates the waste liquid container region and the portion of the liquid supply tube TB in the transport direction, as illustrated in FIG. 27. In this case, the contact reducing member WL is also disposed above the printing medium discharge port POH when viewed in the transport direction. This is because the holding portion HLD is located above the transport path PT1. FIG. 27 is a side view illustrating an example of the holding portion HLD when the printing apparatus 1 includes the partition wall WL2 functioning as the contact reducing member WL. In FIG. 27, the waste liquid container WFB, the protection member PF, and the carriage CG held by the holding portion HLD are illustrated together with the holding portion HLD.

Figure 28:
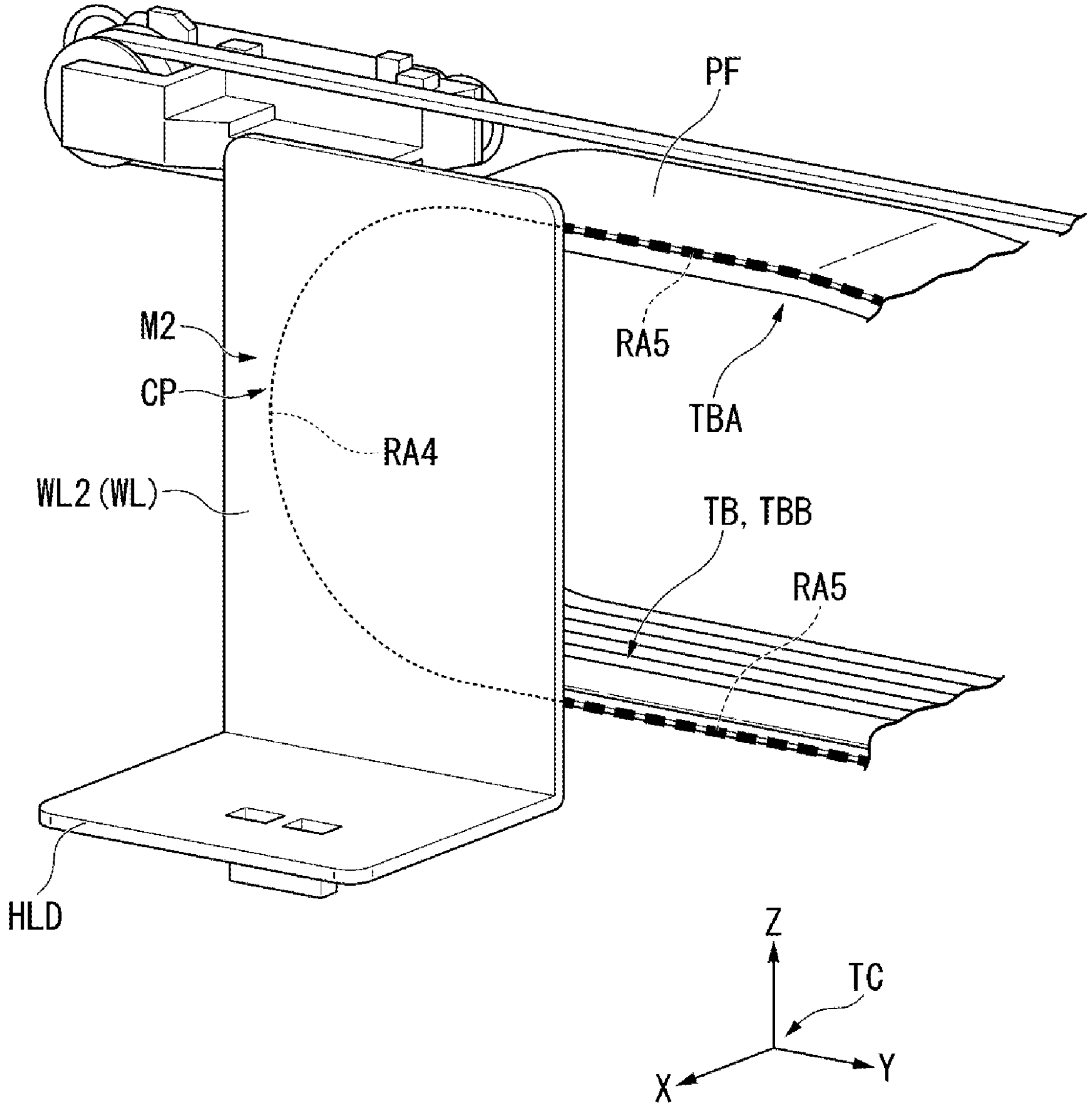
FIG. 28 is a perspective view illustrating an example of a configuration of the partition wall WL2 formed integrally with the holding portion HLD.

In the example illustrated in FIG. 27, the waste liquid container WFB is located at the second position on the holding portion HLD. In this example, the partition wall WL2, for example, is provided in the holding portion HLD and is movable together with the waste liquid container WFB held by the holding portion HLD. In this case, the partition wall WL2 may be formed integrally with the holding portion HLD or may be formed separately from the holding portion HLD. Hereinafter, a case in which the partition wall WL2 is formed integrally with the holding portion HLD as illustrated in FIG. 27 will be described as an example. In this case, in the printing apparatus 1, it is possible to reduce an increase in the size of the holding portion HLD in which the partition wall WL2 is provided, and as a result, it is possible to reduce an increase in the size of the printing apparatus 1. FIG. 28 is a perspective view illustrating an example of a configuration of the partition wall WL2 formed integrally with the holding portion HLD. Further, when the holding portion HLD and the partition wall WL2 are configured as separate bodies, a mechanism in which the partition wall WL2 is provided in the holding portion HLD so that the partition wall WL2 is movable together with the waste liquid container WFB may be a known mechanism or may be a mechanism to be developed in the future.

Here, as illustrated in FIG. 28, when the carriage CG is located at the carriage standby position, the partition wall WL2 overlaps the position where the liquid supply tube is most bent CP in the portions of the liquid supply tube TB when viewed from the transport direction. Further, a protected region RA4 that overlaps the partition wall WL2 and an unprotected region RA5 that does not overlap the partition wall WL2 are included in the region of the liquid supply tube TB when viewed from the transport direction. In FIG. 28, the protected region RA4 is indicated by a chain line. In FIG. 28, the unprotected region RA5 is indicated by a dotted line. As can be seen from FIG. 28, the protected region RA4 is smaller than the unprotected region RA5. Further, an upper end portion of the partition wall WL2 is higher than the highest position of the liquid supply tube TB in the gravity direction. Further, a lower end portion of the partition wall WL2 is lower than the lowest position of the liquid supply tube TB in the gravity direction. Accordingly, in the printing apparatus 1, it is not necessary to configure the partition wall WL2 to cover the entire region of the liquid supply tube TB when viewed from the transport direction, and it is possible to reduce an increase in a size of the partition wall WL2, and to reduce the contact between the waste liquid container WFB and the liquid supply tube TB using the partition wall WL2. Further, the upper end portion of the partition wall WL2 may be at a position of a height equal to or lower than the highest position of the liquid supply tube TB in the gravity direction. Further, the lower end portion of the partition wall WL2 may be at a position at a height equal to or higher than the lowest position of the liquid supply tube TB in the gravity direction. Further, the protected region RA4 may be larger than the unprotected region RA5.

Figure 29:
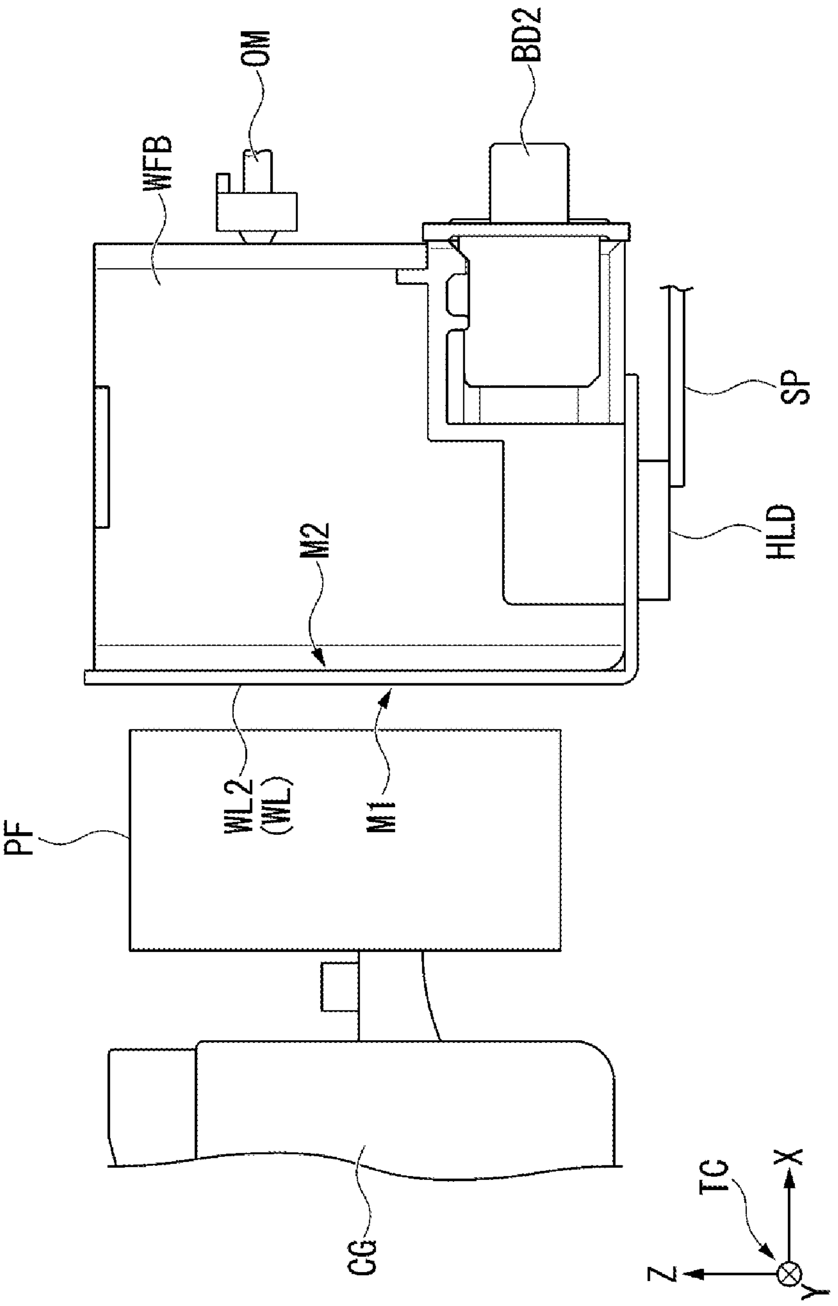
FIG. 29 is a side view illustrating an example of a state in which the partition wall WL2 is in contact with a liquid supply tube TB.

When the printing apparatus 1 includes the partition wall WL2 as illustrated in FIG. 27, it is possible to reduce contact of the waste liquid container WFB with the liquid supply tube TB using the partition wall WL2 even when the user erroneously moves the waste liquid container WFB to the position in the direction opposite to the transport direction with respect to the second position. In this case, in the printing apparatus 1, the partition wall WL2 may come into contact instead of the liquid supply tube TB, as illustrated in FIG. 29. FIG. 29 is a side view illustrating an example of a state in which the partition wall WL2 is in contact with the liquid supply tube TB. However, even when the liquid supply tube TB and the partition wall WL2 come into contact with each other as illustrated in FIG. 29, the liquid supply tube TB is not worn by the partition wall WL2 when the waste liquid container WFB is pulled out upward. This is because the partition wall WL2 is provided in the holding portion HLD, and thus, the partition wall WL2 does not move upward together with the waste liquid container WFB when the waste liquid container WFB is pulled out upward. As a result, in the printing apparatus 1, it is possible to reduce the occurrence of the problem in the liquid supply tube TB due to the contact between the waste liquid container WFB and the liquid supply tube TB using the partition wall WL2.

The partition wall WL2 may be configured to be biased in the transport direction by a biasing member SP, as illustrated in FIGS. 27 and 29. The biasing member SP is, for example, a spring, but may be another member capable of biasing the partition wall WL2 in the transport direction. In the printing apparatus 1, when the partition wall WL2 is biased in the transport direction by the biasing member SP, it is possible to reduce the user causing the partition wall WL2 to come into contact with the liquid supply tube TB together with the waste liquid container WFB. Therefore, in this case, in the printing apparatus 1, it is possible to more reliably reduce the occurrence of the problem in the liquid supply tube TB.

Further, the partition wall WL2 may not be movable together with the waste liquid container WFB held by the holding portion HLD. In this case, the partition wall WL2 is located at a position not overlapping the waste liquid container region. In the printing apparatus 1, even when the partition wall WL2 cannot move together with the waste liquid container WFB, it is possible to reduce contact between each of the waste liquid container WFB and the partition wall WL2 and the liquid supply tube TB, and to more reliably reduce the occurrence of the problem in the liquid supply tube TB.

Further, the partition wall WL2 has a first surface M1 facing the liquid supply tube TB and a second surface M2 opposite to the first surface M1. Here, in the printing apparatus 1, as the friction coefficient of the first surface M1 is lower, a likelihood that a problem will occur in the liquid supply tube TB is reduced when the partition wall WL2 and the liquid supply tube TB come into contact with each other. For example, in the printing apparatus 1, it is possible to more reliably reduce the occurrence of the problem in the liquid supply tube TB by making the friction coefficient of the first surface M1 lower than that of a front surface of the housing BX. In this case, a friction coefficient of the second surface M2 may be different from the friction coefficient of the first surface M1, or may be the same as the friction coefficient of the first surface M1. In the printing apparatus 1, when the friction coefficient of the second surface M2 is lower than that of the front surface of the housing BX, it is possible to reduce a force required to pull out the waste liquid container WFB from the holding portion HLD. That is, in this case, in the printing apparatus 1, it is possible to reduce a burden on the user when the waste liquid container WFB is pulled out upward from the holding portion HLD. For example, the partition wall WL2 is made of the same type of plastic as that forming the protection member PF. In this case, the friction coefficient of each of the first surface M1 and the second surface M2 is lower than that of the front surface of the housing BX. Further, in this case, in the printing apparatus 1, it is possible to reduce the occurrence of the problem in the protection member PF due to contact between the partition wall WL2 and the protection member PF.

Further, in the printing apparatus 1, as the hardness of the first surface M1 is lower, the likelihood of occurrence of the problem in the liquid supply tube TB is lowered even when the partition wall WL2 and the liquid supply tube TB come into contact with each other. For example, in the printing apparatus 1, it is possible to more reliably reduce the occurrence of the problem in the liquid supply tube TB by making the hardness of the first surface M1 lower than that of the front surface of the housing BX. In this case, the hardness of the second surface M2 may be different from the hardness of the first surface M1 or may be the same as the hardness of the first surface M1. In the printing apparatus 1, when hardness of the second surface M2 is lower than that of the front surface of the housing BX, force with which the waste liquid container WFB presses the partition wall WL2 toward the liquid supply tube TB is dispersed and weakened. Accordingly, in the printing apparatus 1, it is possible to reduce the occurrence of the problem in the liquid supply tube TB due to contact between the partition wall WL2 and the liquid supply tube TB. For example, the partition wall WL2 is formed of an elastic member such as rubber. In this case, the hardness of each of the first surface M1 and the second surface M2 is lower than that of the front surface of the housing BX.

Further, the printing apparatus 1 may include two members including the barrier portion WL1 and the partition wall WL2 as the contact reducing member WL. Accordingly, in the printing apparatus 1, it is possible to more reliably reduce the occurrence of the problem in the liquid supply tube due to the contact between the waste liquid container and the liquid supply tube.

As described above, the printing apparatus 1 according to Modification Example 3 of the embodiment is the printing apparatus including the transport unit H that transports the printing medium in the transport direction, the printing head HD that prints the image on the print medium, the carriage CG that moves the printing head HD back and forth above the transport path PT1 of the printing medium in the scanning direction intersecting the transport direction, the liquid container coupling portion CN11 to which the liquid container CT that contains ink to be supplied to the printing head HD is coupled, the liquid supply tube TB coupled to the liquid container coupling portion CN11 to supply ink from the liquid container CT to the printing head HD via the liquid container coupling portion CN11, the holding portion HLD that holds the waste liquid container WFB capable of containing the waste liquid discharged from the printing head HD, the discharge portion OM including the nozzle NZ in which the discharge port LOH1 and the discharge port LOH2 for discharging the waste liquid are formed, and the contact reducing member WL that reduces contact between the waste liquid container WFB held by the holding portion HLD and the liquid supply tube TB, wherein the holding portion HLD is disposed at a position at which the waste liquid container region overlapping the waste liquid container WFB held by the holding portion HLD in the region inside the printing apparatus 1 and a part of the movement path PT2 overlap when viewed from the transport direction, above the transport path PT1 and downstream of the movement path PT2 of the carriage CG in the transport direction, a portion of the liquid supply tube TB is located between the movement path PT2 and the waste liquid container region when viewed from the gravity direction and overlaps the waste liquid container region when viewed from the transport direction, and the contact reducing member WL is located between the liquid supply tube TB and the waste liquid container region. This makes it possible for the printing apparatus 1 to reduce the contact between the waste liquid container WFB and the liquid supply tube TB while shortening the clearance distance.

Figure 30:
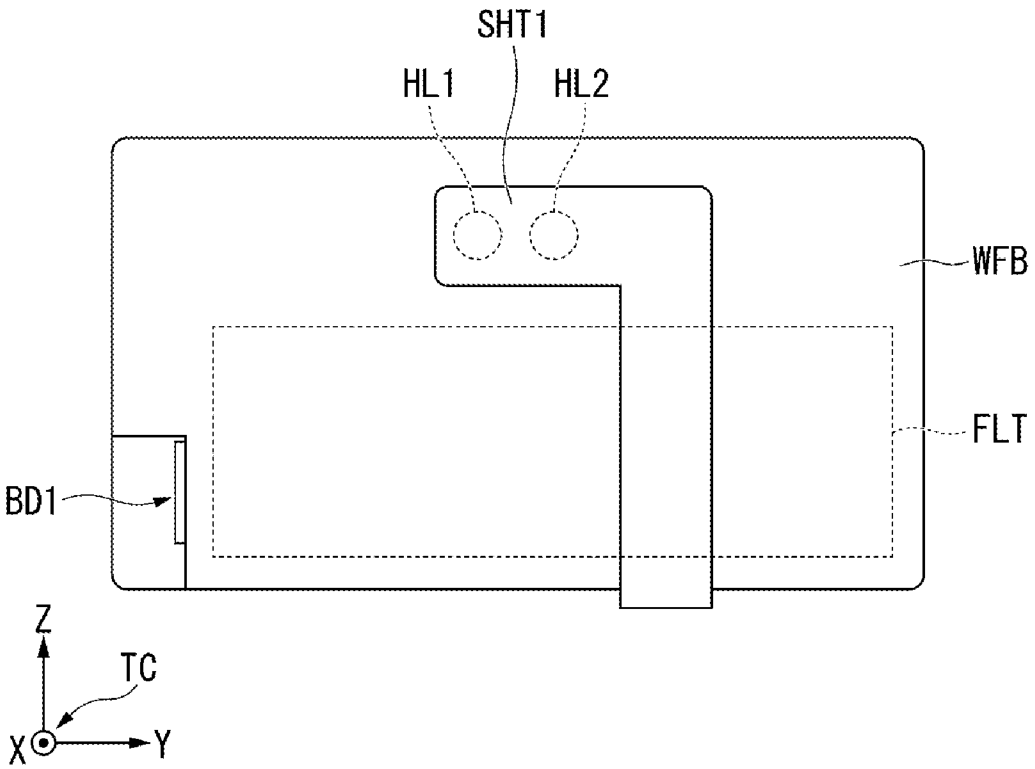
FIG. 30 is a front view illustrating an example of a configuration of the waste liquid container WFB including an abutted portion SHT1.

The waste liquid container WFB described above may include an abutted portion SHT1 that is movable between a hole closing position at which both the hole HL1 and the hole HL2 are closed and a hole opening position at which both the hole HL1 and the hole HL2 are opened, as illustrated in FIG. 30, when the hole HL1 and the hole HL2 are formed. FIG. 30 is a front view illustrating an example of a configuration of the waste liquid container WFB including the abutted portion SHT1. However, as an example, the waste liquid container WFB in which the hole HL1 and the hole HL2 are formed in the front surface is illustrated in FIG. 30.

The abutted portion SHT1 is provided in the waste liquid container WFB to be movable between the hole closing position at which both the hole HL1 and the hole HL2 formed in the waste liquid container WFB are closed and the hole opening position at which both the hole HL1 and the hole HL2 are opened. The abutted portion SHT1 may be manually moved between the hole closing position and the hole opening position by the user, may be automatically moved between the hole closing position and the hole opening position by an actuator or the like, or may be moved between the hole closing position and the hole opening position by using other methods. Further, the abutted portion SHT1 illustrated in FIG. 30 is located at the hole closing position. Therefore, in FIG. 30, both of the hole HL1 and the hole HL2 formed in the waste liquid container WFB are hidden behind the abutted portion SHT1.

Figure 31:
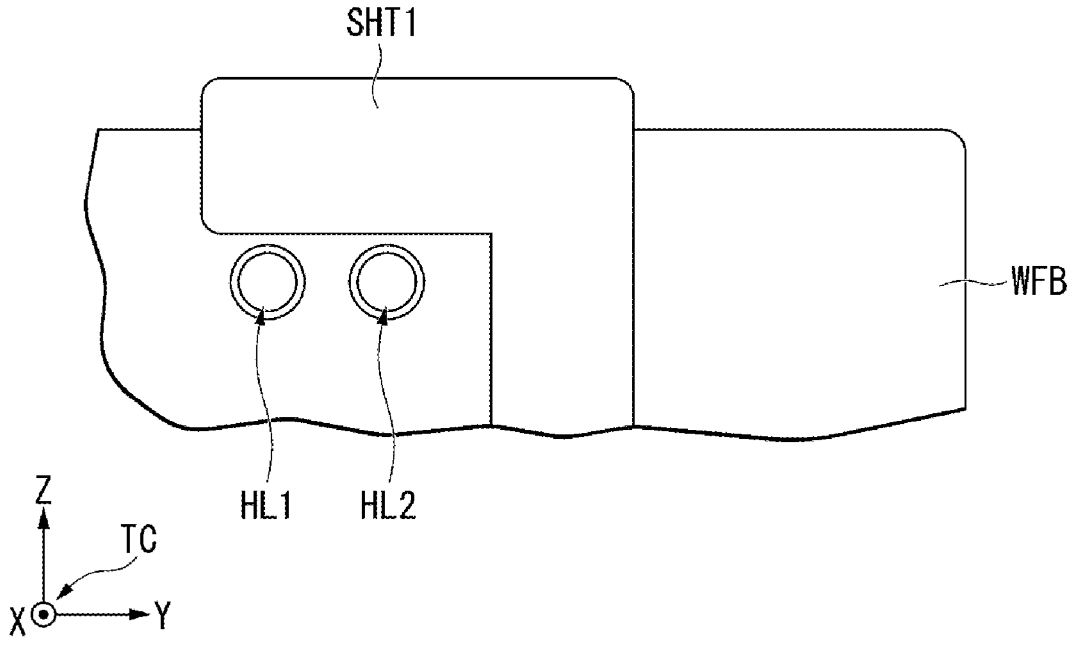
FIG. 31 is a diagram illustrating an example of a state in which the abutted portion SHT1 is located at the hole opening position and both the hole HL1 and the hole HL2 formed in the waste liquid container WFB are visible.

FIG. 31 is a diagram illustrating an example of a state in which the abutted portion SHT1 is located at the hole opening position and both the hole HL1 and the hole HL2 formed in the waste liquid container WFB are visible. In the example illustrated in FIGS. 30 and 31, the hole opening position is located above the hole closing position. In this case, the abutted portion SHT1 can move upward from the hole closing position to the hole opening position, and can move downward from the hole opening position to the hole closing position. The hole opening position may be located upstream or downstream of the hole closing position in the scanning direction, and may be located upstream or downstream of the hole closing position in the transport direction. Here, the holding portion HLD of the printing apparatus 1 may include the abutted portion SHT1 as a member that moves an abutting portion SHT2 from the hole closing position to the hole opening position. The abutting portion SHT2 is a member that abuts on the abutted portion SHT1 according to the placement of the waste liquid container WFB on the holding portion HLD and moves the abutted portion SHT1 from the hole closing position to the hole opening position. A configuration of the abutting portion SHT2 may be any configuration as long as the abutting portion SHT2 abuts on the abutted portion SHT1 according to the placement of the waste liquid container WFB on the holding portion HLD and moves the abutted portion SHT1 from the hole closing position to the hole opening position. In FIGS. 3 and 4, the abutted portion SHT1 is illustrated as an object having a rectangular parallelepiped shape.

The nozzle NZ described above may be configured to extend in the direction opposite to the gravity direction. In this case, the discharge port LOH is formed at the tip of the nozzle NZ in the direction. In this case, the waste liquid container WFB includes, for example, the protrusion portion PTM in which the hole HL opening downward is formed. In this case, in the printing apparatus 1, it is possible to reduce dripping of the waste liquid from the tip of the nozzle NZ when the waste liquid container WFB is detached.

Further, the matters described above may be combined in any manner.

APPENDIX 1

[1]

A printing apparatus including: a transport unit configured to transport a printing medium in a transport direction; a printing head configured to print an image on the printing medium; a carriage configured to move the printing head back and forth above a transport path of the printing medium in a scanning direction intersecting the transport direction; a liquid container coupling portion to which a liquid container containing a liquid to be supplied to the printing head is coupled; a liquid supply tube coupled to the liquid container coupling portion to supply the liquid from the liquid container to the printing head via the liquid container coupling portion; a holding portion configured to hold a waste liquid container configured to contain a waste liquid discharged from the printing head; a discharge portion including a nozzle in which a discharge port for discharging the waste liquid is formed; and a contact reducing member configured to reduce contact between the waste liquid container held by the holding portion and the liquid supply tube, wherein the holding portion is disposed at a position at which a waste liquid container region overlapping the waste liquid container held by the holding portion in a region inside the printing apparatus and a part of the movement path overlap when viewed from the transport direction, above the transport path and downstream of the movement path of the carriage in the transport direction, a portion of the liquid supply tube is located between the movement path and the waste liquid container region when viewed from a gravity direction and overlaps the waste liquid container region when viewed from the transport direction, and the contact reducing member is located between the liquid supply tube and the waste liquid container region.

[2]

The printing apparatus according to [1], wherein the liquid supply tube and the holding portion are disposed in a predetermined region inside the printing apparatus.

[3]

The printing apparatus according to [1] or [2], wherein the holding portion holds the waste liquid container so that the waste liquid container is movable between a first position determined in advance as a position at which the waste liquid container receives the waste liquid discharged from the discharge port and a second position determined in advance as a position at which the waste liquid container does not receive the waste liquid discharged from the discharge port and located upstream of the first position in the transport direction, and the waste liquid container region is a region including both of a first region overlapping the waste liquid container held by the holding portion at the first position in the region inside the printing apparatus and a second region overlapping the waste liquid container held by the holding portion at the second position in the region inside the printing apparatus.

[4]

The printing apparatus according to any one of [1] to [3], wherein the contact reducing member includes a partition wall configured to separate the waste liquid container region and the portion of the liquid supply tube from each other in the transport direction.

[5]

The printing apparatus according to [4], including: a housing, wherein the partition wall includes a first surface facing the liquid supply tube and a second surface opposite to the first surface, and a friction coefficient of the first surface is lower than that of a front surface of the housing.

[6]

The printing apparatus according to [5], wherein a friction coefficient of the second surface is lower than that of the front surface of the housing.

[7]

The printing apparatus according to any one of [4] to [6], including: a housing, wherein the partition wall includes a first surface facing the liquid supply tube and a second surface opposite to the first surface, and hardness of the first surface is lower than that of the housing.

[8]

The printing apparatus according to [7], wherein hardness of the second surface is lower than that of the housing.

[9]

The printing apparatus according to any one of [4] to [8], including: a protection member provided in at least a portion of the liquid supply tube and configured to protect the liquid supply tube, wherein the protection member is made of a predetermined type of plastic, and the partition wall is made of the plastic.

[10]

The printing apparatus according to any one of [4] to [9], wherein the liquid supply tube is bent between the liquid container coupling portion and the printing head, a first portion from the position where the liquid supply tube is most bent to the liquid container coupling portion among portions of the liquid supply tube and a second portion from the position where the liquid supply tube is most bent to the printing head among portions of the liquid supply tube do not overlap in the transport direction, the partition wall overlaps with the position where the liquid supply tube is most bent when viewed from the transport direction when the partition wall is located at a carriage standby position determined in advance as a position at which the carriage is located when the waste liquid container is replaced, a protected region overlapping the partition wall and an unprotected region not overlapping the partition wall are included in a region of the liquid supply tube when viewed from the transport direction, and the protected region is smaller than the unprotected region.

[11]

The printing apparatus according to any one of [4] to [10], wherein the holding portion holds the waste liquid container so that the waste liquid container is movable between a first position determined in advance as a position at which the waste liquid container receives the waste liquid discharged from the discharge port and a second position determined in advance as a position at which the waste liquid container does not receive the waste liquid discharged from the discharge port and located upstream of the first position in the transport direction, and the partition wall is provided in the holding portion and is movable together with the waste liquid container held by the holding portion.

[12]

The printing apparatus according to [11], wherein the partition wall is biased by a biasing member in a direction away from the liquid supply tube with respect to the holding portion.

[13]

The printing apparatus according to any one of [4] to [12], wherein the partition wall is formed integrally with the holding portion.

[14]

The printing apparatus according to any one of [4] to [13], wherein the liquid supply tube is bent between the liquid container coupling portion and the printing head, a first portion from a position where the liquid supply tube is most bent to the liquid container among portions of the liquid supply tube and a second portion from the position where the liquid supply tube is most bent to the printing head among the portions of the liquid supply tube do not overlap in the transport direction, and an upper end portion of the partition wall is higher than a highest position of the liquid supply tube.

[15]

The printing apparatus according to any one of [4] to [14], wherein the liquid supply tube is bent between the liquid container coupling portion and the printing head, a first portion from a position where the liquid supply tube is most bent to the liquid container among portions of the liquid supply tube and a second portion from the position where the liquid supply tube is most bent to the printing head among the portions of the liquid supply tube do not overlap in the transport direction, and a lower end portion of the partition wall is lower than a lowest position of the liquid supply tube.

[16]

The printing apparatus according to any one of [1] to [15], wherein the nozzle extends in a discharge port protrusion direction indicated by a composite vector of a vector indicating the direction opposite to the transport direction and a vector indicating the direction opposite to the gravity direction, and the discharge port is formed at a tip of the nozzle in the discharge port protrusion direction.

[17]

The printing apparatus according to any one of [1] to [16], including: a housing, wherein a printing medium discharge port through which the printing medium is discharged is formed in the housing, the holding portion is disposed above the printing medium discharge port when viewed from the transport direction, and the contact reducing member is disposed above the printing medium discharge port when viewed from the transport direction.

[18]

The printing apparatus according to any one of [1] to [17], including: an input reception unit configured to receive an input from outside, wherein the holding portion is disposed between the movement path and the input reception unit in the transport direction.

[19]

The printing apparatus according to any one of [1] to [18], including: a suction mechanism disposed at a position closer to a first end portion of the movement path in the scanning direction than a center of the movement path and configured to suction the liquid from the printing head as the waste liquid, wherein the waste liquid container is attachable to and detachable from the holding portion, and the discharge portion is provided at a position closer to a second end portion of the movement path in a direction opposite to the scanning direction than the center of the movement path in the scanning direction.

[20]

The printing apparatus according to any one of [1] to [19], wherein a hole through which the waste liquid discharged from the discharge port passes from the outside of the waste liquid container to the inside of the waste liquid container is formed in the waste liquid container, the waste liquid container includes an abutted portion movable between a hole closing position at which the hole is closed and a hole opening position at which the hole is opened, the holding portion includes an abutting portion configured to abut on the abutted portion, and the abutting portion moves the abutted portion from the hole closing position to the hole opening position according to the placement of the waste liquid container on the holding portion.

[21]

The printing apparatus according to any one of [1] to [20], wherein the holding portion holds the waste liquid container so that the waste liquid container is movable between a first position determined in advance as a position at which the waste liquid container receives the waste liquid discharged from the discharge port and a second position determined in advance as a position at which the waste liquid container does not receive the waste liquid discharged from the discharge port and located upstream of the first position in the transport direction, the waste liquid container configured to be coupled to the nozzle, the holding portion includes a board coupling unit configured to be electrically coupled to a circuit board provided in the waste liquid container, and the board coupling unit is provided at a position at which the board coupling unit is coupled to the circuit board when the waste liquid container is moved from the second position to the first position, and is provided at a position closer to a second end portion of the movement path in the direction opposite to the scanning direction than a first end portion of the movement path in the scanning direction.

[22]

The printing apparatus according to any one of [1] to [21], including: a housing configured to open upward; and a cover configured to cover the opening of the housing so that the opening is opened or closed from the upper side, wherein the holding portion is exposed through the opening of the housing when the cover opens the opening of the housing.

[23]

The printing apparatus according to any one of [1] to [22], including: a protection member provided in at least a portion of the liquid supply tube and configured to protect the liquid supply tube, wherein the protection member includes a barrier portion configured to separate the waste liquid container region and a portion of the liquid supply tube from each other in the transport direction, and the contact reducing member includes the barrier portion.

[24]

The printing apparatus according to [23], wherein the barrier portion is divided into two or more members spaced apart from each other.

[25]

A printing apparatus including: a transport unit configured to transport a printing medium in a transport direction; a printing head configured to print an image on the printing medium; a carriage configured to move the printing head back and forth above a transport path of the printing medium in a scanning direction intersecting the transport direction; a liquid container coupling portion to which a liquid container containing a liquid to be supplied to the printing head is coupled; a liquid supply tube coupled to the liquid container coupling portion to supply the liquid from the liquid container to the printing head via the liquid container coupling portion; a holding portion configured to hold a waste liquid container configured to contain a waste liquid discharged from the printing head; and a discharge portion including a nozzle in which a discharge port for discharging the waste liquid is formed, wherein the holding portion is disposed at a position at which a waste liquid container region overlapping the waste liquid container held by the holding portion in a region inside the printing apparatus and a part of the movement path overlap when viewed from the transport direction, above the transport path and downstream of the movement path of the carriage in the transport direction, a portion of the liquid supply tube is located between the movement path and the waste liquid container region when viewed from a gravity direction and overlaps the waste liquid container region when viewed from the transport direction, the waste liquid container is configured to be coupled to the nozzle, the nozzle extends in a discharge port protrusion direction indicated by a composite vector of a vector indicating the direction opposite to the transport direction and a vector indicating the direction opposite to the gravity direction, and the discharge port is formed at a tip of the nozzle in the discharge port protrusion direction.

[26]

The printing apparatus according to any one of [1] to [25], including: the waste liquid container.

APPENDIX 2

[1]

A printing apparatus including: a transport unit configured to transport a printing medium in a transport direction; a printing head configured to print an image on the printing medium; a carriage configured to move the printing head back and forth above a transport path of the printing medium in a scanning direction intersecting the transport direction; a liquid container coupling portion to which a liquid container containing a liquid to be supplied to the printing head is coupled; a liquid supply tube coupled to the liquid container coupling portion to supply the liquid from the liquid container to the printing head via the liquid container coupling portion; a holding portion configured to hold a waste liquid container configured to contain a waste liquid discharged from the printing head; and a discharge portion including a nozzle in which a discharge port for discharging the waste liquid is formed, wherein the holding portion is disposed at a position at which a waste liquid container region overlapping the waste liquid container held by the holding portion in a region inside the printing apparatus and a part of the movement path overlap when viewed from the transport direction, above the transport path and downstream of the movement path of the carriage in the transport direction, a portion of the liquid supply tube is located between the movement path and the waste liquid container region when viewed from a gravity direction and overlaps the waste liquid container region when viewed from the transport direction, the waste liquid container region is spaced apart from the liquid supply tube, and the discharge portion is provided in the holding portion and is movable between a third position determined in advance as a position at which the discharge portion discharges the waste liquid to the waste liquid container and a fourth position determined in advance as a position at which the discharge portion does not discharge the waste liquid to the waste liquid container.

[2]

The printing apparatus according to [1], wherein a hole through which the waste liquid discharged from the discharge port passes from the outside of the waste liquid container to the inside of the waste liquid container is formed in the waste liquid container, the holding portion holds the waste liquid container so that the waste liquid container is movable between a first position determined in advance as a position at which the waste liquid container receives the waste liquid discharged from the discharge port and a second position determined in advance as a position at which the waste liquid container does not receive the waste liquid discharged from the discharge port, a distance between the waste liquid container and the liquid supply tube at the first position is equal to or larger than a distance between the waste liquid container and the liquid supply tube at the second position, a protrusion portion protruding in the transport direction from the waste liquid container is provided on a surface in the transport direction among surfaces of the waste liquid container, the hole is opened upward on an upper surface of the protrusion portion, the nozzle extends in the gravity direction, and the discharge port is located above the hole of the waste liquid container located at the first position.

[3]

The printing apparatus according to [1] or [2], wherein a hole through which the waste liquid discharged from the discharge port passes from the outside of the waste liquid container to the inside of the waste liquid container is formed in the waste liquid container, and the nozzle is coupled to the hole of the waste liquid container held by the holding portion when the discharge portion moves from the fourth position to the third position.

[4]

The printing apparatus according to any one of [1] to [3], further including: an operating portion configured to receive an operation for moving the discharge portion from the fourth position to the third position; and a movement mechanism configured to move the discharge portion from the fourth position to the third position in response to the operation received by the operating portion.

[5]

The printing apparatus according to [4], wherein a hole through which the waste liquid discharged from the discharge port passes from the outside of the waste liquid container to the inside of the waste liquid container is formed in the waste liquid container, the hole is formed in a surface in the transport direction among surfaces of the waste liquid container, and the third position is located upstream of the fourth position in the transport direction.

[6]

The printing apparatus according to [4], wherein a hole through which the waste liquid discharged from the discharge port passes from the outside of the waste liquid container to the inside of the waste liquid container is formed in the waste liquid container, the hole is formed in a surface in the scanning direction among surfaces of the waste liquid container, and the third position is located upstream of the fourth position in the scanning direction.

[7]

The printing apparatus according to any one of [4] to [6], wherein the operating portion is provided above the discharge portion.

[8]

The printing apparatus according to any one of [4] to [7], including: a housing configured to open upward; and a cover configured to cover the opening of the housing so that the opening is opened or closed from the upper side, wherein the operating portion is the cover, and the movement mechanism moves the discharge portion from the fourth position to the third position according to movement of the cover.

[9]

The printing apparatus according to [8], wherein the movement mechanism includes a guide surface that comes into contact with the discharge portion from the upper side in a process of closing the opening of the housing using the cover, and the guide surface guides the discharge portion from the fourth position toward the third position according to a downward movement.

[10]

The printing apparatus according to [4], wherein a hole through which the waste liquid discharged from the discharge port passes from the outside of the waste liquid container to the inside of the waste liquid container is formed in the waste liquid container, and the hole is formed in an upper surface of the waste liquid container.

[11]

The printing apparatus according to [10], wherein the movement mechanism includes a first member that rotates around a predetermined rotation shaft and extends from the rotation shaft in a direction orthogonal to the rotation shaft, the discharge portion is provided at an end portion opposite to the rotation shaft among end portions of the first member, the rotation shaft is parallel to a virtual surface including the transport direction and the scanning direction and is provided at a position at which the nozzle can be coupled to the hole when the first member is rotated toward the waste liquid container, and the operating portion is the first member.

[12]

The printing apparatus according to [11], wherein the rotation shaft is parallel to the transport direction, and both ends of the movement mechanism are included inside both ends of the waste liquid container in the transport direction.

[13]

The printing apparatus according to or [12], wherein the rotation shaft is located above the hole when viewed from the transport direction.

[14]

The printing apparatus according to any one of [1] to [13], wherein when the waste liquid container is replaced, the carriage is located at a carriage standby position determined in advance as a position at which the carriage is located, and the carriage standby position is a position closer to a first end portion of the movement path in the scanning direction than the holding portion when viewed from the transport direction.

[15]

The printing apparatus according to any one of [4] to [14], wherein a hole through which the waste liquid discharged from the discharge port passes from the outside of the waste liquid container to the inside of the waste liquid container is formed in the waste liquid container, the holding portion holds the waste liquid container so that the waste liquid container is movable between a first position determined in advance as a position at which the waste liquid container receives the waste liquid discharged from the discharge port and a second position determined in advance as a position at which the waste liquid container does not receive the waste liquid discharged from the discharge port, a distance between the waste liquid container and the liquid supply tube at the first position is equal to or larger than a distance between the waste liquid container and the liquid supply tube at the second position, and the nozzle is coupled to the hole of the waste liquid container held by the holding portion by the operating portion receiving an operation when the waste liquid container is located at the second position.

[16]

The printing apparatus according to [15], wherein the hole is formed at a position overlapping an absorption member contained inside the waste liquid container when viewed from a gravity direction.

[17]

The printing apparatus according to [15], wherein the hole is formed at a position that does not overlap with the absorption member contained inside the waste liquid container when viewed from the gravity direction.

[18]

The printing apparatus according to any one of [15] to [17], wherein the second position is located upstream of the first position in the transport direction.

[19]

The printing apparatus according to any one of [15] to [17], wherein the second position is located upstream or downstream of the first position in the scanning direction.

[20]

The printing apparatus according to any one of [15] to [19], wherein a protrusion portion protruding in the transport direction is provided on a surface in the transport direction among surfaces of the waste liquid container, the hole is opened upward on an upper surface of the protrusion portion, and the nozzle is coupled to the hole of the waste liquid container located at the first position when the discharge portion is located at the third position.

[21]

The printing apparatus according to [20], wherein the protrusion portion is provided to be switchable between a state in which the protrusion portion protrudes from a surface of the waste liquid container in the transport direction and a state in which the protrusion portion is contained inside the waste liquid container, and the hole is open upward on the upper surface of the protrusion portion in a state in which the protrusion portion protrudes from the surface of the waste liquid container in the transport direction.

[22]

The printing apparatus according to [21], wherein the waste liquid container includes a mechanism that switches a state of the protrusion portion from a state in which the protrusion portion is contained inside the waste liquid container to a state in which the protrusion portion protrudes from a surface of the waste liquid container in the transport direction in a process of causing the holding portion to hold the waste liquid container.

[23]

The printing apparatus according to [1], wherein the holding portion holds the waste liquid container at a predetermined position.

[24]

The printing apparatus according to any one of [1] to [23], including the waste liquid container.

[25]

A printing apparatus including: a transport unit configured to transport a printing medium in a transport direction; a printing head configured to print an image on the printing medium; a carriage configured to move the printing head back and forth above a transport path of the printing medium in a scanning direction intersecting the transport direction; a liquid container coupling portion to which a liquid container containing a liquid to be supplied to the printing head is coupled; a liquid supply tube coupled to the liquid container coupling portion to supply the liquid from the liquid container to the printing head via the liquid container coupling portion; a holding portion configured to hold a waste liquid container configured to contain a waste liquid discharged from the printing head; and a discharge portion including a nozzle in which a discharge port for discharging the waste liquid is formed, wherein the holding portion is disposed at a position at which a waste liquid container region overlapping the waste liquid container held by the holding portion in a region inside the printing apparatus and a part of the movement path overlap when viewed from the transport direction, above the transport path and downstream of the movement path of the carriage in the transport direction, a portion of the liquid supply tube is located between the movement path and the waste liquid container region when viewed from a gravity direction and overlaps the waste liquid container region when viewed from the transport direction, at least a part of the discharge portion overlaps the waste liquid container region when viewed from the transport direction, and is located downstream of the waste liquid container region in the transport direction when viewed from the scanning direction, and the waste liquid container region is spaced apart from the liquid supply tube, the nozzle extends in the gravity direction, and the discharge port is formed at a tip of the nozzle in the gravity direction.

[26]

The printing apparatus according to [25], including: a housing, wherein a printing medium discharge port through which the printing medium is discharged is formed in the housing, and the holding portion is disposed above the printing medium discharge port when viewed from the transport direction.

[26]

The printing apparatus according to or [26], further including: a contact reducing member configured to reduce contact between the waste liquid container held by the holding portion and the liquid supply tube; and an input reception unit configured to receive an input from outside, wherein the holding portion is disposed between the movement path and the input reception unit in the transport direction, and the contact reducing member is disposed between the movement path and the input reception unit in the transport direction.

[27]

The printing apparatus according to or [26], including: a suction mechanism disposed at a position closer to a first end portion of the movement path in the scanning direction than a center of the movement path and configured to suction the liquid from the printing head as the waste liquid, wherein the waste liquid container is attachable to and detachable from the holding portion, and the discharge portion is provided at a position closer to a second end portion of the movement path in a direction opposite to the scanning direction than the center of the movement path in the scanning direction.

[28]

The printing apparatus according to any one of [25] to [27], wherein a hole through which the waste liquid discharged from the discharge port passes from the outside of the waste liquid container to the inside of the waste liquid container is formed in the waste liquid container, the waste liquid container includes an abutted portion movable between a hole closing position at which the hole is closed and a hole opening position at which the hole is opened, the holding portion includes an abutting portion configured to abut on the abutted portion, and the abutting portion moves the abutted portion from the hole closing position to the hole opening position according to the placement of the waste liquid container on the holding portion.

[29]

The printing apparatus according to any one of [25] to [28], wherein a hole through which the waste liquid discharged from the discharge port passes from the outside of the waste liquid container to the inside of the waste liquid container is formed in the waste liquid container, the holding portion includes a board coupling unit configured to be electrically coupled to a circuit board provided in the waste liquid container, the holding portion holds the waste liquid container so that the waste liquid container is movable between a first position determined in advance as a position at which the waste liquid container receives the waste liquid discharged from the discharge port and a second position determined in advance as a position at which the waste liquid container does not receive the waste liquid discharged from the discharge port, a distance between the waste liquid container and the liquid supply tube at the first position is equal to or larger than a distance between the waste liquid container and the liquid supply tube at the second position, the nozzle is coupled to the hole of the waste liquid container held by the holding portion by the operating portion receiving an operation when the waste liquid container is located at the second position, and the board coupling unit is provided at a position at which the board coupling unit is coupled to the circuit board when the waste liquid container is moved from the second position to the first position, and is provided at a position closer to a second end portion of the movement path in the direction opposite to the scanning direction than a first end portion of the movement path in the scanning direction.

[30]

A printing apparatus including: a transport unit configured to transport a printing medium in a transport direction; a printing head configured to print an image on the printing medium; a carriage configured to move the printing head back and forth above a transport path of the printing medium in a scanning direction intersecting the transport direction; a liquid container coupling portion to which a liquid container containing a liquid to be supplied to the printing head is coupled; a liquid supply tube coupled to the liquid container coupling portion to supply the liquid from the liquid container to the printing head via the liquid container coupling portion; a holding portion configured to hold a waste liquid container configured to contain a waste liquid discharged from the printing head; and a discharge portion including a nozzle in which a discharge port for discharging the waste liquid is formed, wherein the discharge portion is provided in the holding portion and is movable between a third position determined in advance as a position at which the discharge portion discharges the waste liquid to the waste liquid container and a fourth position determined in advance as a position at which the discharge portion does not discharge the waste liquid to the waste liquid container.

The embodiment according to the present disclosure has been described above with reference to the drawings, but a specific configuration is not limited to this embodiment and may be modified, replaced, deleted, or the like without departing from the gist of the present disclosure.

What is claimed is:

1. A printing apparatus comprising:

a transport unit configured to transport a printing medium in a transport direction;

a printing head configured to print an image on the printing medium;

a carriage configured to move the printing head back and forth above a transport path of the printing medium in a scanning direction intersecting the transport direction;

a liquid container coupling portion to which a liquid container containing a liquid to be supplied to the printing head is coupled;

a liquid supply tube coupled to the liquid container coupling portion to supply the liquid from the liquid container to the printing head via the liquid container coupling portion;

a holding portion configured to hold a waste liquid container configured to contain a waste liquid discharged from the printing head;

a discharge portion including a nozzle in which a discharge port for discharging the waste liquid is formed; and a contact reducing member configured to reduce contact between the waste liquid container held by the holding portion and the liquid supply tube, wherein the holding portion is disposed at a position at which a waste liquid container region defined by a region occupied by the waste liquid container held by the holding portion in the printing apparatus and a part of the movement path overlap when viewed from the transport direction, above the transport path and downstream of the movement path of the carriage in the transport direction, a portion of the liquid supply tube is located between the movement path and the waste liquid container region when viewed from a gravity direction and overlaps the waste liquid container region when viewed from the transport direction, and the contact reducing member is located between the liquid supply tube and the waste liquid container region.

2. The printing apparatus according to claim 1, wherein the liquid supply tube and the holding portion are disposed in a predetermined region inside the printing apparatus.

3. The printing apparatus according to claim 1, wherein the holding portion holds the waste liquid container so that the waste liquid container is movable between a first position determined in advance as a position at which the waste liquid container receives the waste liquid discharged from the discharge port and a second position determined in advance as a position at which the waste liquid container does not receive the waste liquid discharged from the discharge port and located upstream of the first position in the transport direction, and the waste liquid container region is a region including both of a first region overlapping the waste liquid container held by the holding portion at the first position in the region occupied by the waste liquid container and a second region overlapping the waste liquid container held by the holding portion at the second position in the region occupied by the waste liquid container.

4. The printing apparatus according to claim 1, wherein the contact reducing member includes a partition wall configured to separate the waste liquid container region and the portion of the liquid supply tube from each other in the transport direction.

5. The printing apparatus according to claim 4, comprising:

a housing, wherein the partition wall includes a first surface facing the liquid supply tube and a second surface opposite to the first surface, and a friction coefficient of the first surface is lower than that of a front surface of the housing.

6. The printing apparatus according to claim 5, wherein a friction coefficient of the second surface is lower than that of the front surface of the housing.

7. The printing apparatus according to claim 4, comprising:

a housing, wherein the partition wall includes a first surface facing the liquid supply tube and a second surface opposite to the first surface, and a hardness of the first surface is lower than that of the housing.

8. The printing apparatus according to claim 7, wherein a hardness of the second surface is lower than that of the housing.

9. The printing apparatus according to claim 4, comprising:

a protection member provided in at least a portion of the liquid supply tube and configured to protect the liquid supply tube, wherein the protection member is made of a predetermined type of plastic, and the partition wall is made of the plastic.

10. The printing apparatus according to claim 4, wherein the liquid supply tube is bent between the liquid container coupling portion and the printing head, a first portion from a position where the liquid supply tube is most bent to the liquid container coupling portion among portions of the liquid supply tube and a second portion from the position where the liquid supply tube is most bent to the printing head among portions of the liquid supply tube do not overlap in the transport direction, the partition wall overlaps with the position where the liquid supply tube is most bent when viewed from the transport direction, when the partition wall is located at a carriage standby position determined in advance as a position at which the carriage is located when the waste liquid container is replaced, a protected region overlapping the partition wall and an unprotected region not overlapping the partition wall are included in a region of the liquid supply tube when viewed from the transport direction, and the protected region is smaller than the unprotected region.

11. The printing apparatus according to claim 4, wherein the holding portion holds the waste liquid container so that the waste liquid container is movable between a first position determined in advance as a position at which the waste liquid container receives the waste liquid discharged from the discharge port and a second position determined in advance as a position at which the waste liquid container does not receive the waste liquid discharged from the discharge port and located upstream of the first position in the transport direction, and the partition wall is provided in the holding portion and movable together with the waste liquid container held by the holding portion.

12. The printing apparatus according to claim 11, wherein the partition wall is biased by a biasing member in a direction away from the liquid supply tube with respect to the holding portion.

13. The printing apparatus according to claim 4, wherein the partition wall is formed integrally with the holding portion.

14. The printing apparatus according to claim 4, wherein the liquid supply tube is bent between the liquid container coupling portion and the printing head, a first portion from a position where the liquid supply tube is most bent to the liquid container among portions of the liquid supply tube and a second portion from the position where the liquid supply tube is most bent to the printing head among the portions of the liquid supply tube do not overlap in the transport direction, and an upper end portion of the partition wall is higher than a highest position of the liquid supply tube.

15. The printing apparatus according to claim 4, wherein the liquid supply tube is bent between the liquid container coupling portion and the printing head, a first portion from a position where the liquid supply tube is most bent to the liquid container among portions of the liquid supply tube and a second portion from the position where the liquid supply tube is most bent to the printing head among the portions of the liquid supply tube do not overlap in the transport direction, and a lower end portion of the partition wall is lower than a lowest position of the liquid supply tube.

16. The printing apparatus according to claim 1, wherein the nozzle extends in a discharge port protrusion direction indicated by a composite vector of a vector indicating the direction opposite to the transport direction and a vector indicating the direction opposite to the gravity direction, and the discharge port is formed at a tip of the nozzle in the discharge port protrusion direction.

17. The printing apparatus according to claim 1, comprising:

a housing, wherein a printing medium discharge port through which the printing medium is discharged is formed in the housing, the holding portion is disposed above the printing medium discharge port when viewed from the transport direction, and the contact reducing member is disposed above the printing medium discharge port when viewed from the transport direction.

18. The printing apparatus according to claim 1, comprising:

an input reception unit configured to receive an input from outside, wherein the holding portion is disposed between the movement path and the input reception unit in the transport direction.

19. The printing apparatus according to claim 1, comprising:

a suction mechanism disposed at a position closer to a first end portion of the movement path in the scanning direction than a center of the movement path and configured to suction the liquid from the printing head as the waste liquid, wherein the waste liquid container is attachable to and detachable from the holding portion, and the discharge portion is provided at a position closer to a second end portion of the movement path in a direction opposite to the scanning direction than the center of the movement path in the scanning direction.

20. The printing apparatus according to claim 1, wherein a hole through which the waste liquid discharged from the discharge port passes from the outside of the waste liquid container to the inside of the waste liquid container is formed in the waste liquid container, the waste liquid container includes an abutted portion movable between a hole closing position at which the hole is closed and a hole opening position at which the hole is opened, the holding portion includes an abutting portion configured to abut on the abutted portion, and the abutting portion moves the abutted portion from the hole closing position to the hole opening position according to the placement of the waste liquid container on the holding portion.

21. The printing apparatus according to claim 1, wherein the holding portion holds the waste liquid container so that the waste liquid container is movable between a first position determined in advance as a position at which the waste liquid container receives the waste liquid discharged from the discharge port and a second position determined in advance as a position at which the waste liquid container does not receive the waste liquid discharged from the discharge port and located upstream of the first position in the transport direction, the waste liquid container configured to be coupled to the nozzle, and the holding portion includes a board coupling unit configured to be electrically coupled to a circuit board provided in the waste liquid container, and the board coupling unit is provided at a position at which the board coupling unit is coupled to the circuit board when the waste liquid container is moved from the second position to the first position, and is provided at a position closer to a second end portion of the movement path in the direction opposite to the scanning direction than a first end portion of the movement path in the scanning direction.

22. The printing apparatus according to claim 1, comprising:

a housing configured to open upward;

a cover configured to cover the opening of the housing so that the opening is opened or closed from the upper side, wherein the holding portion is exposed through the opening of the housing when the cover opens the opening of the housing.

23. The printing apparatus according to claim 1, comprising:

a protection member provided in at least a portion of the liquid supply tube and configured to protect the liquid supply tube, wherein the protection member includes a barrier portion configured to separate the waste liquid container region and a portion of the liquid supply tube from each other in the transport direction, and the contact reducing member includes the barrier portion.

24. The printing apparatus according to claim 23, wherein the barrier portion is divided into two or more members spaced apart from each other.

25. The printing apparatus according to claim 1, comprising:

the waste liquid container.

26. A printing apparatus comprising:

a transport unit configured to transport a printing medium in a transport direction;

a printing head configured to print an image on the printing medium;

a carriage configured to move the printing head back and forth above a transport path of the printing medium in a scanning direction intersecting the transport direction;

a liquid container coupling portion to which a liquid container containing a liquid to be supplied to the printing head is coupled;

a liquid supply tube coupled to the liquid container coupling portion to supply the liquid from the liquid container to the printing head via the liquid container coupling portion;

a holding portion configured to hold a waste liquid container configured to contain a waste liquid discharged from the printing head; and a discharge portion including a nozzle in which a discharge port for discharging the waste liquid is formed, wherein the holding portion is disposed at a position at which a waste liquid container region defined by a region occupied by the waste liquid container held by the holding portion in the printing apparatus and a part of the movement path overlap when viewed from the transport direction, above the transport path and downstream of the movement path of the carriage in the transport direction, a portion of the liquid supply tube is located between the movement path and the waste liquid container region when viewed from a gravity direction and overlaps the waste liquid container region when viewed from the transport direction, the waste liquid container is configured to be coupled to the nozzle, the nozzle extends in a discharge port protrusion direction indicated by a composite vector of a vector indicating the direction opposite to the transport direction and a vector indicating the direction opposite to the gravity direction, and the discharge port is formed at a tip of the nozzle in the discharge port protrusion direction.

* * * * *